(12) United States Patent
Advani et al.

(10) Patent No.: US 12,019,147 B2
(45) Date of Patent: Jun. 25, 2024

(54) APPARATUS AND METHODS FOR MULTI-SENSOR SLAM SYSTEMS

(71) Applicant: Samsung Electronics Co., Ltd., Suwon-si (KR)

(72) Inventors: Siddharth K. Advani, Allen, TX (US); Neha Dawar, Plano, TX (US); Vitali Loseu, Aubrey, TX (US); Mandar Kulkarni, Richardson, TX (US); Yuming Zhu, Plano, TX (US); Chiyu Zhang, West Lafayette, IN (US); Songwei Li, McKinney, TX (US); Jianzhong Zhang, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 713 days.

(21) Appl. No.: 16/949,308

(22) Filed: Oct. 23, 2020

(65) Prior Publication Data

US 2021/0132213 A1    May 6, 2021

Related U.S. Application Data

(60) Provisional application No. 62/970,883, filed on Feb. 6, 2020, provisional application No. 62/951,436, filed
(Continued)

(51) Int. Cl.
*G01S 13/86* (2006.01)
*G01S 7/00* (2006.01)
(Continued)

(52) U.S. Cl.
CPC ............ *G01S 13/865* (2013.01); *G01S 7/003* (2013.01); *G01S 13/42* (2013.01); *G01S 13/89* (2013.01); *G01S 17/89* (2013.01)

(58) Field of Classification Search
None
See application file for complete search history.

(56) References Cited

U.S. PATENT DOCUMENTS 9,097,800 B1    8/2015  Zhu
10,789,488 B2 *  9/2020  Sugiura ................. G06F 18/253
(Continued)

OTHER PUBLICATIONS

Fernandez, "Grid-Based Multi-Sensor Fusion for On-Road Obstacle Detection: Application to Autonomous Driving", Degree Project, in Computer Science, Second Level, KTH Royal Institute of Technology, School of Computer Science and Communication, Stockholm, Sweden, 158 pages.

(Continued)

*Primary Examiner* — Whitney Moore

(57) ABSTRACT

An electronic device includes a Lidar sensor, a radar sensor, and a processor. The processor is configured to identify one or more objects from Lidar scans. The processor is configured to transmit, via the radar sensor, radar signals for object detection based on reflections of the radar signals received by the radar sensor. While the electronic device travels the area, the processor is configured to generate a first map indicating one or more objects within an area based on the Lidar scans and a second map based on the radar signals. The processor is configured to determine whether the second map indicates a missed object at the portion of the first map that is unoccupied. In response to a determination that the second map indicates the missed object, the processor is configured to modify the first map with the missed object.

20 Claims, 30 Drawing Sheets

Related U.S. Application Data on Dec. 20, 2019, provisional application No. 62/928,721, filed on Oct. 31, 2019.

(51) Int. Cl.
*G01S 13/42* (2006.01)
*G01S 13/89* (2006.01)
*G01S 17/89* (2020.01)

(56) References Cited

U.S. PATENT DOCUMENTS

| | | |
|---|---|---|
| 2015/0221221 A1 | 8/2015 | Schaefer et al. |
| 2016/0084952 A1 | 3/2016 | Karlapalem |
| 2017/0061632 A1* | 3/2017 | Lindner .............. G06V 20/46 |
| 2017/0254895 A1 | 9/2017 | Tong et al. |

OTHER PUBLICATIONS

Hammarsten, et al., "3D Localization and Mapping using automotive radar: Ego-positioning using 3D Occupancy Grid Mapping", Department of Signals and systems, Chalmers University of Technology, Master's Thesis 2016: EX026, Gothenburg, Sweden, 2016, 108 pages.

Gorlatova, et al., "Movers and Shakers: Kinetic Energy Harvesting for the Internet of Things", IEEE Journal on Selected Areas in Communications, vol. 33, Issue 8, Jan. 14, 2015, 13 pages.

Magno, et al., "Kinetic energy harvesting: toward autonomous wearable sensing for Internet of Things", IEEE, 2016 International Symposium on Power Electronics, Electrical Drives, Automation and Motion (SPEEDAM), Date of Conference: Jun. 22-24, 2016, Anacapri, Italy, 7 pages.

International Search Report of the International Searching Authority dated Mar. 22, 2021 in connection with International Application No. PCT/KR2020/018120, 3 pages.

Written Opinion of the International Searching Authority dated Mar. 22, 2021 in connection with International Application No. PCT/KR2020/018120, 5 pages.

Fritsche, et al., "Fusing LiDAR and Radar Data to Perform SLAM in Harsh Environments," Informatics in Control, Automation and Robotics, Springer International Publishing, Jan. 2018, 15 pages.

* cited by examiner $f_{occ}^r(m_i | x_{1:t}, z_{1:t})$ $f_{occ}^\theta(m_i | x_{1:t}, z_{1:t})$ $f_{occ}(m_i | x_{1:t}, z_{1:t})$ $f^r_{empty}(m_i | x_{1:t}, z_{1:t})$ $f^\theta_{empty}(m_i | x_{1:t}, z_{1:t})$ $f_{empty}(m_i | x_{1:t}, z_{1:t})$

| ENERGY STATE | SYSTEM STATE | ENERGY SOURCE | | |
|---|---|---|---|---|
| | | SENSOR CLASSIFICATION | | ELECTRONIC DEVICE |
| | | 'ON' SENSORS | 'ALWAYS ON' SENSORS | |
| LEVEL 1 | REGULAR | EHU | EHU | MAIN BATTERY |
| LEVEL 2 | REGULAR | MAIN BATTERY | EHU | MAIN BATTERY |
| LEVEL 3 | REGULAR | MAIN BATTERY | MAIN BATTERY | MAIN BATTERY |
| LEVEL 4 | REGULAR | - | EHU | MAIN BATTERY |
| LEVEL 5 | SAVE | - | MAIN BATTERY | MAIN BATTERY |
| LEVEL 6 | ALERT | - | MAIN BATTERY | - |
| LEVEL 7 | SHUT DOWN | - | - | - |

APPARATUS AND METHODS FOR MULTI-SENSOR SLAM SYSTEMS

CROSS-REFERENCE TO RELATED APPLICATION AND CLAIM OF PRIORITY

This application claims priority under 35 U.S.C. § 119(e) to U.S. Provisional Patent Application No. 62/928,721 filed on Oct. 31, 2019, U.S. Provisional Patent Application No. 62/951,436 filed on Dec. 20, 2019, and U.S. Provisional Patent Application No. 62/970,883 filed on Feb. 6, 2020. The above-identified provisional patent applications are hereby incorporated by reference in its entirety.

TECHNICAL FIELD

This disclosure relates generally to an autonomous electronic devices and method of control of the autonomous electronic devices. More specifically, this disclosure relates to mapping and localization of multi-sensor SLAM systems.

BACKGROUND

Autonomous electronic devices that perform household functions such as cleaning the floor, cleaning the pool, and cutting the lawn are now readily available consumer products. Such products often require little to no input from a user. Autonomous electronic devices can construct or update a map of an environment while keeping track of its own location within the environment and navigate around known or unknown obstacles. The ability for an autonomous electronic devices to map an environment, localize itself within the environment all while avoiding obstacles is limited by the accuracy and type of sensors associated with the electronic device.

SUMMARY

This disclosure provides an apparatus and methods for multi-sensor SLAM systems.

In one embodiment, an electronic device is provided. The electronic device includes a processor operably connected to a Lidar sensor and the radar sensor. The Lidar sensor is configured to perform Lidar scans. The radar sensor is configured to perform object detection. The processor is configured to identify one or more objects from the Lidar scans. The processor is configured to transmit, via the radar sensor, radar signals for the object detection based on reflections of the radar signals received by the radar sensor. While the electronic device travels the area, the processor configured to generate a first map indicating the one or more objects within an area based on the Lidar scans and a second map based on the radar signals. In response to a determination that a portion of the first map is unoccupied, the processor configured to determine whether the second map indicates a missed object at the portion of the first map that is unoccupied. In response to a determination that the second map indicates the missed object, the processor configured to modify the first map with the missed object.

In another embodiment, a method for controlling an electronic device is provided. The method includes identifying one or more objects from light detection and ranging (Lidar) scans of a Lidar sensor. The method also includes transmitting, via a radar sensor, radar signals for the object detection based on reflections of the radar signals received by the radar sensor. While the electronic device travels an area, the method includes generating a first map indicating the one or more objects within an area based on the Lidar scans and a second map based on the radar signals. In response to a determination that a portion of the first map is unoccupied, the method includes determining whether the second map indicates a missed object at the portion of the first map that is unoccupied. In response to a determination that the second map indicates the missed object, the method includes modifying the first map with the missed object.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 6E illustrates an example table indicating the power source for various sensors based on identified energy levels in accordance with an embodiment of this disclosure;

DETAILED DESCRIPTION

Figure 1:
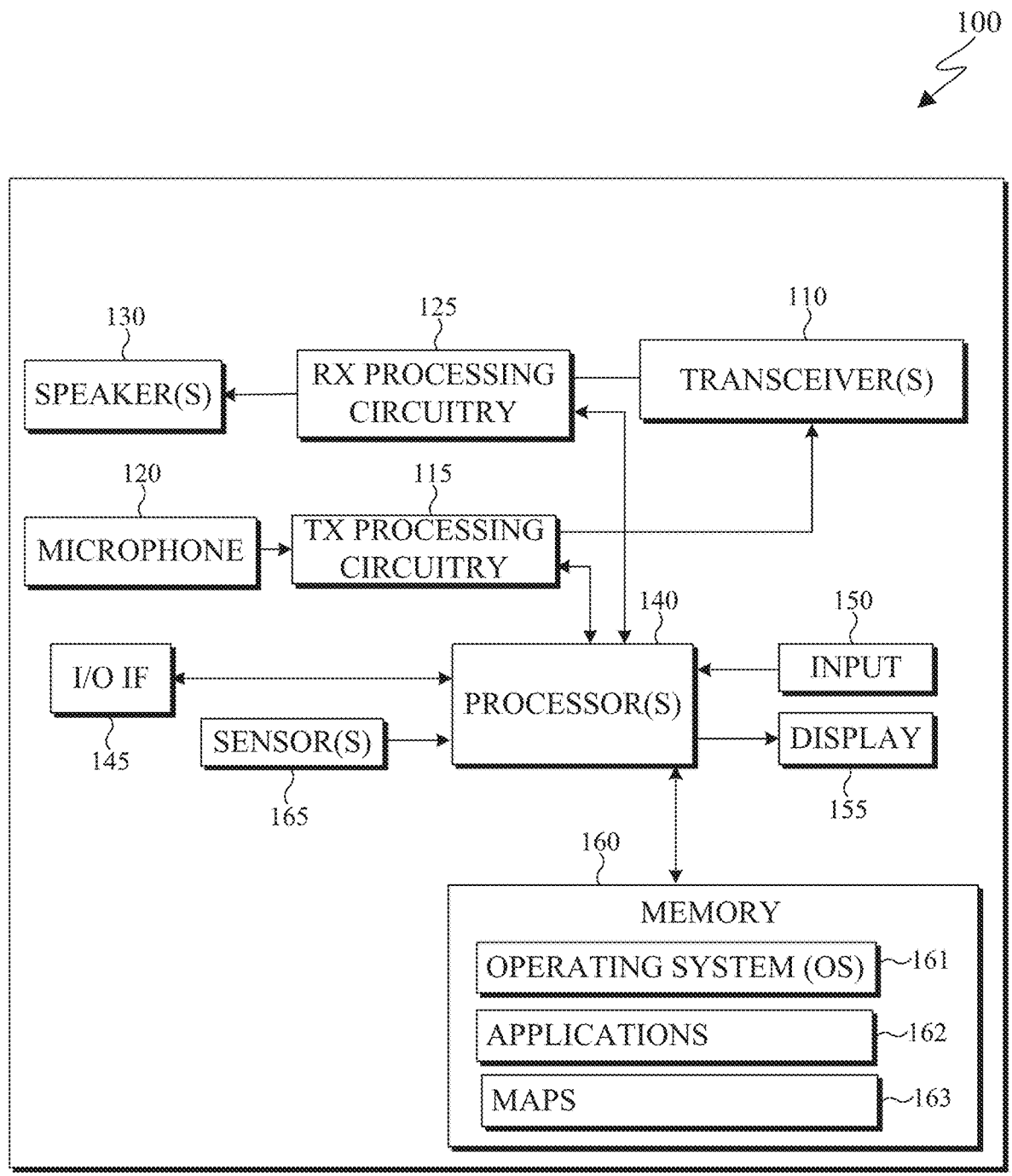
FIG. 1 illustrates an example electronic device in accordance with an embodiment of this disclosure.

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

Embodiments of the present disclosure provide systems and methods for controlling an electronic device. In certain embodiments, an electronic device is an automatic lawn mower that traverses an area and trims the grass, a floor cleaner (such as a vacuum cleaner or a mop) that traverses an area to collect dirt and debris, a pool cleaner that traverses an area to collect dirt and debris, a delivery drone, a surveillance drone, a search and rescue type drone, or any other type of device that can generate a map of an area and localize itself within the map. In all these applications, the electronic devices carry out a specific task with minimal human intervention. Navigation is the key element of fully autonomous electronic devices to be able to perform various tasks efficiently. In order to navigate precisely, the electronic device builds the map of the surrounding and localizes itself in the map. The challenging problem of concurrently localizing and mapping is referred to as Simultaneous Localization and Mapping (SLAM).

The electronic device can generate a map and identify its location within a map based on identifying its trajectory and pose as the electronic device traverses through an area without directions from a user. The environment or area can be a yard, lawn, a single room, a body of water, a residence, an office complex, a street, a warehouse, a school, or any other consumer or commercial space.

The electronic device of the present disclosure can navigate an area and avoid colliding with obstacles or boundaries (such as walls). Therefore, embodiments of the present disclosure provide systems and methods for an electronic device to generate a map that includes boundaries and obstacles in the environment as the electronic device travels. The electronic device can also localize itself within the map. In certain embodiments, the electronic device performs SLAM to generate the map and localize itself within an environment. Additionally, according to embodiments of the present disclosure, after the map is generated, the electronic device can autonomously plan a path and then navigate from a current location to the end location. For example, the path can be a simple navigation from a first location to a second location while avoiding obstacles. In another example, the path can include covering the entire area while avoiding an obstacle in order to perform a task such as collecting debris (such as an autonomous vacuum cleaner or pool cleaner) or cut grass (such an autonomous lawn mower).

Embodiments of the present disclosure take into consideration that inaccurate sensor measurements associated with the electronic device can result in inaccurate mapping of the area and the objects within. As such, objects or the boundary could be mapped at the incorrect areas thereby causing a collision. Therefore, embodiments of the present disclosure provide system and methods for accurate senor measurements. Different sensors provide different design constraints. For example, a camera can provide a high resolution image of the area but cannot operate in the dark, while radar can operate in any light condition (including the dark) but has a low resolution. Therefore, based on the application of the electronic device, embodiment of the present disclosure provide systems and methods for combining multiple sensors to improve the generation of a map and navigation within the area.

Embodiments of the present disclosure also takes into consideration that the accuracy of SLAM depends on the resolution and accuracy of the sensors. For example, range based sensors such as radar can cause mapping errors in the mapping process. The errors can be caused due to an object that is missed. Another error can be caused due to a limited field of view (FOV). Since radar can detect one or more objects that are behind other objects, a strong reflection from a faraway object and a weak reflection from a near object, could cause the near object to be missed. Additionally, due to a limited FOV, it could be difficult to match current measurements to already mapped points, such as in the case of planar surfaces like a wall.

Embodiments of the present disclosure further takes into consideration that autonomous electronic devices use very little human intervention to perform a given task. For example, a battery which is used to provide energy to the electronic device has a limited store of power and as such, without a human intervention it is difficult to switch batteries while the electronic device is navigating and traveling the designated area. Therefore, embodiments of the present disclosure provide systems and methods for harvesting ambient energy to provide additional power to various components of the electronic device. For example, energy can be harvested from ambient conditions such as solar rays, electro-magnetic (EM) waves, vibrations (of the environment or caused by the movement of the electronic device), and the like. Embodiments of the present disclosure also provide systems and methods for switching between a battery and an energy harvesting unit for providing power to the various sensors of the electronic device. Embodiments of the present disclosure further provide systems and methods for identifying areas within the map that include a large quantity of harvestable energy. The electronic device can then identify that location in the map and navigate back to that location as needed to harvest energy. For example, the electronic device can identify a wi-fi hotspot which can be harvested to provide electricity to various sensors of the electronic device. Additionally, embodiments of the present disclosure provide systems and methods for managing power consumption in order to reach a safe state before powering down.

Embodiments of the present disclosure enable the electronic device to localize itself with the area. Localization includes both the X-Y coordinate location and the heading direction of the electronic device. In certain embodiments, localization and heading direction are identified using multiple sensors. Example sensors include, but not limited to, a light detection and ranging (Lidar) and radar. The data from the various sensors can be fused together for localization estimates. Additionally, data from different localization models can be used together to generate improved the localization estimates. Based on the data from the various sensors the electronic device is able to identify known a new (dynamic) obstacles while traversing the area.

FIG. 1 illustrates an example electronic device 100 in accordance with an embodiment of this disclosure. In some embodiments, the electronic device 100 is an automatic lawn mower that traverses portion portions area, such as a yard, in order to trim the grass. In some embodiments, the electronic device 100 is an automatic vacuum cleaner, an automatic mop, or a pool cleaner that traverses an area and collects dust, dirt and/or debris. In other embodiments, the electronic device 100 is able to traverse an area while avoiding obstacles and performing specific functions As shown in FIG. 1, the electronic device 100 includes an antenna 105, a communication unit 110, transmit (TX) processing circuitry 115, a microphone 120, and receive (RX) processing circuitry 125. The communication unit 110 can include, for example, a radio frequency (RF) transceiver, a BLUETOOTH transceiver, a WI-FI transceiver, a ZIGBEE transceiver, an infrared transceiver, and the like. The electronic device 100 also includes a speaker 130, a processor 140, an input/output (I/O) interface (IF) 145, an input 150, a display 155, a memory 160, and a sensor(s) 165. The memory 160 includes an operating system (OS) 161, one or more applications 162, and previously generated maps 163.

The communication unit 110 receives, from the antenna 105, an incoming RF signal transmitted from an access point (such as an anchor described in FIG. 2A below), a base station, WI-FI router, or BLUETOOTH device) or other device of the network 102 (such as a WI-FI, BLUETOOTH, cellular, 5G, LTE, LTE-A, WiMAX, or any other type of wireless network). The communication unit 110 down-converts the incoming RF signal to generate an intermediate frequency or baseband signal. The intermediate frequency or baseband signal is sent to the RX processing circuitry 125 that generates a processed baseband signal by filtering, decoding, and/or digitizing the baseband or intermediate frequency signal. The RX processing circuitry 125 transmits the processed baseband signal to the speaker 130 (such as for voice data) or to the processor 140 for further processing (such as for web browsing data).

The TX processing circuitry 115 receives analog or digital voice data from the microphone 120 or other outgoing baseband data from the processor 140. The outgoing baseband data can include web data, e-mail, or interactive video game data. The TX processing circuitry 115 encodes, multiplexes, and/or digitizes the outgoing baseband data to generate a processed baseband or intermediate frequency signal. The communication unit 110 receives the outgoing processed baseband or intermediate frequency signal from the TX processing circuitry 115 and up-converts the baseband or intermediate frequency signal to an RF signal that is transmitted via the antenna 105.

The processor 140 can include one or more processors or other processing devices. The processor 140 can execute instructions that are stored in a memory 160, such as the OS 161 in order to control the overall operation of the electronic device 100. For example, the processor 140 could control the reception of forward channel signals and the transmission of reverse channel signals by the communication unit 110, the RX processing circuitry 125, and the TX processing circuitry 115 in accordance with well-known principles. The processor 140 can include any suitable number(s) and type(s) of processors or other devices in any suitable arrangement. For example, in some embodiments, the processor 140 includes at least one microprocessor or microcontroller. Example types of processor 140 include microprocessors, microcontrollers, digital signal processors, field programmable gate arrays, application specific integrated circuits, and discrete circuitry.

The processor 140 is also capable of executing other processes and programs resident in the memory 160, such as operations that receive, store, and timely instruct by providing location information and the like. The processor 140 can move data into or out of the memory 160 as required by an executing process. In some embodiments, the processor 140 is configured to execute a plurality of applications 162 based on the OS 161 or in response to signals received from external source(s) or an operator. Example, applications 162 can include a location application, an object avoidance application, and the like. The processor 140 is also coupled to the I/O interface 145 that provides the electronic device 100 with the ability to connect to other devices, such as client devices 106-114. The I/O interface 145 is the communication path between these accessories and the processor 140.

The processor 140 is also coupled to the input 150 and the display 155. The operator of the electronic device 100 can use the input 150 to enter data or inputs into the electronic device 100. For example, the input 150 can be a keyboard, touchscreen, mouse, track ball, voice input, buttons located on the external surface of the electronic device, or other device capable of acting as a user interface to allow a user in interact with electronic device 100. The input 150 can also include a wireless transmission from a user device, such as a laptop, a tablet, a remote controller, an appliance, one or more anchors, a desktop personal computer (PC) or any other electronic device. The input 150 can also be based on voice recognition processing based on a voice input. In another example, the input 150 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 150 can be associated with sensor(s) 165 and/or a camera by providing additional input to processor 140. In some embodiments, the sensor 165 includes one or more inertial measurement units (IMUs) (such as accelerometers, gyroscope, and magnetometer), motion sensors, optical sensors, cameras, pressure sensors, GPS, wheel encoders, altimeter, radar sensors, and the like. The input 150 can also include a control circuit. In the capacitive scheme, the input 150 can recognize touch or proximity.

The display 155 can be a liquid crystal display (LCD), light-emitting diode (LED) display, organic LED (OLED), active matrix OLED (AMOLED), or other display capable of rendering text and/or graphics, such as from websites, videos, games, images, and the like.

The memory 160 is coupled to the processor 140. Part of the memory 160 could include a RAM, and another part of the memory 160 could include a Flash memory or other ROM. The memory 160 can include persistent storage (not shown) that represents any structure(s) capable of storing and facilitating retrieval of information (such as data, program code, and/or other suitable information). The memory 160 can contain one or more components or devices supporting longer-term storage of data, such as a read only memory, hard drive, Flash memory, or optical disc.

In certain embodiments, the memory can also include the maps 163. For example, the maps 163 is the generated by the electronic device during SLAM. That is, the electronic device 100 using one or more of the sensors 165 can generate a map of the area, that indicates the external boundary (or parameter) of the area as well as internal obstacles. The obstacles and the external boundary of the area can be identified as permanent such that the obstacles and the external boundary do not change from one run time to the next run time.

The electronic device 100 further includes one or more sensors 165 that can meter a physical quantity to identify the location of the electronic device as well as nearby obstacles of the electronic device 100 and convert metered or detected information into an electrical signal. For example, the sensor 165 can include one or more buttons for touch input, a camera, a gesture sensor, an IMU sensors (such as a gyroscope or gyro sensor and an accelerometer), a wheel encoder, GPS, an air pressure sensor, a magnetic sensor or magnetometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, and the like. The sensor 165 can further include control circuits for controlling any of the sensors included therein. Any of these sensor(s) 165 can be located within the electronic device 100.

In certain embodiments, the sensors include a ranging sensor such as Lidar and radar. Lidar uses a light source (such as ultraviolet, visible, and near infrared) to illuminate an area to determine the distance between the sensor and the object. As such, the electronic device 100, using Lidar can determine the distance between itself and various objects within an environment. Due to the nature of Lidar, the sensor does not detect distances to other objects beyond the detected object. For example, if the electronic device 100 is an autonomous vacuum cleaner, it can detect a leg to a sofa that is within its FOV, but the wall behind the leg of the sofa (or any other objects between the leg and the wall) are occluded. Radar signals are emitted from a radar sensor and reflected off of an object and received by the radar sensor. The radar signals can even pass through one or more objects and detect objects beyond the near object. In certain embodiments, the radar sensor is a transceiver that includes one or more antennas configured to emit and receive the radar signals. Based on the properties of the transmitted and received radar signals, the radar sensor (or a component of the electronic device 100) can determine the range (such as distance) between the electronic device and the object(s).

Although FIG. 1 illustrates an example of electronic device, various changes can be made to FIG. 1. For example, various components in FIG. 1 could be combined, further subdivided, or omitted and additional components could be added according to particular needs. As a particular example, the processor 140 could be divided into multiple processors, such as one or more central processing units (CPUs). In addition, as with computing and communication, electronic devices and servers can come in a wide variety of configurations, and FIG. 1 does not limit this disclosure to any particular electronic device.

Figure 2:
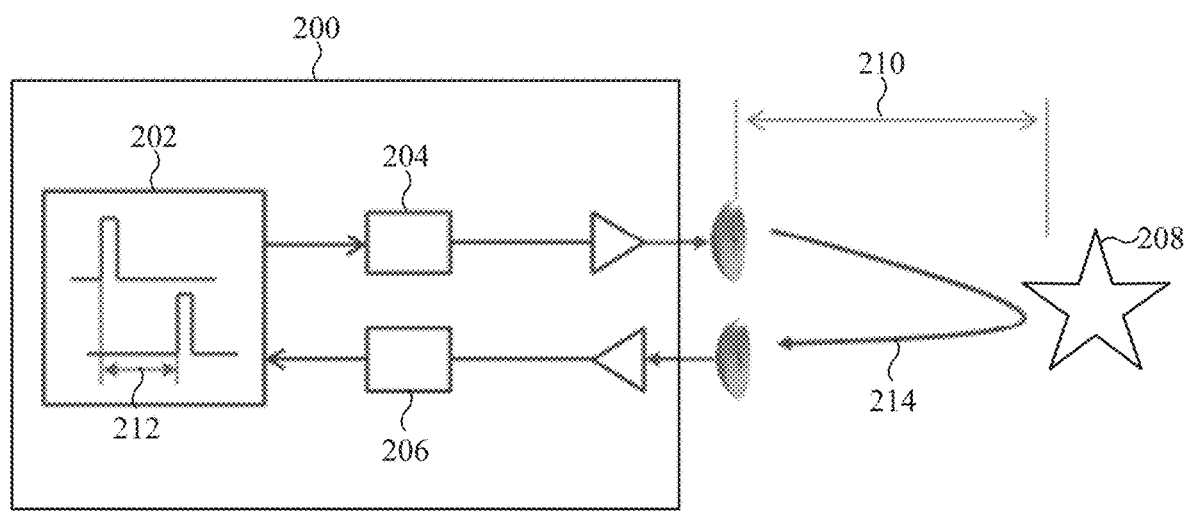
FIG. 2 illustrates an example architecture of a radar signal according to embodiments of this disclosure.

FIG. 2 illustrates an example architecture of a radar signal according to embodiments of this disclosure. The embodiment of FIG. 2 is for illustration only and other embodiments can be used without departing from the scope of the present disclosure.

FIG. 2 illustrates an electronic device 200 that includes a processor 202, a transmitter 204, and a receiver 206. The electronic device 200 can be similar to the electronic device 100 of FIG. 1. The processor 202 is similar to the processor 140 of FIG. 1. Additionally, the transmitter 204 and the receiver 206 can be components of a radar sensor.

The transmitter 204 transmits a signal 214 to the target object 208. The target object 208 is located a distance 210 from the electronic device 200. In certain embodiments, the target object 208 is an obstacle within an environment or a boundary of the environment. For example, the target object 208 correspond to the objects within the environment around the electronic device 200. The transmitter 204 transmits a signal 214 via an antenna. The signal 214 is reflected off of the target object 208 and received by the receiver 206, via an antenna. The signal 214 represents one or many signals that can be transmitted from the transmitter 204 and reflected off of the target object 208. The processor 202 can identify the distance that the transmitter 204 and the receiver 206 are from with the target object 208 based on the receiver 206 receiving the multiple reflections of the signals.

Although FIG. 2 illustrate electronic device 200 and radar signals various changes can be made to FIG. 2. For example, different antenna configurations can be activated. FIG. 2 does not limit this disclosure to any particular radar system or apparatus.

Figure 3A:
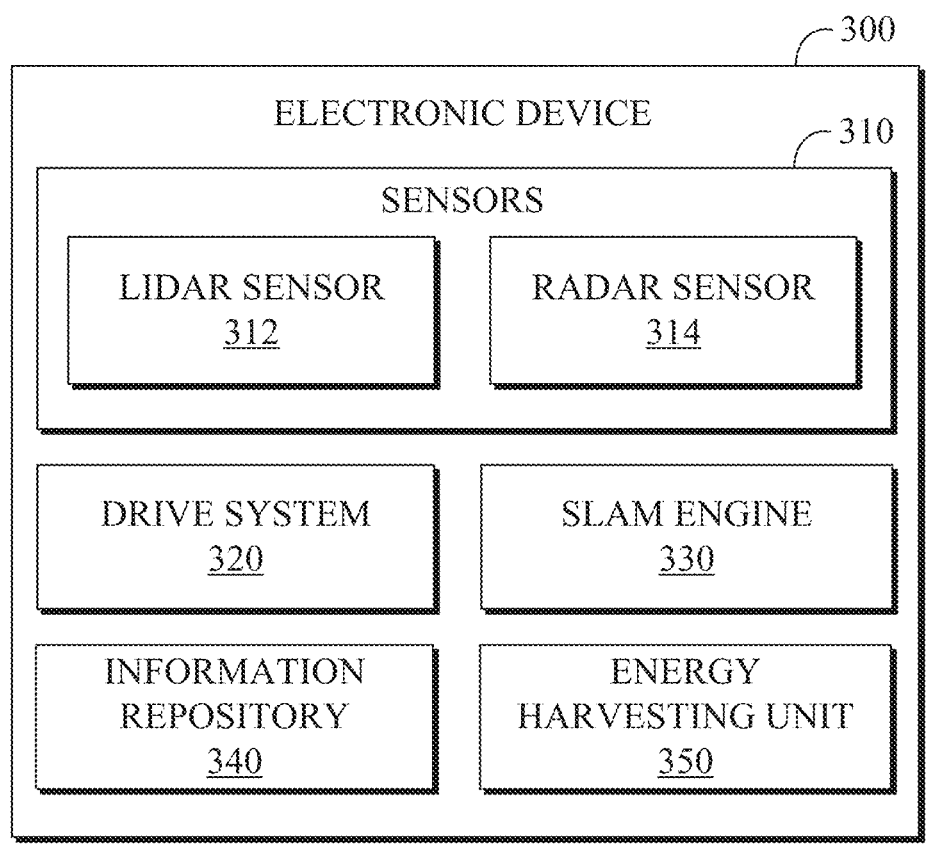
FIG. 3A illustrates an example block diagram of an electronic device in accordance with an embodiment of this disclosure.
Figure 3B:
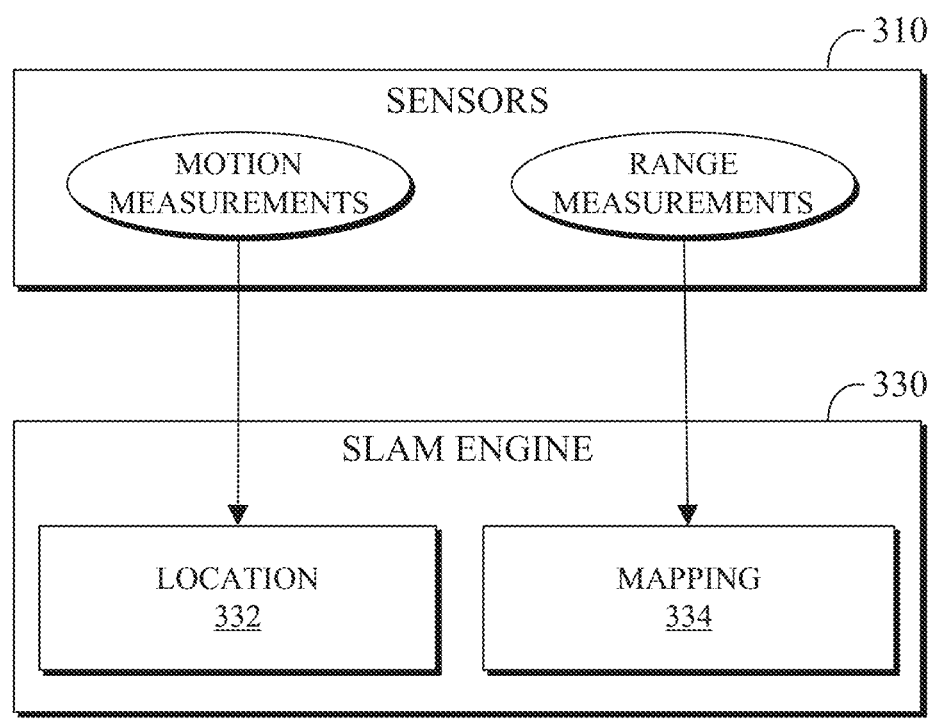
FIG. 3B illustrates an example block diagram of simultaneous localization and mapping system in accordance with an embodiment of this disclosure.
Figure 3C:
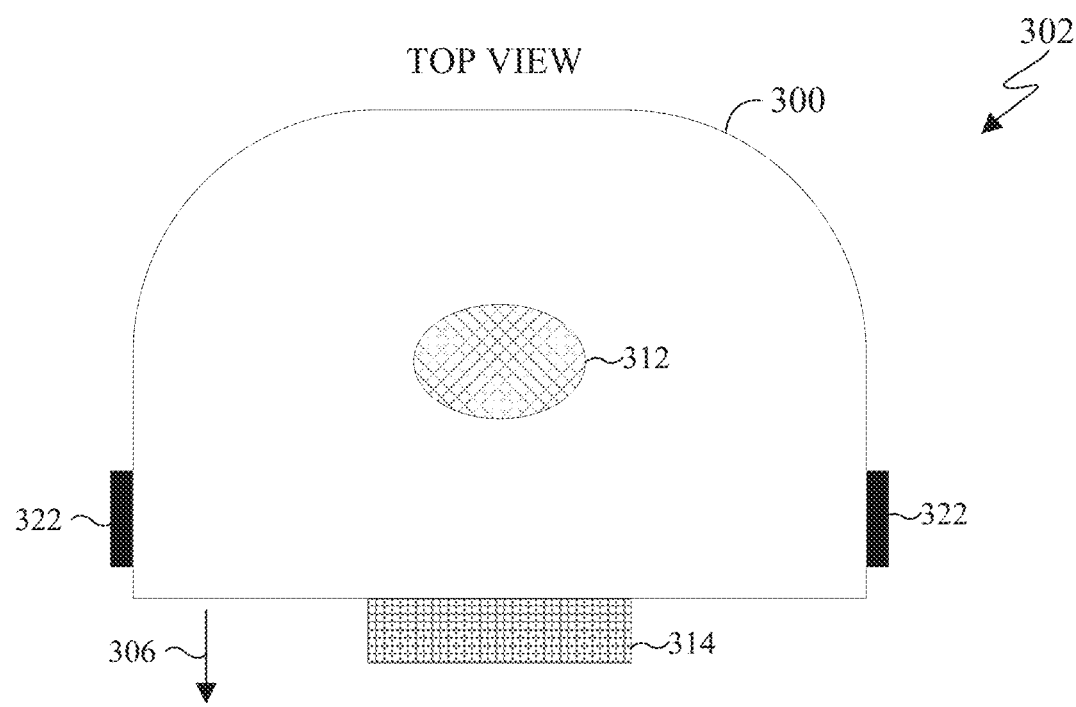
FIG. 3C illustrates example sensor placements on the electronic device in accordance with an embodiment of this disclosure.
Figure 3C:
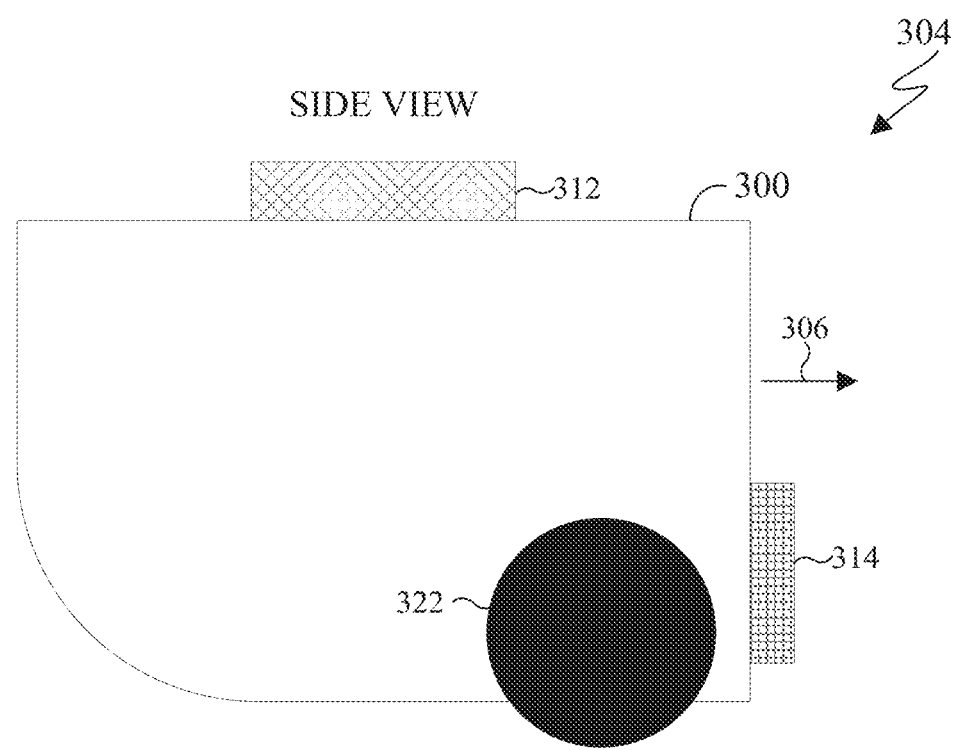
Figure 3D:
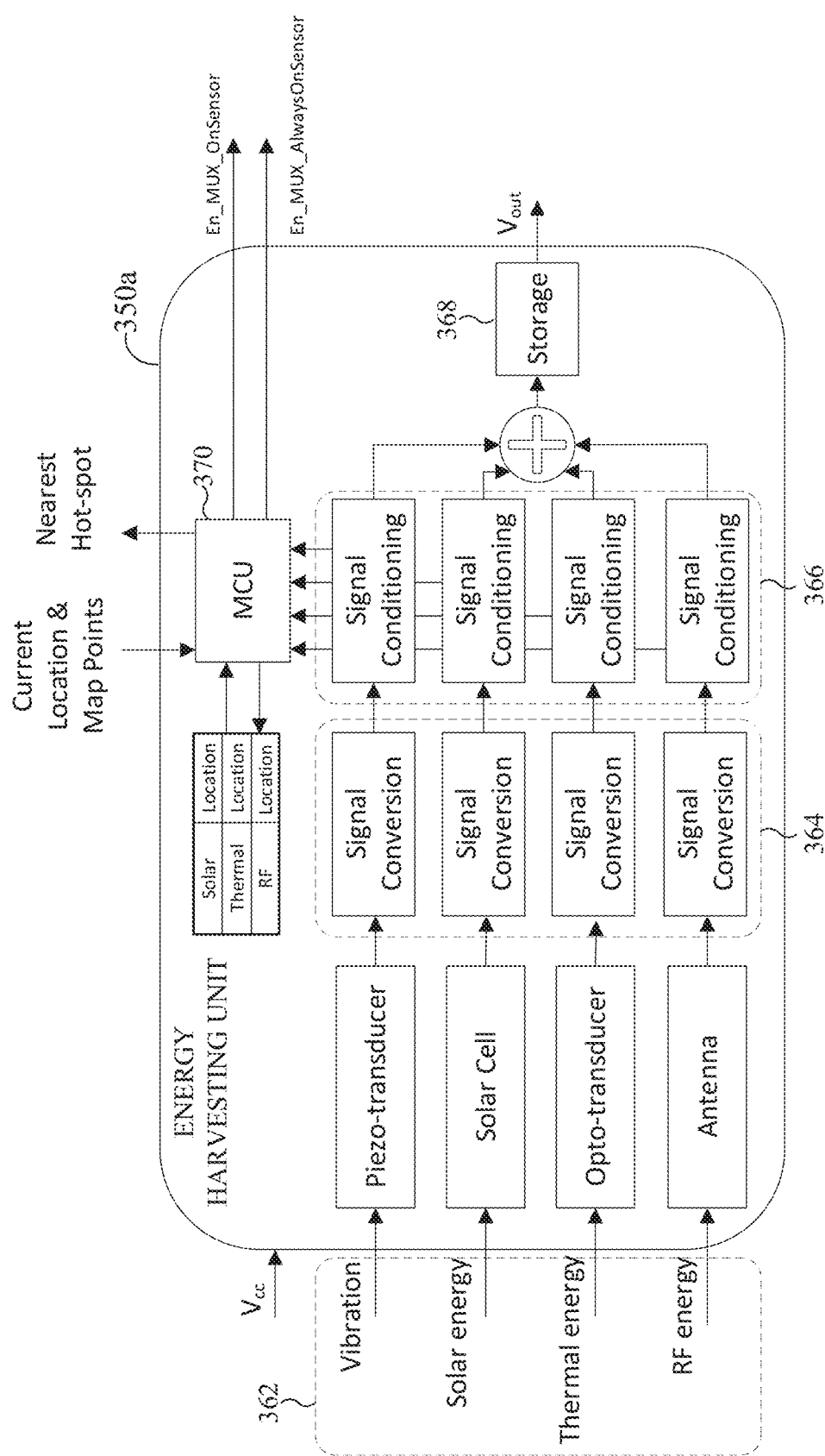
FIG. 3D illustrates example block diagram of an energy harvesting unit in accordance with an embodiment of this disclosure.

FIG. 3A illustrates an example block diagram of an electronic device 300 in accordance with an embodiment of this disclosure. FIG. 3B illustrates an example block diagram of a SLAM system as used by the electronic device 300 in accordance with an embodiment of this disclosure. FIG. 3C illustrates example sensor placements on the electronic device 300 in accordance with an embodiment of this disclosure. FIG. 3D illustrates example block diagram of an energy harvesting unit 350a in accordance with an embodiment of this disclosure. The electronic device 300 is similar to the electronic device 100 of FIG. 1 and the electronic device 200 of FIG. 2. In certain embodiments, the electronic device 300 includes additional components, not previously described in the electronic device 100 of FIG. 1 and the electronic device 200 of FIG. 2. In certain embodiments, the electronic device 300 includes some or all of the internal components, included in the electronic device 100 of FIG. 1 and the electronic device 200 of FIG. 2. The embodiments of FIGS. 3A, 3B, 3C, and 3D are for illustration only and other embodiments can be used without departing from the scope of the present disclosure.

The electronic device 300 includes sensors 310. The sensors 310 can be similar to the sensors 165 of FIG. 1. The electronic device 300 also includes a drive system 320, a SLAM engine 330, an information repository 340, and an energy harvesting unit (EHU) 350.

The sensors 310 include a Lidar sensor 312 and a radar sensor 314. The Lidar sensor 312 can identify the distance between itself and an object using a light source that generates various types of light such as ultraviolet, visible, near infrared, and the like. The light hits object and the reflected energy is detected and measured by Lidar sensor. Distance to the object is determined by recording the time between transmitted and backscattered pulses and by using the speed of light to calculate the distance traveled. Additionally, the Lidar sensor 312 can also identify a wide range of materials based on properties of the reflections. In certain embodiments, the Lidar sensor 312 emits a laser of a certain width to identify the distance to an object that the laser reflects off of. For example, the Lidar sensor 312 can use a narrow laser beam to map physical features of an object and identify a distance that the object is from the sensor itself. The Lidar sensor 312 and a radar sensor 314 can be referred to as ranging sensors.

The radar sensor 314 can include a transmitter, a receiver, and one or more antenna arrays to transmit and receive radar signals for detecting objects. As described above in FIG. 2, the radar transmitter uses one or more antennas to transmit radar signals which can reflect off of an object as well as pass through the object and reflect off of an object further away from the radar sensor. As such, the radar sensor 314 can identify the distance between itself and multiple objects.

In certain embodiments, the sensors 310 can include additional sensors. For example, the sensors 310 can include an ultra-sound sensor which emits sound waves which receives echoes of the sound as it interacts with various objects. For another example, the sensors 310 can include additional object detection sensors (such as a color camera, ultrasonic sensor, and the like), one or more IMU's, one or more wheel encoders, and the like. The IMU sensors measure the force, angular rate, orientation of the electronic device using one or more sensors such as an accelerometer, a gyroscope, and the like. Wheel encoders are a type of sensor that counts the number of times the motor has rotated. The output of a wheel encoder can be used to identify the distance the electronic device 310 has traveled based on each rotation of the motor.

The drive system 320 can include one or more wheels, and motors, that are configured to propel and steer the electronic device 300 throughout an area. For example, the drive system 320 can include a one or more wheels that when rotated by a motor or drive mechanism propel the electronic device. The motor can be provided power from one or more power sources such as (i) an electric motor supplied power from a battery, or fuel cell, (ii) an internal/external combustion engine powered by an onboard fuel source, (iii) a hydraulic/pneumatic motor powered by an above aforementioned power source, (iv) compressed air, (v) the energy harvester unit 350, and the like. One or more of the wheels can swivel to aid navigation or adjustment of yaw of the electronic device 300. One or more of the wheels can be provided rotational power individually aid navigation or adjustment of yaw of the electronic device 300.

The SLAM engine 330 generates a map of the area based on the received information from the sensors 310 (such as the Lidar sensor 312 and the radar sensor 314). The SLAM engine 330 also identifies the location of the electronic device 300 as its travels through an area. The SLAM engine 330 can also identify the pose of the electronic device 300. The pose can include both the heading and the location of the electronic device within the area. The pose can include the spatial world coordinates and heading direction. The SLAM engine 330 can identify the pose of the electronic device, build a map of the environment, and provide the direction and end location for the electronic device to move to along a corresponding path. FIG. 3B describes the SLAM engine in greater detail below.

The information repository 340 represents any suitable structure(s) capable of storing and facilitating retrieval of information (such as data, program code, or other suitable information on a temporary or permanent basis). The information repository 340 can represent the memory 160 of FIG. 1. The information repository 340 can be RAM or any other suitable volatile or non-volatile storage device(s). The information repository 340 can be persistent storage and contain one or more components or devices supporting longer-term storage of data, such as a ROM, hard drive, Flash memory, or optical disc.

In certain embodiments, the information repository 340 includes the generated map(s) of the area. The maps can indicate the boundary of the area as well as objects within the boundary. For example, if the electronic device 300 is an autonomous vacuum cleaner, the maps indicate the walls of each room, and furniture which is located throughout the room which the electronic device 300 is to avoid. Similarly, if the electronic device 300 is an autonomous lawn mower, the maps can indicate the boundary of the yard/lawn as well as areas to avoid such as flower beds, furniture, trees, and the like. In certain embodiments, previously generated maps within the information repository 340 can be updated as the drive system 320 maneuvers the electronic device 300 within an area, based on the information from the sensors 310, the SLAM engine 330, and previously generated maps.

The EHU 350 generates electricity to power one or more of the sensors 310. In certain embodiments, the EHU 350 is used to power the certain sensors of the sensors 310 in tandem with another power source, such as a main battery. The EHU 350 can include a set of parallel pipelines for generating energy via vibrations (from the environment itself as well as vibrations created as the electronic device travels within a given environment), solar, thermal, and radio frequency (such as a Wi-Fi hotspot) which can be stored for future use. In certain embodiments, a processor, such as the processor 140 of FIG. 1 can provide instructions when power from the battery or the EHU 350 is to provide power to which of the sensors 310.

In certain embodiments, the EHU 350 can provide locations within the map as to sources of ambient energy. For example, as the electronic device 300 travels through the environment the EHU 350 can detect large source of ambient energy, such as a Wi-Fi hot stop. The location of the ambient energy can be indicated in the map, to enable the electronic device 300 to travel to that location again to harvest energy. FIGS. 3D and 6A-6F describes the EHU 350 in greater detail below.

FIG. 3B describes the SLAM engine 330 of FIG. 3A. The SLAM engine estimates the pose (including location and orientation) of the electronic device 300 and maps (2D or 3D) the surrounding area given the current state and current measurements. The pose of the electronic device 300 is estimated based on the motion of the electronic device 300 obtained from one or more of the sensors 310, for example inertial measurement unit (IMU), wheel encoders, or vision sensors. Mapping is done based on range measurements obtained from a sensor like Lidar (such as the Lidar sensor 312), radar (such as the radar sensor 314), vision sensors (such as a camera), and the like. The range measurements are often organized as range scans (where range and intensity for given orientations are given) or point clouds (where the relative location of the detected ranges are given). The term range scans is often used throughout this disclosure however, it is noted that this disclosure can be extended to include point cloud or other representations of ranges as well.

One of the common solutions of SLAM involves performing localization based on the motion of the electronic device 300, followed by scan matching, followed by mapping the environment based on obtained location and range measurements. Scan matching refers to the matching of current range measurements to the already mapped points in order to correct the discrepancies in localization.

Some sensors, for example the Lidar sensor 312 and cameras, provide denser range measurements as compared to other sensors like the radar sensor 314. While Lidar is capable of providing 360 degree range measurements at every degree, radar can only provide sparse range measurements in a limited FOV. Additionally, the angular resolution and accuracy of a radar could also be worse than a Lidar scan. However, sensors like radar are capable of detecting multiple ranges in a given direction. That is, radar sensors can obtain reflections from multiple objects in the same direction, thus enabling the detection of objects even behind the wall. Such capability is not possible to achieve using other sensors such as lidar, camera, and the like.

As illustrated in FIG. 3B, the sensors 310 provide information such as motion measurements and range measurements to the SLAM engine 330. The sensors 310 and the SLAM engine 330 of FIG. 3B can be the same or similar to the sensors 310 and the SLAM engine 330 of FIG. 3A. As illustrated, the SLAM engine 330 includes a location 332 and a mapping 334. The location 332 receives motion measurements from the sensors 310 (such as IMU, accelerometers, wheel encoders, and the like) and identifies the location of the electronic device within the environment. The mapping 334 receives range measurements from the sensors 310 (such as the Lidar sensor 312 and the radar sensor 314) and generates the map of the environment.

FIG. 3C illustrates a top view 302 and a side view 304 views of the electronic device 300. The top view 302 and the side view 304 include the Lidar sensor 312, the radar sensor 314, and wheels 322. The Lidar sensor 312 is located on the top surface of the electronic device while one or more radar sensors, such as the radar sensor 314 is mounted on the peripheral of the electronic device, such as the front surface of the electronic device. The front surface can be based on a driving direction 306. The driving direction 306 is based on the electronic device traveling in a forward direction. In certain embodiments, the lidar sensor 312 can scan a 360-degree FOV planar area. It is noted that since the Lidar sensor 312 is located on top of the electronic device 300, a portion of the area directly around the electronic device 300 can be occluded from its FOV, due to the height of the electronic device 300. The wheels 322 can be part of the drive system 320 of FIG. 3A. When the wheels 322 are rotated by a motor, the wheels 322 can propel the electronic device 300. In certain embodiments, one or more of the wheels can rotate or remain stationary in order for the electronic device to turn. In certain embodiments, for each obstacle surface detected by the Lidar sensor 312, a measurement point (range, azimuth) containing the range/distance between the obstacle surface and the Lidar sensor 312 and the corresponding azimuth angle of the obstacle surface with respect to the heading (such as the direction 306) of the electronic device 300 is generated.

FIG. 3D illustrates example block diagram of the EHU 350a in accordance with an embodiment of this disclosure. The EHU 350a can be similar to the EHU 350 of FIG. 3A.

The EHU 350a can be integrated with the SLAM engine 330 for autonomous localization, mapping and navigation. In certain embodiments, the EHU 350a includes sets of parallel pipelines for generating energy from ambient sources 362. The ambient sources 362 can include vibration, solar, thermal and radio-frequency (RF) energy, and the like. For example, a piezo transducer can generate energy based on vibrations. The vibrations can be from vibrations of the electronic device 300 as it travels throughout an area. A solar cell can generate energy based on a solar energy such as the sun. An opto-transducer can generate energy based on a thermal energy such as a heater. An antenna can generate energy from RF energy such as from a Wi-Fi hotspot.

The signal converters 364 in each pipeline converts the ambient energy into usable voltage using components such as AC-to-DC convertors and rectifiers. The signal conditioners 366 of each pipeline further filters the signal and provides quality metrics on the energy harvested and based on minimum and maximum voltage levels is then stored for further use. The generated energy can be stored in a storage

368 for future consumption as $V_{out}$, by one or more components (such as the sensors 310) of the electronic device 300.

In certain embodiments, the EHU 350*a* can include a processor such as microcontroller unit (MCU) 370. The MCU can be located within the EHU for low-latency response. The MCU 370 can include logic for switching between harnessed energy and a main battery. In certain embodiments, the MCU 370 outputs two enable signals En_MUX_OnSensor and En_MUX_AlwaysOnSensor. The signals are described in greater detail in FIGS. 6C and 6D, below. In certain embodiments, the MCU 370 also monitors the output of the signal conditioners 366. For example, when a sufficiently large amount of energy is harnessed in a particular location, then that location is stored in memory, such as the information repository 340 of FIG. 3A. The indicated location can be indicated in the Map Building stage of SLAM, such that the electronic device 300 can navigate to that area in the future to obtain energy from that source.

Although FIGS. 3A, 3B, 3C, and 3D illustrate electronic device 300 and radar signals various changes can be made to FIGS. 3A, 3B, 3C and 3D. FIGS. 3A, 3B, 3C and 3D do not limit this disclosure to any particular radar system or apparatus.

Figure 4A:
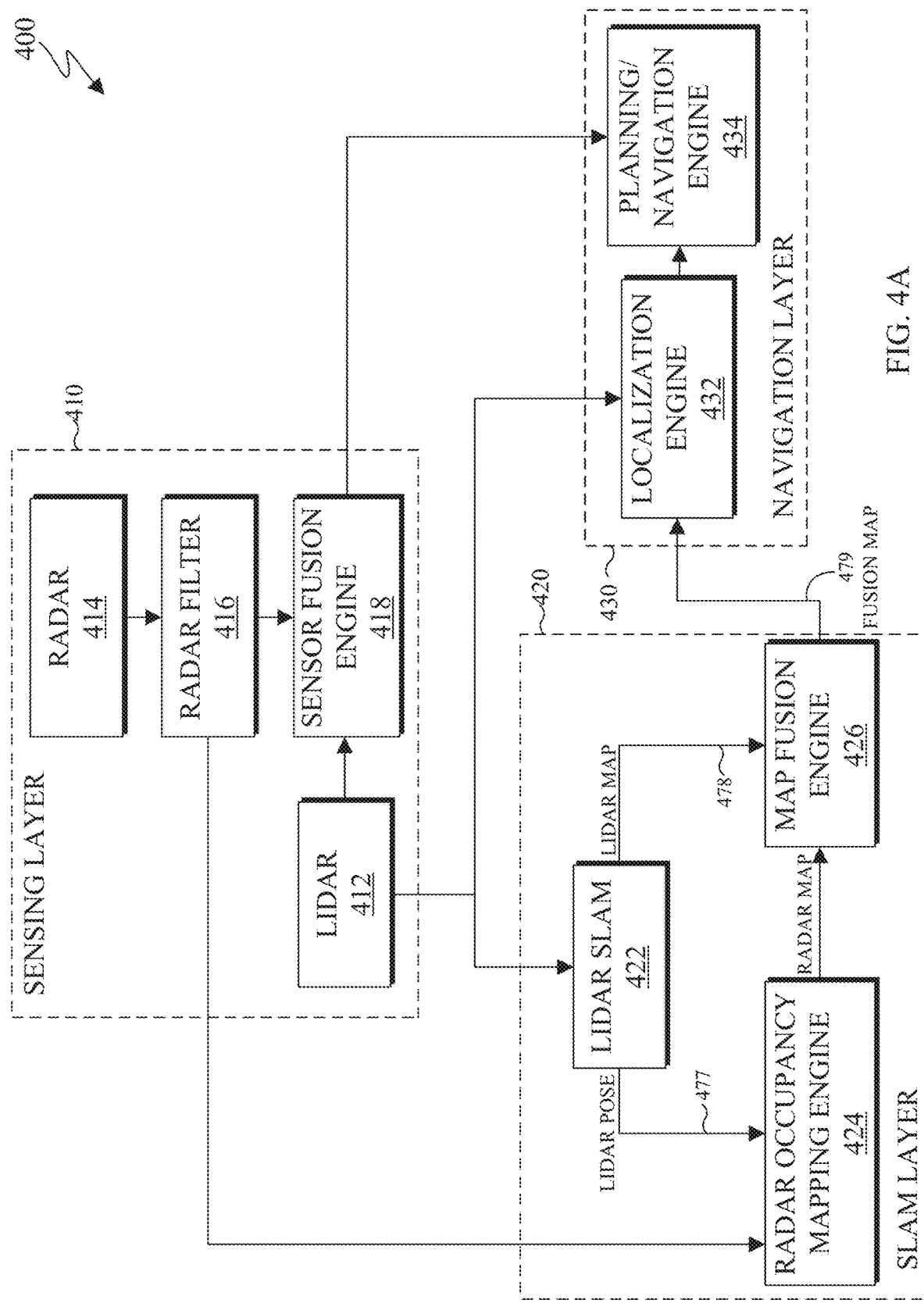
FIG. 4A illustrates an overall mapping and navigation system architecture in accordance with an embodiment of this disclosure.
Figure 4B:
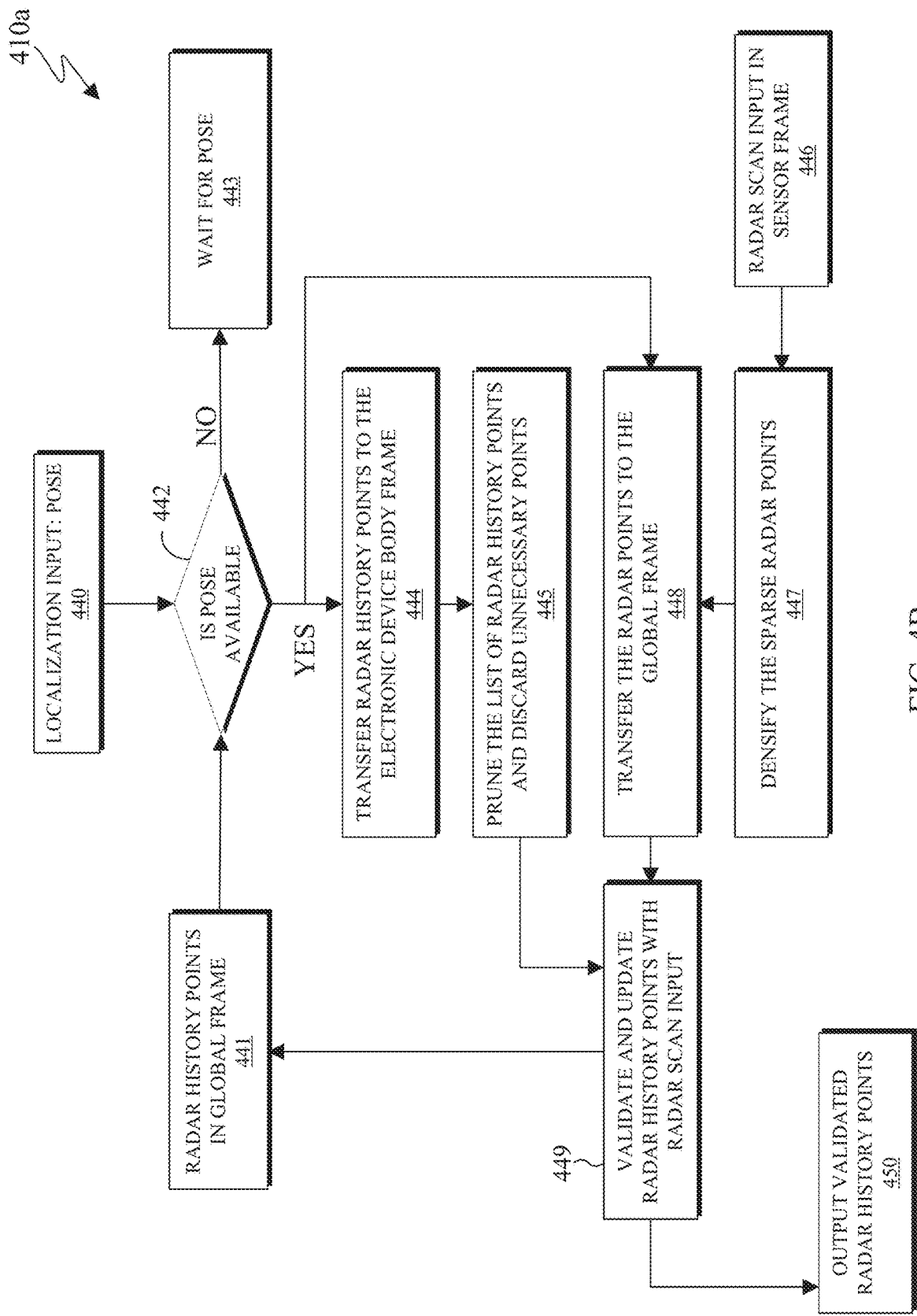
FIGS. 4B, 4C, 4D, 4E, and 4F illustrates various layers of the overall mapping and navigation system architecture of FIG. 4A in accordance with an embodiment of this disclosure.
Figure 4C:
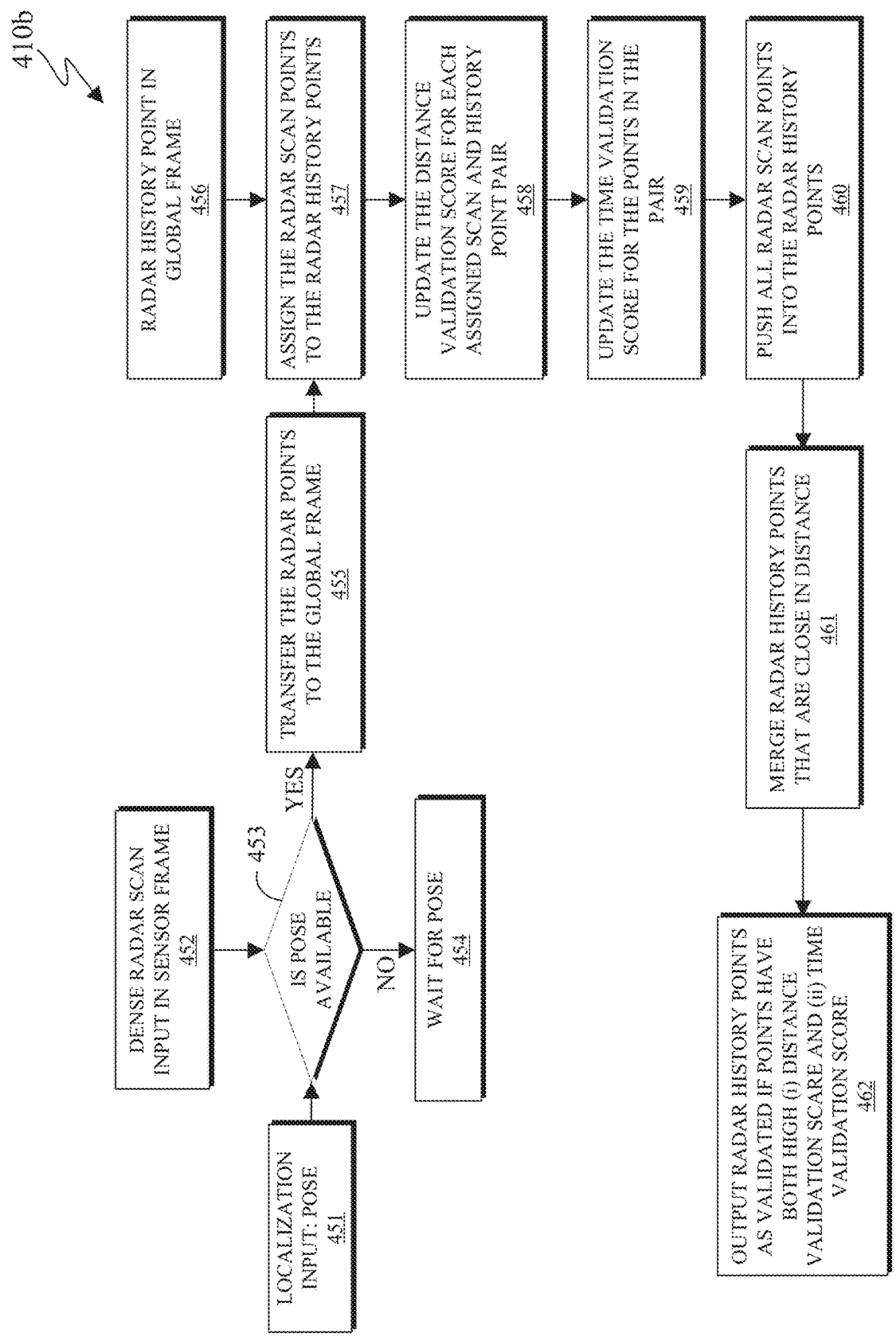
Figure 4D:
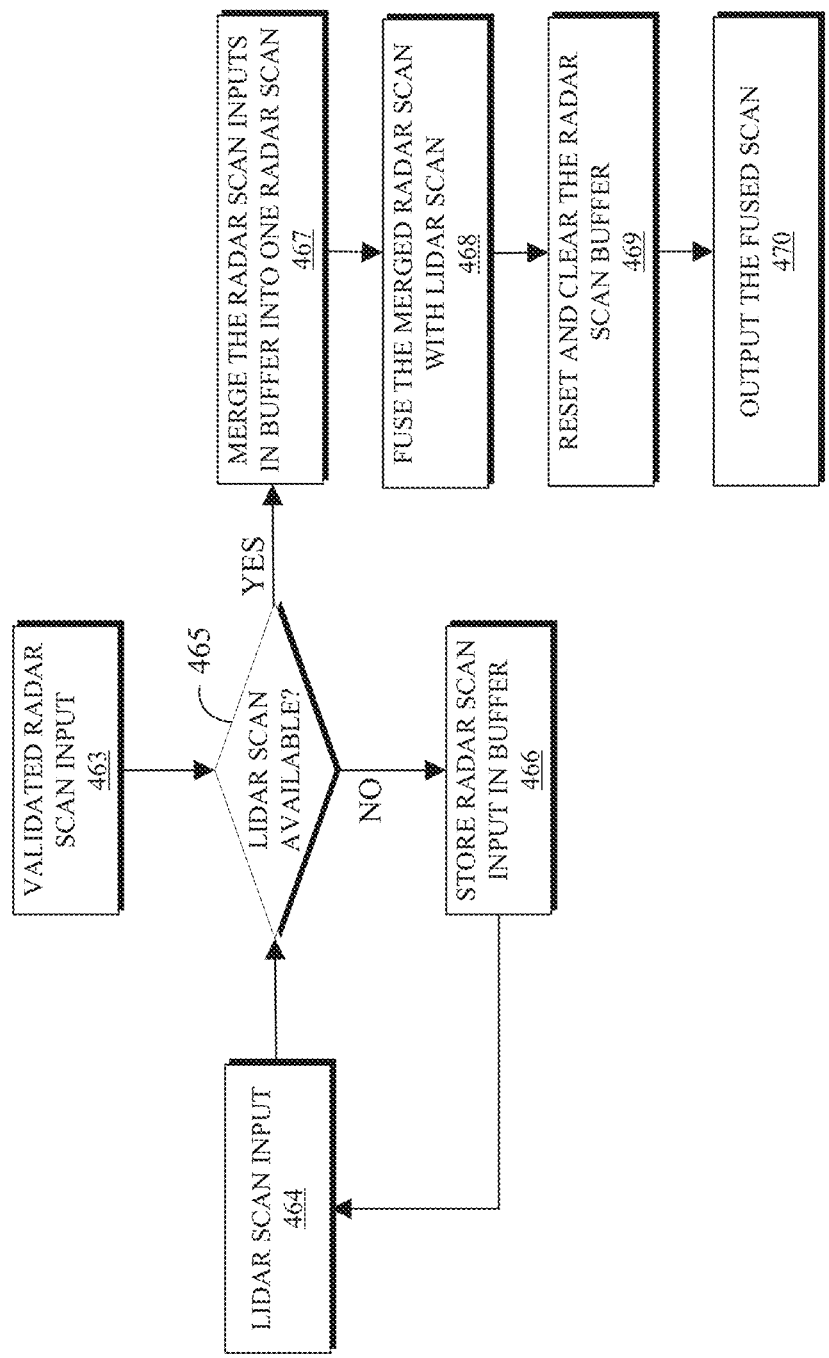
Figure 4E:
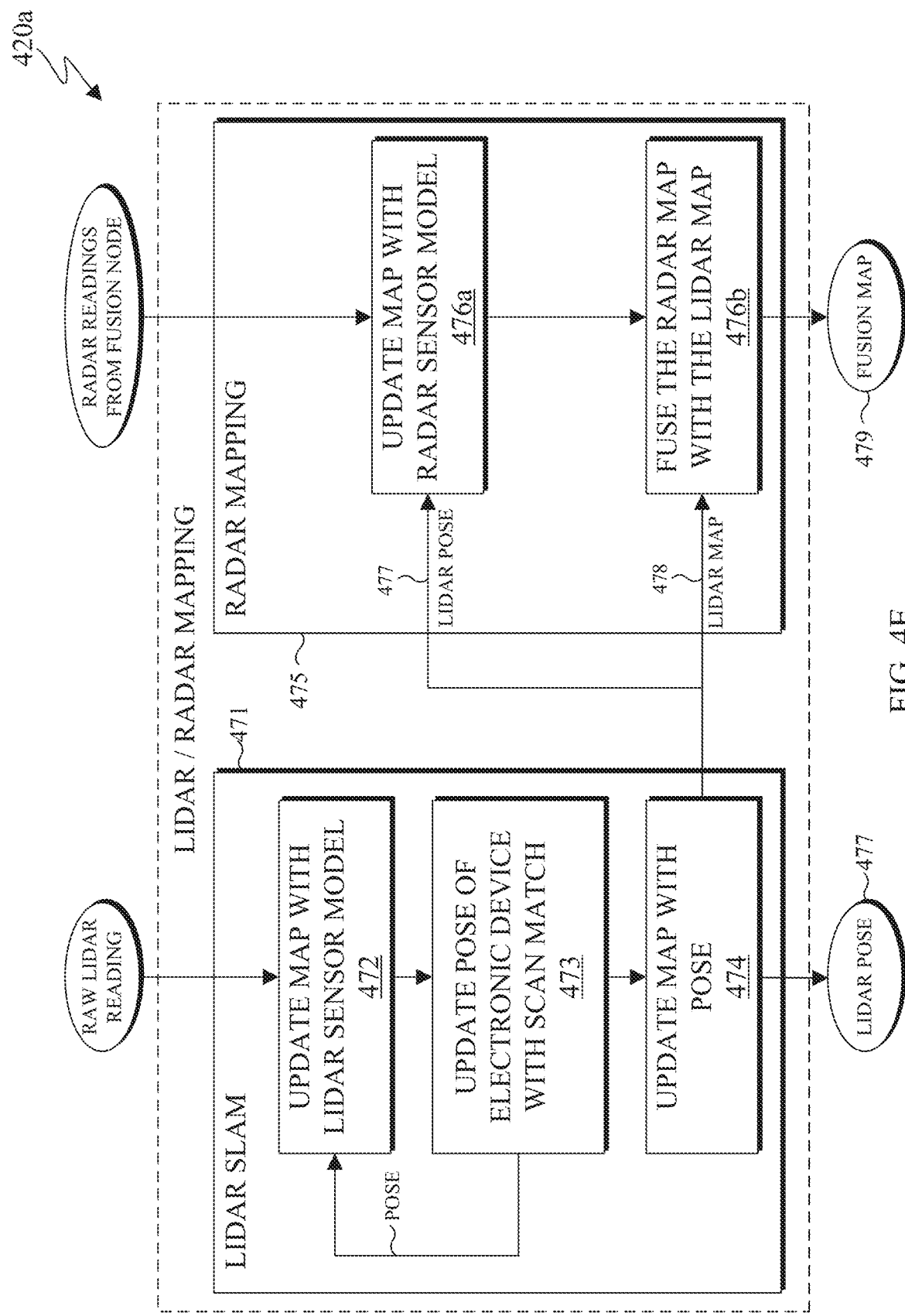
Figure 4F:
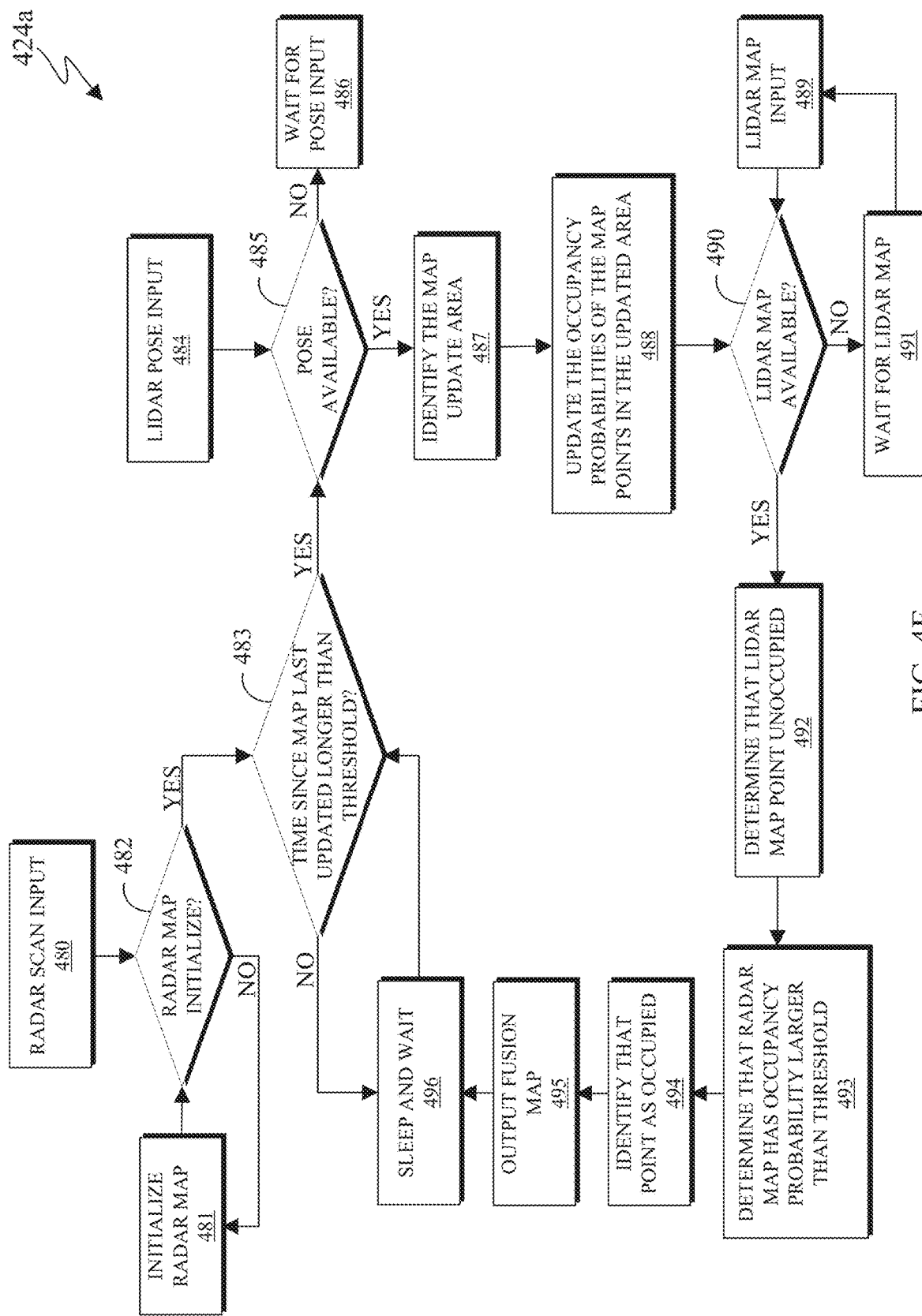

FIG. 4A illustrates an overall mapping and navigation system architecture 400 in accordance with an embodiment of this disclosure. FIGS. 4B, 4C, 4D, 4E, and 4F describe the various layers of the overall mapping and navigation system architecture of FIG. 4A in accordance with an embodiment of this disclosure. In particular, FIG. 4B illustrates a flowchart 410*a* for filtering radar signals. FIG. 4C illustrates a flowchart 410*b* for a validation step of the flowchart 410*a*. FIG. 4D illustrates the flowchart 410*c* for sensor fusion. FIG. 4E illustrates an architecture 420*a* of Lidar based SLAM with radar aid. FIG. 4F illustrates the flowchart 424*a* for radar mapping. The steps of the flowcharts 410*a*, 410*b*, 410*c*, and 424*a*, as well as the architectures 400 and 420*a* can be performed by the electronic device 100 of FIG. 1, the electronic device 200 of FIG. 2, or the electronic device 300 of FIGS. 3A and 3C. The embodiments of FIGS. 4A-4F are for illustration only and other embodiments can be used without departing from the scope of the present disclosure.

According to embodiments of the present disclosure, an autonomous electronic device, such as the electronic device 300 of FIGS. 3A and 3C navigates an environment while avoiding any collisions with obstacles or boundaries (like walls). In order to perform such a task, the electronic device generate a map of boundaries and obstacles in the environment from some range sensor data (such as from the Lidar sensor 312 and the radar sensor 314) as the electronic device 300 travels and simultaneously localizes itself at any location in the map, such as SLAM. Additionally, after the map is generated the electronic device 300 can perform a navigation goal in the map, by autonomously planning a path toward the goal and drive itself following the path.

As described above, in certain embodiments, the electronic device 300 includes at least two sensors, such as a Lidar sensor 312 and the radar sensor 314 of FIG. 3A. The Lidar sensor can scan the boundaries and obstacles with 360-degree FOV, and radar sensors which scan a 3-dimensional area in front of its antenna array with a limited FOV. In certain embodiments, the Lidar sensor includes a 2-dimensional (2D) scanning area, the Lidar sensor is unable to detecting obstacles below the clearance level to which the Lidar sensor is mounted. Additionally since Lidar uses reflected light beams to detect obstacles, a Lidar sensor is unable to consistently detect transparent objects, such as a glass wall. In certain embodiments, the radar sensor 314 can detect obstacles only in a limited FOV and is therefore unaware of the environment outside its FOV. Radar sensors can also indicate false (non-existing) obstacles if the radar sensor flickers while inspecting its FOV within the area. Therefore due to the limitations of a Lidar sensor and a radar sensor, embodiments of the present disclosure provide systems and methods for combining the data from both sensors to overcome any limitations of a Lidar sensor and a radar sensor. Accordingly, embodiments of the present disclosure provide systems and methods for combining data from a Lidar type sensor and a radar type sensor to perform SLAM and navigation tasks.

As described in FIGS. 4A-4F below, an electronic device (such as the electronic device 300 of FIGS. 3A and 3C) using two types of sensors, such as a Lidar sensor and a radar sensor, can generate a map and perform navigation within the map. For example, the electronic device can generate a noise filtered 360 degree FOV radar scan from the data of a single radar sensor. The electronic device is also able to fuse the Lidar and radar scans. The electronic device can also perform a lidar based SLAM task with the aid of radar.

The architecture 400 of FIG. 4A includes three layers, a sensing layer 410, a SLAM layer 420, and a navigation layer 430. It is noted that the flowcharts 410*a*, 410*b*, and 410*c* of FIGS. 4B, 4C, and 4D, respectively, describe the sensing layer 410 in greater detail. Similarly, the architecture 420*a* of FIG. 4E describes the SLAM layer 420 in greater detail and the flowchart 424*a* of FIG. 4F describes the radar occupancy mapping engine 424 of the SLAM layer 420 in greater detail.

The sensing layer 410 of FIG. 4A processes the real-time sensor data from the Lidar sensor 312 and the radar sensor 314. The SLAM layer 420 performs the SLAM task using the processed sensor data from the sensing layer 410 In certain embodiments, the SLAM layer 420 generates a fusion map before navigation tasks are performed. The navigation layer 430, performs the navigation task with the processed sensor data from the sensing layer 410 and the fusion map from the SLAM layer 420.

In particular, the sensing layer 410 obtains two inputs, Lidar measurements 412 (from the lidar sensor 312) and raw radar signals 414 (from the radar sensor 314). The sensing layer 410 also includes a radar filter 416 and a sensor fusion engine 418. The sensing layer 410 performs two functions. First, the sensing layer 410 filters the raw radar signals (measurements) 414. The radar filter 416 receives the raw radar signals 414 as the input and generates a 360-degree FOV radar scan by filtering possible noise and false alarms from the input. Second, the sensing layer 210 combines the 360-degree FOV radar scan with the Lidar measurements 412 via the sensor fusion engine 418.

The SLAM layer 420 performs the localization and generates (or builds) a fusion map to be used by the navigation layer 430. The SLAM layer 420 performs the task of Lidar-based SLAM with radar aid. The SLAM layer 420 includes Lidar SLAM 422, a radar occupancy mapping engine 424, and a map fusion engine 426. The Lidar SLAM 422 uses the Lidar scan from the sensing layer 410 to generate a Lidar map and a Lidar pose for localization of the electronic device 300. The radar occupancy mapping engine 424 generates a radar map using the Lidar pose and the filtered radar scan from the Radar filter 416 of the sensing layer 410. radar occupancy mapping engine 424 is described in in greater detail below in FIG. 4F. The radar map and the Lidar map 478 are then combined into a fusion map 479, via the map fusion engine 426. The map fusion engine 426 can be an online map fusion. The generated fusion map 479 is used when the electronic device 300 performs a navigation task of the navigation layer 430.

The navigation layer 430 performs the navigation using the sensor data from the sensing layer 410 and the fusion map generated by the SLAM layer 420. The navigation layer 430 includes a localization engine 432 and a planning/navigation engine 434. The localization engine 432 localizes the electronic device 300 in a map generated by the SLAM layer by matching the Lidar scan data with the obstacles in the map. The planning/navigation engine 434 receives a navigation goal, the map in which the electronic device 300 is operating (generated by the SLAM layer 420), and the pose of the electronic device 300 in the map (from the localization engine 432). The planning/navigation engine 434 identifies a path to accomplish navigational goal while avoiding obstacles that are already presented in the map and/or detected by the sensors in real-time as the electronic device travels the path. As the electronic device 300 automatically follows the path and move to the goal, the path is re-planned whenever the electronic device 300 detects any new obstacles that may leads to a collision if the electronic device 300 continues following the current path. The electronic device 300 performs real-time obstacle detection with the fused scan data from the sensor fusion engine 418. In certain embodiments, the navigation task of the planning/navigation engine 434 terminates when either the electronic device 300 arrives to its goal or when there is no available path for the electronic device 300 to reach its goal.

As discussed above, the flowcharts 410a, 410b, and 410c of FIGS. 4B, 4C, and 4D, respectively, describe the sensing layer 410 in greater detail. The flowchart 410a of FIG. 4B describes the radar filter 416 of FIG. 4A. Over a period of time the radar filter 416, of FIG. 4A, stores and updates a list of the history radar scan points in a fixed global coordinate frame (step 441). It is noted that a radar scan point is defined as a collection of target detection results from the radar sensor 314. The global coordinate frame can be constructed in a user-defined way. For example, the global coordinate frame can be constructed from the map coordinate frame when the electronic device 300 performs the SLAM task. The history of radar points may include points both inside and outside the current radar FOV, and therefore can be used to generate a 360-degree FOV radar scan.

The radar filter 416 filters the radar scan points to reduce noise and false alarms (falsely detecting the presence of object). First, the radar filter 416 updates its list of point once it receives two inputs that of (i) the localization input of step 440 (such as the pose) and (ii) the raw radar measurement points in the sensor coordinate frame of step 446. In certain embodiments, the pose (of the localization input of step 440) can be obtained from the SLAM localization output, or from the localization engine 432 in the navigation layer 430. The localization engine 432 of the navigation layer 430 may be a subset of the Lidar SLAM in the SLAM layer or may be a completely independent. In step 442, the electronic device 300 determines whether the pose is available based on the input of step 440. If the pose is not available, then in step 443 the electronic device 300 aborts the radar filtering 416 and waits for the pose of the electronic device. If the pose is available, the electronic device, in step 444 transfers all of the radar history points from the global frame (of step 441) to the electronic device 300 frame.

Each point in the list of history radar scan points is copied and transformed from the global frame to the electronic device 300 frame using the pose of the electronic device (step 444). The transformed copy of the point is used to determine whether the point needs to be discarded based on multiple criteria (step 445). For example, if the distance between the point and the electronic device 300 exceeds a maximum distance threshold, the point will be discarded. For another example, if the point has not been validated by any new measurements while it is inside the radar FOV for a given time period, the point will be discarded. Discarding certain points based on the criteria removes noise and false alarm points from the point list, and it also improves the decreases the memory size.

In step 447, the input raw radar measurement points (of step 446) can be optionally densified via interpolation and extrapolation (in step 447). Since raw radar measurements are usually sparse given limitations on the range and angular resolution, as well as the field of view, the densifying process of the step 447 increases the point density for the given area.

It is noted that due to the densifying the sparse radar points, the radar may not accurately know obstacle shapes, which could downgrade the SLAM and navigation performance. For example, the densifying process can be described as interpolating the range data of two measurement points if the two points satisfy two conditions: (i) the two points are close enough to each other and (ii) there are no other measurement points between the azimuth angles of the two points. Then in step 448, the densified radar points are transferred from the sensor coordinate frame to the global coordinate frame using the pose of the electronic device. After the densified radar points are transferred from the sensor coordinate frame to the global coordinate frame the points are then used to validate and update the list of radar history points in step 449. For example, the manipulated points (of step 446, 447, and 448) and the pruned lust of radar history points (step 445) are validated (in step 449). In step 449, the electronic device 300 validates and updates the radar history points with the radar scan input from step 446.

After the validation and update, the new radar history points may be marked as either 'validated' or 'not validated.' While all the points will be stored in the point list for the next iteration, regardless of their validation status, only the 'validated' points are used to generate the output (step 450). The output uses the same data structure as is used by the Lidar and Radar, such as a list of (range, azimuth) measurement points.

The flowchart 410b of FIG. 4C provides additional details to the validation process of step 449 of FIG. 4B. For example, each radar history point uses two validation scores to determine whether the point represents detection from an obstacle surface or noise (false alarm). If both validation scores are sufficiently high, then the radar history point is marked as validated and used to generate the out of the radar filter 416. The validation process as described in FIG. 4C determines the validation scores over time.

The electronic device 300 when performing a method as described by the flowchart 410b receives in step 452 a dense radar scan input in the sensor frame, which can be the same input from the steps 446 and 447 of FIG. 4B. Additionally, the electronic device 300 in step 451 receives the localization input, such as a pose, which can be the same input as step 440 of FIG. 4B. After receiving the localization input (of step 451) the electronic device 300 determines whether the pose is available (step 453). If the pose is not available then the electronic device, in step 454 aborts and waits for the pose. If the pose is available, then in step 455 the electronic device transfers the densified radar scan points (which was received in step 452) to the global frame. The step 455 of FIG. 4C is similar to the step 448 of FIG. 4B.

In step 456, the electronic device 300 identifies the radar history point in a global frame. The step 456 of FIG. 4C is similar to the step 441 of FIG. 4B. Given a list of radar history points (from step 456) and a densified incoming radar scan points in the global frame (based on step 455), both in the global coordinate frame, a data association step is taken to assign the scan points to the radar history points (step 457). For example, in step 457 the electronic device 300 assigns the radar scan points to the radar history points. The purpose of the data association, of step 457, is to pair an incoming scan point with a radar history point if the two points are believed to represent the detection of the same obstacle surface (in which case the two points are defined as 'associated'), or store an incoming scan point as a new point if it is not associated with any point in the list of radar history points.

In certain embodiments, the data association is performed by first calculating an association score for each pair of scan point and radar history point. The association score describes how closely the two points are associated. For example, the closer the two points, the higher the association score and vice versa.

The association score can be calculated from the Euclidean distance between the two points, or from probability likelihood functions. The Euclidean distance is the physical distance in the global coordinate frame. If the association score is sufficiently high, then the incoming scan point is considered to be associated with the radar history point. An incoming scan point may be associated with multiple radar history points, with a single radar history point, or none of the radar history points. If an incoming scan point is associated with at least one radar history points, the data step 457 picks the association which results in the highest association score.

For each associated pair of incoming scan point and radar history point (of step 457), the two validation scores of both the points are updated. Step 458 updates a first validation score based on distance and in step 459 a second validation score is updated based on time. The distance validation score, of step 458 is updated using association score. The time validation score, of step 459 is a counter initialize with 0, is counted once. The two validation scores, combined together, can be interpreted as the number of times a radar history point is associated with incoming scan points as well as its proximity to the associated points. Since the noise/false alarm points from the radar sensor are generally scattered (and have a low distance validation score) and flickering (have low time validation score), a radar history point which has both scores high is believed to be a validated point.

In step 460 all of the radar scan points are pushed into the radar history point. For example, regardless of the association and validation scores, all incoming scan points are added to the radar history point list. In step 461 if any points in the new list are sufficiently close in distance, these points are merged by a single point. Merging points that are near each other reduces the size of the list. In step 462, the merged list becomes the updated list of the radar history points for the next iteration, while all the points in the list whose validation scores are both sufficiently high are output as the filtered radar scan.

The flowchart 410c of FIG. 4D describes the sensor fusion engine 418 of the architecture 400 of FIG. 4A. The flowchart 410c generates a fusion map by combining the 360-degree radar scan with the lidar measurements.

The flowchart 410c obtains two inputs. The first input is the validated radar scan input (step 463) which can be obtained from the radar filter 416 as described in FIGS. 4B and 4C. The second input is the Lidar scan input (step 464). The lidar scan input of step 464 can be the Lidar measurements 412 of FIG. 4A from the lidar sensor 312 of FIGS. 3A and 3C. In step 465 the electronic device determines whether the lidar scan is available. If the Lidar scan is not available, then in step 466 the electronic device 300 stores the radar scan input (from step 463) in a buffer. After storing the radar scan input (from step 463) in a buffer, the electronic device 300 waits for the lidar scan input of step 464.

When the Lidar scan input (step 464) is available, the electronic device, in step 467 combines the validated radar scan (radar scan output from the radar filter 416) with the Lidar scan input of step 464. That is, the electronic device 300 merges the radar scan input of step 463 in the buffer into a single radar scan. For example, as soon as a new Lidar scan arrives, all the buffered radar scans can be first merged into one single radar scan (step 467). Then in step 468, the electronic device 300 generates a fused scan that covers all the obstacle surfaces detected by both the Lidar and the radar, particularly the obstacles surfaces that are missing from the Lidar detection, such as low clearance or transparent obstacles (which are likely to be detected by the Radar). That is, the electronic device 300 fuses the merged radar scan (of step 467) with the Lidar scan. In certain embodiments, the merge of step 468 is performed by averaging the ranges of the radar points in the buffer whose ranges are close and azimuth angles are the same. In certain embodiments, a typical process of performing the fusion is that for each azimuth angle, the electronic device 300 selects the closer range data from either the radar scan or the Lidar scan, since the closer obstacle surface needs immediate attention.

Since the two sensors (Lidar sensor 312 and radar sensor 314) could publish sensor data at different rates, the sensor fusion engine 418 buffers the data from the higher-rate sensor while waiting for the data from the lower-rate sensor. As described in the flowchart 410c the radar sensor 314 higher-rate sensor and the Lidar sensor is the lower-rate sensor. In certain embodiments, if the Lidar sensor is the higher-rate sensor, then the Lidar scans are stored in the buffer while waiting for the data from the radar sensor.

In step 469 the radar scan buffer is then cleared and reset for the next iteration. Thereafter, fused scan is output in step 470. The generated fused scan can be used by the planning/navigation engine 434 of the navigation layer 430.

The architecture 420a of FIG. 4E describes the SLAM layer 420 of FIG. 4A. The architecture 420a of FIG. 4E expands the SLAM layer 420 of FIG. 4A. As described above, the SLAM layer 420 includes three functions to performs the task of Lidar-based SLAM with radar aid. The Lidar SLAM 422 can be a function that uses the Lidar scan from the sensing layer to generate a Lidar pose 477 and a Lidar map 478 for localization of the electronic device 300. The radar occupancy mapping engine 424 generates a radar map using the Lidar pose and the filtered radar scan from the radar filter 416 of the sensing layer 410. The radar map (generated by the radar occupancy mapping engine 424) and the Lidar map (generated by the Lidar SLAM 422) are then combined into a fusion map 479 by the map fusion engine 426. The fusion map is used when the electronic device 300 performs navigation tasks of the navigation layer 430.

As illustrated, the architecture 420a includes a Lidar SLAM component 471 and a radar mapping component 475. The Lidar SLAM component 471 corresponds to the Lidar SLAM 422 of the SLAM layer 420 of FIG. 4A. The Lidar SLAM component 471 generates a Lidar map 478 and a Lidar pose 477. In certain embodiments, the Lidar map is a grid map with predetermined size (number of grids) and resolution (size of each grid). Each map grid stores one of the three states: occupied, un-occupied and unknown. The occupied and unoccupied states imply whether the grid is filled with obstacles or not, while the unknown state means that it is undecided whether the grid is occupied or not. For example, an occupied state indicates that the grid includes an obstacle, while an unoccupied state indicates that the grid does not include an obstacle. The unknown state can be assigned to a grid that has not yet been visited.

Over time, the Lidar SLAM component 471 uses raw Lidar readings from Lidar sensor 312 to obtain Lidar measurements 412 to generate a Lidar map 478 and a Lidar pose 477 in three steps. In step 472 the map is first updated with the Lidar scan and the pose from previous iteration. In step 743, The pose is then updated by matching the Lidar scan with the current Lidar map. In step 474, both the map and the pose are then further updated simultaneously once.

The radar mapping component 475 encapsulates the radar occupancy mapping engine 424 and the map fusion engine 426 of FIG. 4A. In step 476a a radar map is generated. The radar map is a grid map that shares the same size and resolution as those of the Lidar map 478. Each grid stores an integer. In certain embodiments, the integer can range from 0 to 100, that represents the occupancy probability. The occupancy probability is the probability that the grid is occupied. In step 476b, the radar map and the Lidar map are then combined into one fusion map as the fusion map 479. The fusion map 479 is output top the navigation layer 430 of FIG. 4A.

The flowchart 424a of FIG. 4F describes the radar occupancy mapping engine 424 of the architecture 400 of FIG. 4A. The flowchart 424a generates the radar map.

In step 480, the radar occupancy mapping engine 424 receives filtered radar data from the radar filter 416 of FIG. 4A. In step 482, the radar occupancy mapping engine 424 determines whether the radar map is initialized. If the radar map is not initialized, then in step 481, radar occupancy mapping engine 424 initializes the radar map. In certain embodiments, the Radar map is initialized using the same size and resolution as those of the Lidar map. In step 483, the radar occupancy mapping engine 424 determines whether the time that has elapsed since the map was last updated is longer than a threshold. Upon determining that the time that has elapsed since the map was last updated is less than the threshold, in step 496 the radar occupancy mapping engine 424 sleeps and waits.

Once for every given time period, the radar map is updated with the latest radar scan input, which is the 360-deg FOV radar scan output from the radar filter. In addition, it is only updated when a robot pose is available from Lidar SLAM.

The radar map is updated using a two-step process. First, an update area is computed using the robot pose. For example, in step 485 the radar occupancy mapping engine 424 determines whether the Lidar pose input 484 is received. If the Lidar pose input 484 is not received, then in step 486 the radar occupancy mapping engine 424 waits for the pose input. Upon receiving the pose input, in step 487 radar occupancy mapping engine 424, identifies the updated map area. The update area is an area in the map which requires attention and where the sensor data is most reliable. For example, the update area can be the area within a predefined radius around the electronic device. In step 488, the radar occupancy mapping engine 424 updates the occupancy probabilities of the map points in the updated area. For example, instead of updating the entire map area, only the update area is updated. By updating only the updated area can reduce the computational cost without losing much accuracy of the map. The occupancy probability of each grid in the update area is then updated using the radar scan data.

The updated radar map is then fused with the latest Lidar map. In step 490, the radar occupancy mapping engine 424 determines whether the Lidar map is available. If the Lidar map is not available, then in step 491 the radar occupancy mapping engine 424 waits for the Lidar map. Upon receiving the Lidar map as an input in step 489, the radar occupancy mapping engine 424 determines whether the Lidar map point is unoccupied. For an unoccupied point, the radar occupancy mapping engine 424 determines whether the radar map point has an occupancy probability that is larger than a threshold (step 493). For example, for each grid in the Lidar map that is marked as un-occupied, the occupancy probability of the corresponding grid in the radar map is checked. If the occupancy probability is larger than a threshold, the grid will be marked as occupied (step 494). The map fusion marks obstacles unseen by the Lidar (in the un-occupied grids) with the radar. The fused map is published by the radar occupancy mapping engine 424 as output in step 495, and the radar map is stored for next update iteration.

Although FIGS. 4A-4F illustrates example flowcharts, various changes may be made to FIGS. 4A-4F. For example, while shown as a series of steps, various steps in each figure could overlap, occur in parallel, occur in a different order, or occur multiple times. In another example, steps may be omitted or replaced by other steps.

Figure 5A:
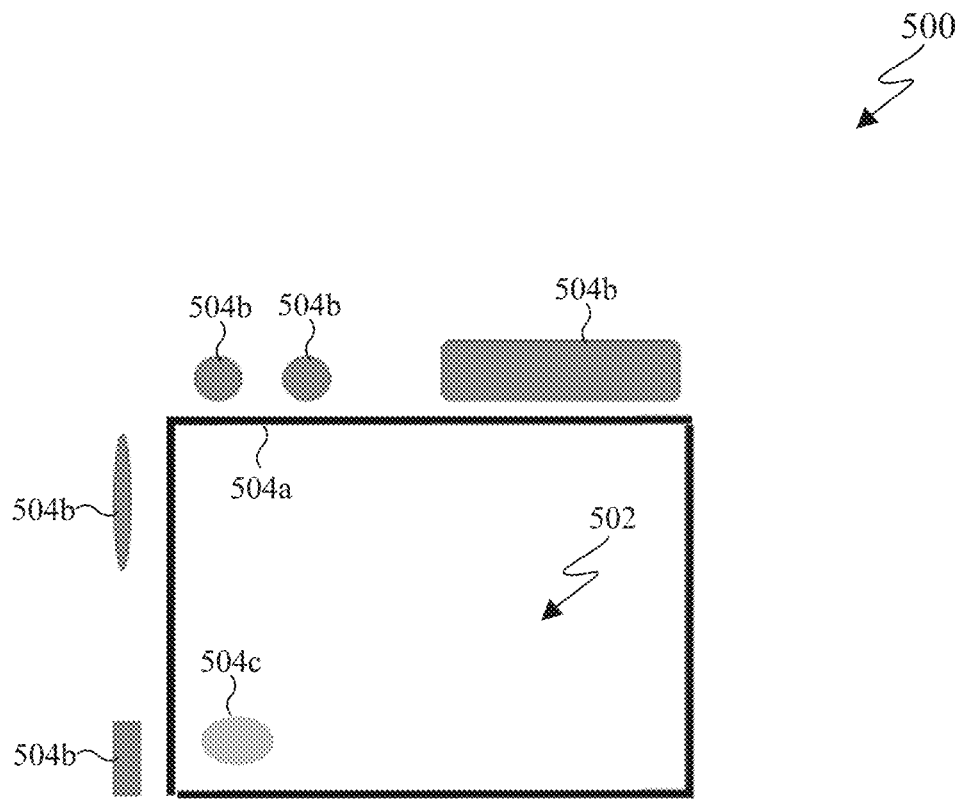
FIG. 5A illustrates an example environment and range azimuth heap map based on a radar signal of the objects within the environment in accordance with an embodiment of this disclosure.
Figure 5A:
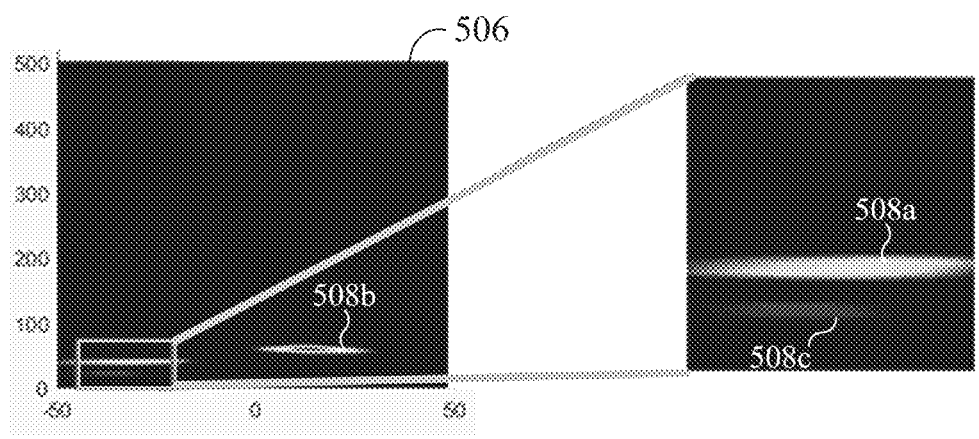
Figure 5B:
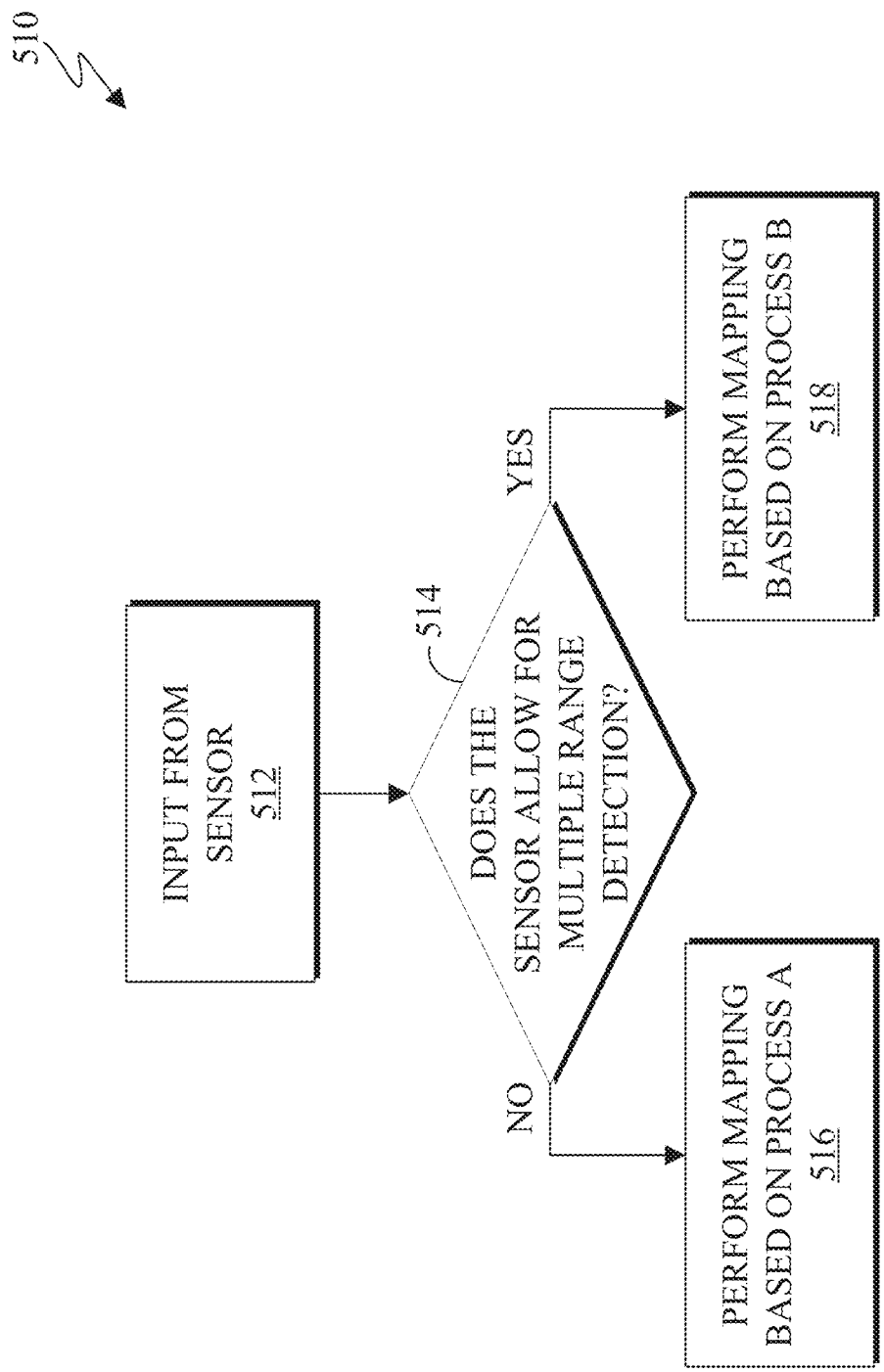
FIG. 5B illustrates an example flowchart for determining, based on a received sensor input, whether to perform multi-range detection in accordance with an embodiment of this disclosure.
Figure 5C:
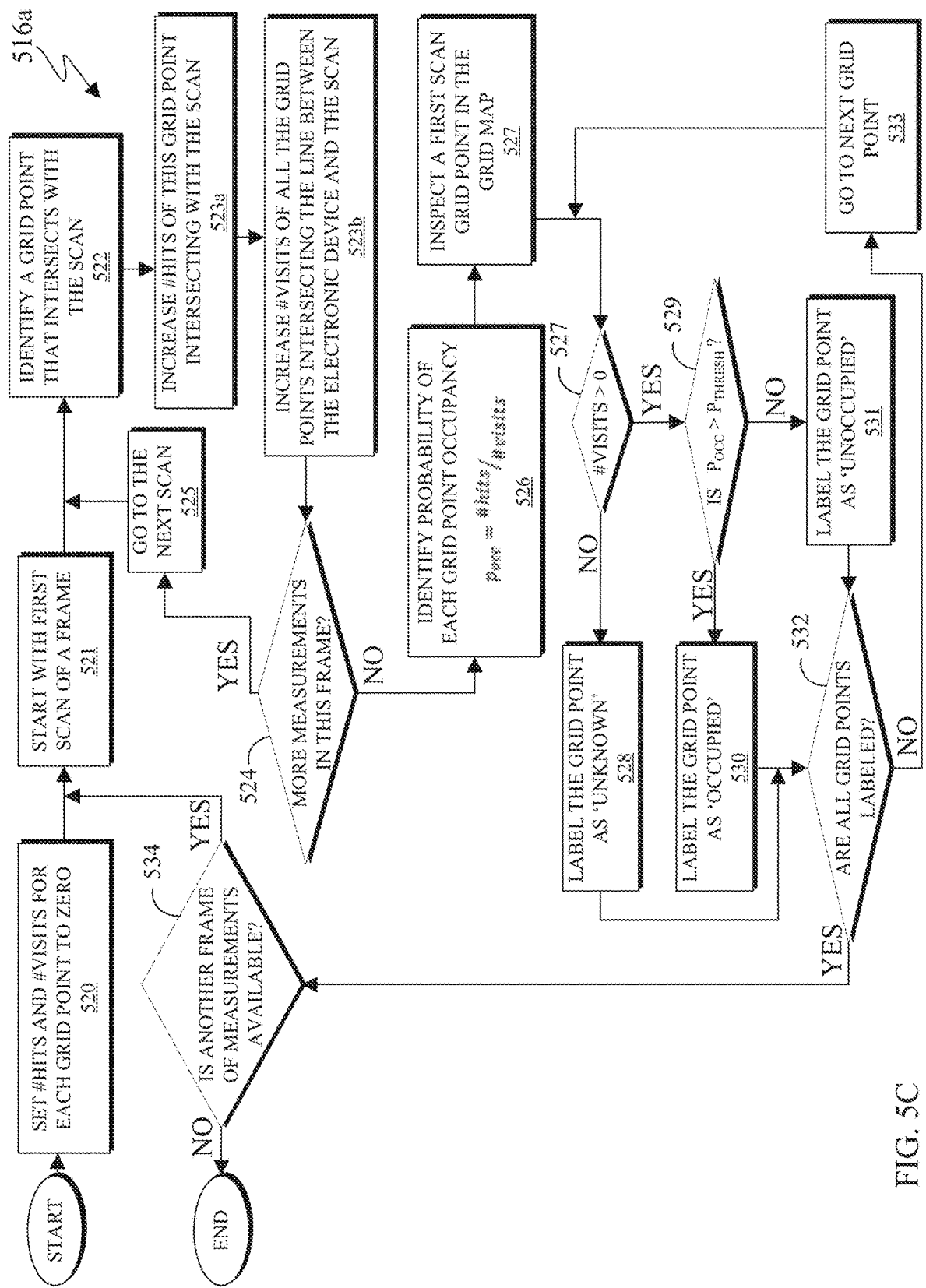
FIGS. 5C and 5D illustrate example flowcharts for mapping a grid using a single range per direction in accordance with an embodiment of this disclosure.
Figure 5D:
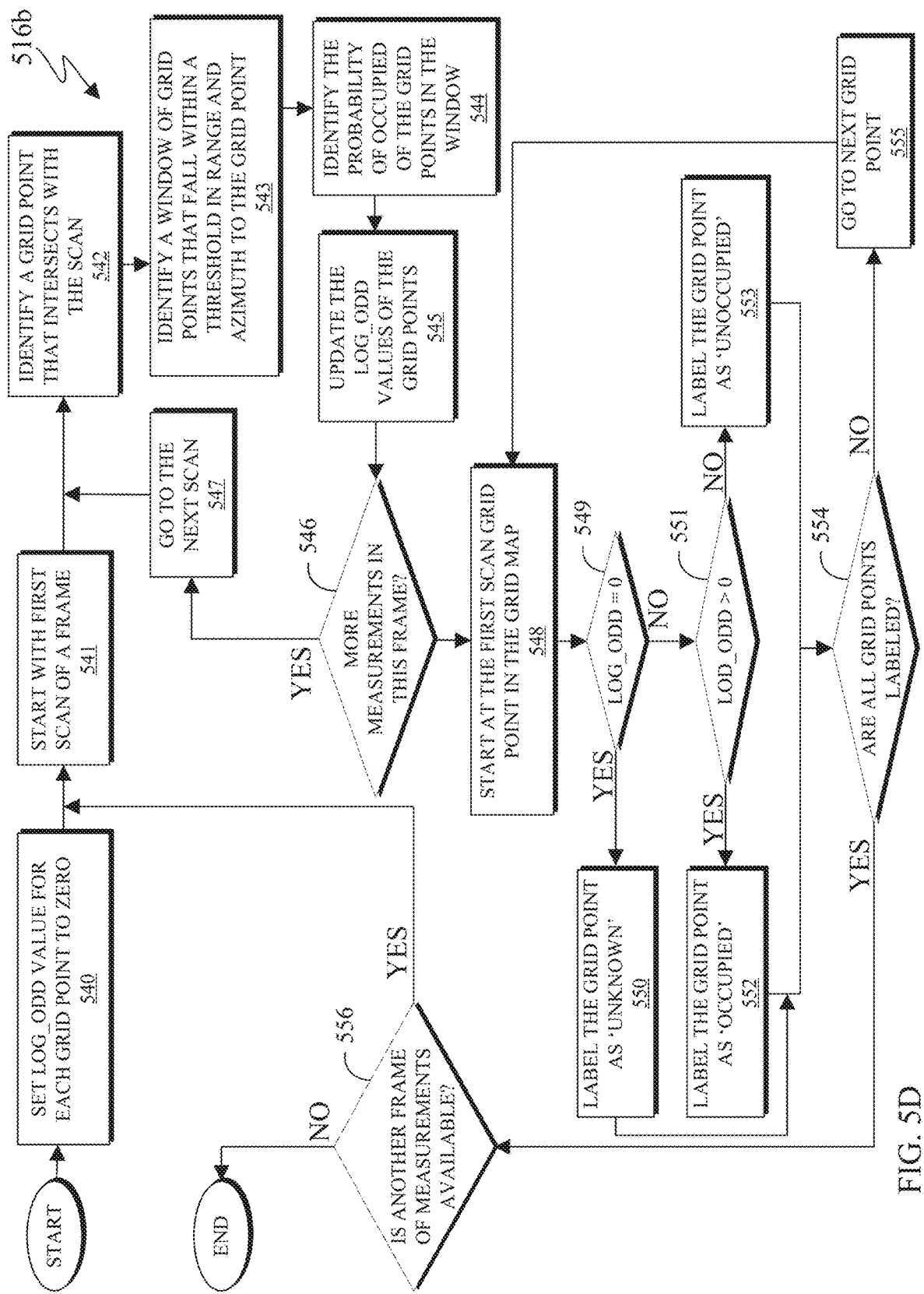
Figure 5E:
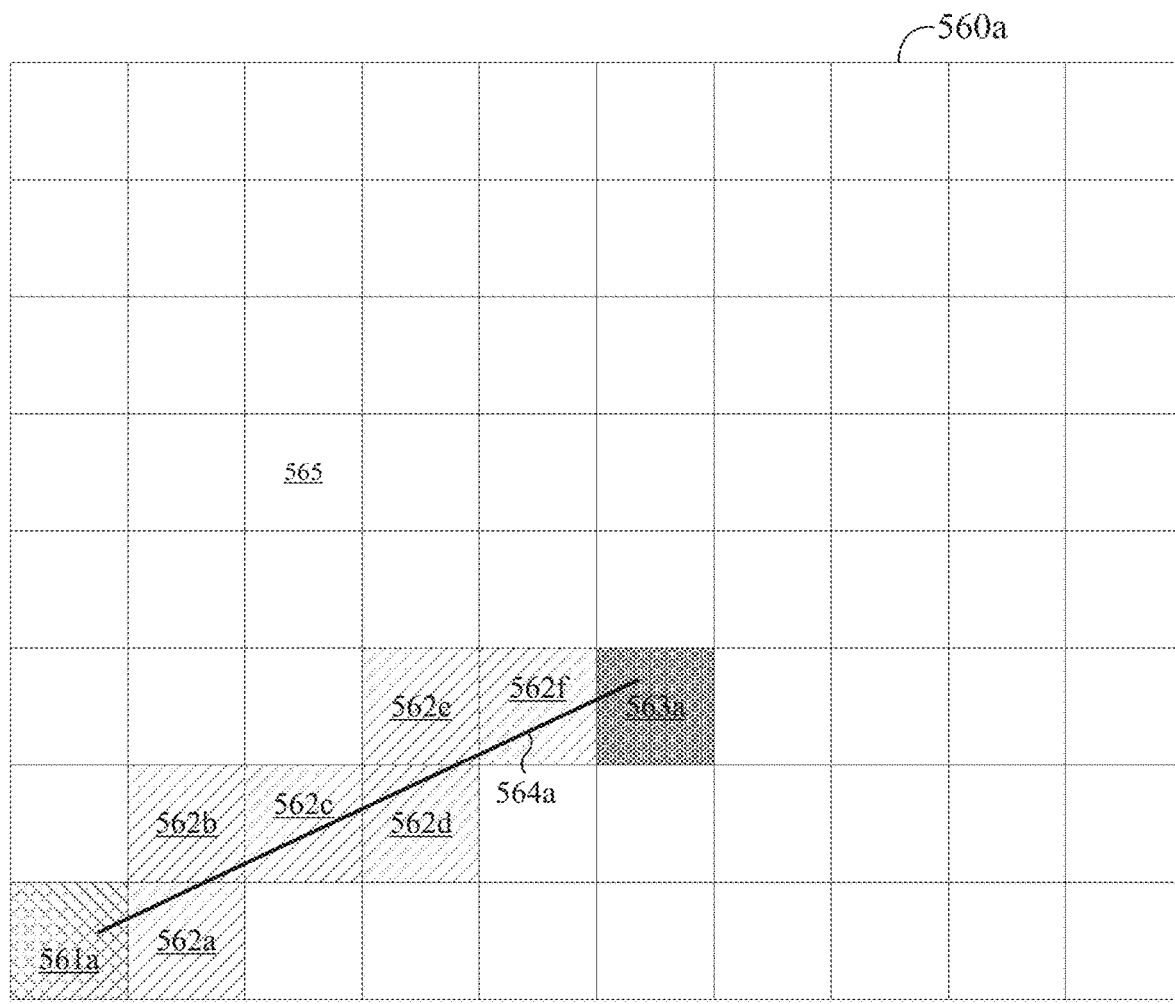
FIG. 5E illustrate example diagram of a grid of an area which uses a single range per direction to identify an object within an environment in accordance with an embodiment of this disclosure.
Figure 5F:
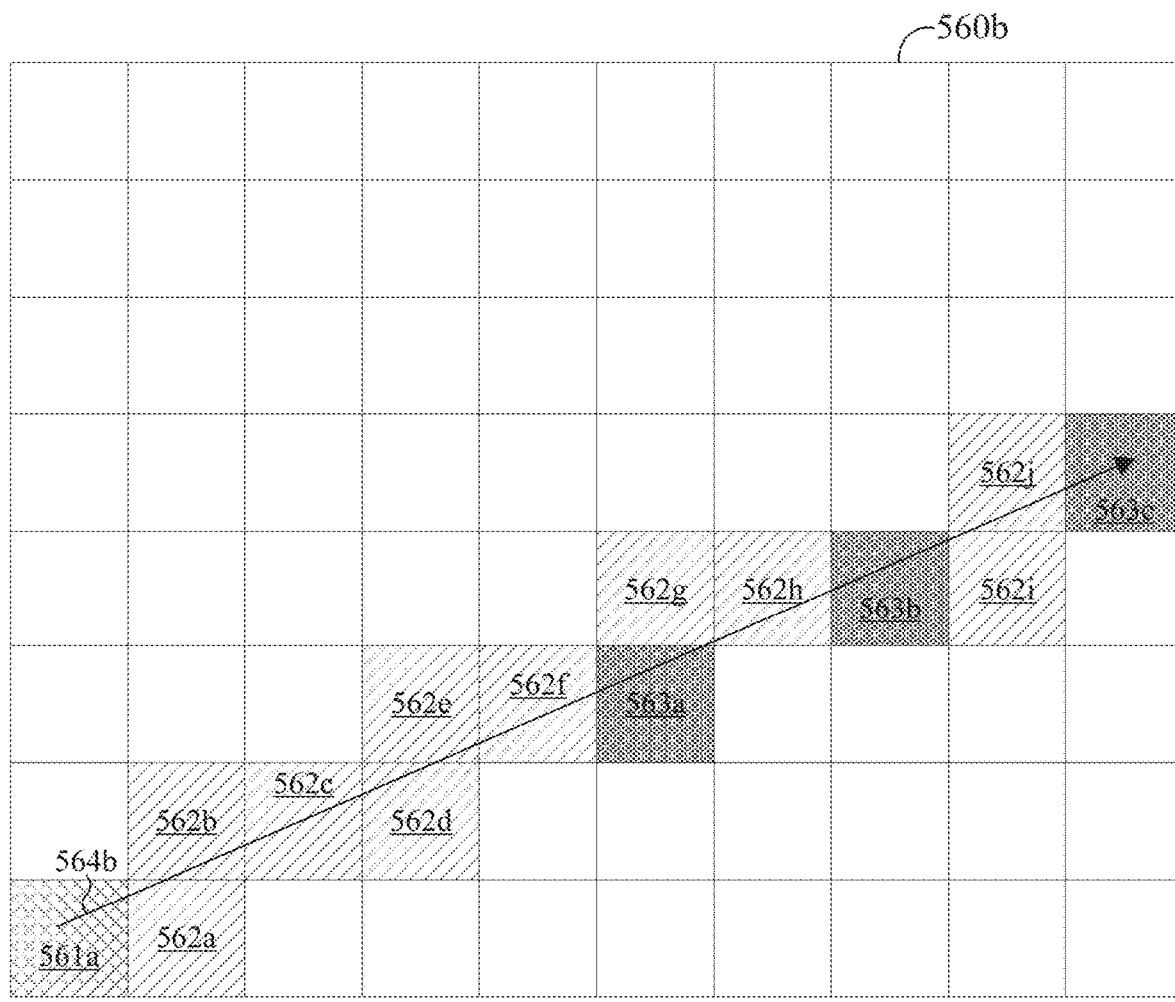
FIG. 5F illustrate example diagram of a grid of an area which uses multiple range detections in a direction to identify an object within an environment in accordance with an embodiment of this disclosure.

FIG. 5A illustrates an example environment 500 and range azimuth heap map 506 based on a radar signal of the objects within the environment in accordance with an embodiment of this disclosure. FIG. 5B illustrates an example flowchart 510 for determining, based on a received sensor input, whether to perform multi-range detection in accordance with an embodiment of this disclosure. FIGS. 5C and 5D illustrate example flowcharts 516a and 516b for mapping a grid using a single range per direction in accordance with an embodiment of this disclosure. FIG. 5E illustrate example diagram of a grid 560a of an area which uses a single range per direction to identify an object within an environment in accordance with an embodiment of this disclosure. FIG. 5F illustrate example diagram of an area 560b that is divided into a grid. Within the area there are multiple range detections in a direction to identify an object within an environment in accordance with an embodiment of this disclosure. The FIGS. 5G, 5H, 5I, 5J, 5K, and 5L illustrate various graphs and radar heat maps for detecting objects within an environment in accordance with an embodiment of this disclosure. The steps of the flowcharts 510, 516a, and 516b, the areas 560a and 560b, and the generation of the various graphs and radar heat maps can be performed by the electronic device 100 of FIG. 1, the electronic device 200 of FIG. 2, or the electronic device 300 of FIGS. 3A and 3C. The embodiments of FIGS. 5A-5L are for illustration only and other embodiments can be used without departing from the scope of the present disclosure.

Embodiments of the present disclosure take into consideration that the accuracy of SLAM is based on the resolution and accuracy of the measurements obtained from the sensors 310 such as the Lidar sensor 312 and the radar sensor 314 of FIG. 3A. For example, the radar sensor 314 can miss one or more objects during the mapping process due to a stronger reflection of a faraway object as compared to a near object.

That is, the radar sensor 314 could miss a nearby object if the far away object has a stronger reflection. For another example, the limited FOV of the radar sensor 314, could cause difficulty in matching current measurements to previously mapped points such as in the case of a planar surface like a wall. For yet another example, when the sensor measurements are sparse, inaccurate, or both, the measurements could adversely affect the mapping process. For instance, the electronic device 300 could mark the surrounding object inaccurately or miss the object altogether.

Use of multi range detections in a direction that can be provided by a sensor and improve the mapping process in several ways. Firstly, if measurements from a sensor are not accurate, some nearby objects can be overshadowed by a strong reflector behind it. In such a case, single detection per scan might ignore nearby object and pick the further away strong reflector. Secondly, if the field of view of a sensor is limited, for example radar, it is difficult to distinguish between different planar surfaces, for example walls, leading to failure of scan matching. If by multi range detection, points behind the planar surfaces can be identified, a unique structure can be added to different sections of the wall.

Embodiments of the present disclosure provide systems and methods for generating a range scan using multiple detections in a direction for map building and utilizing the multi-range scan for mapping the surrounding environment of an electronic device. Radar can be used to detect multiple detections in a direction for map building. A radar sensor such as the radar sensor 314 can emit radar signals that penetrate an object surface and create multiple detectable peaks within the range readings for multiple detections in a direction (in the same azimuth).

The environment 500 of FIG. 5A illustrates an example range azimuth heat maps 506 of an area 502 obtained from a radar sensor 314. The area 502 within walls 504a. Outside of the area 502 are multiple objects 504b. Within the area 502 is an object 504c. Since, radar signals can penetrate objects such as a wall for indicating the presence of object(s) located behind the wall.

A signal-to-noise ratio (SNR) is illustrated in the azimuth heap map 506. The range azimuth heat map 506 indicates SNR levels indicating objects at different within FOV of the radar sensor 314 at different distances. For example, the SNR 508a (range 50, azimuth −50) could represent the wall 504a, the SNR 508b (range 60, azimuth 60) could represent the object 504b, which is the located behind the wall, and the SNR 508c could represent the object 504c, which is the object that is located in front of the wall. As illustrated, the object 504c (which is located in front of the wall) has a weak reflector in as compared to the wall 508c (represented by the SNR 508a) itself, and thus could the SNR 508c, corresponding to the object 504c which is located in front of the wall, could be missed. SNR 508a could be detected using a single range detection method since there are is no indication of an object further away from the sensor. However, a single range detection method could far away strong peak, even if the nearby peak is from a valid object but it is not a very strong reflector such as illustrated in the enlarged portion of the range azimuth heat map 506. That is, the SNR 508c could overshadow the SNR 508b, such that the sensor could ignore the nearby object that corresponds to the SNR 508b and only pick up the far away object that corresponds to the SNR 508c.

The radar sensor 314, which emits radar signals could detect both the object corresponding to the SNR 508b and the object corresponding to the SNR 508c, even though the object that corresponds to the SNR 508c has a larger SNR than the object that corresponds to the SNR 508b. For example, another type of sensor may only detect the object that corresponds to the SNR 508c and overlook the object corresponding to the SNR 508b since it is a smaller signal. As such, using a multi range scan generation method the electronic device 300 could detect all the peaks with reasonably high SNR values. Therefore both SNR 508b and 508c would be declared as valid objects and used for mapping. In certain embodiments, the electronic device 300 can detect objects behind the wall by using multi range detection by adding a unique signature to the wall which enables the electronic device 300 to identify which side of the wall is currently being detected.

FIG. 5B illustrates the flowchart 510 for determining, based on a received sensor input, whether to perform multi-range detection. In step 514, the electronic device 300 determines whether the input from a sensor 512 allows for multi range detection. If the sensor generates single range, the mapping process uses process A (step 516), and if the sensor is capable of generating multi-range information, the mapping process will use the process B (step 518).

Both process A, of step 516, and process B, of step 518, can have different variations in representing the probabilities in a map. In certain embodiments, a first variation is a hit-visit model (described in FIG. 5C, below) and second variation a Gaussian distribution based model (described in FIG. 5D below). The second variation, Gaussian distribution based model, is used when the sensors provide a space and/or inaccurate scans in order to identify and model the space between and around the detected ranges. It is noted that embodiments of the present disclosure apply similar modification to support multi-range for other variations.

To perform the mapping based on the process A, of step 516, or process B, of step 518, is represented by Equation (1). In Equation (1), m represents the map of the environment, $x_{1:t}$ represents the pose of the electronic device 300 from time 1 to t, and $z_{1:t}$ represents the measurements of the robot from time 1 to t.

$$p(m|x_{1:t},z_{1:t}) \quad \text{Equation (1)}$$

In certain embodiments, occupancy grid mapping is a method for performing the mapping of the environment, after the pose of the electronic device 300 is estimated. An inverse sensor model could be used to solve the distribution. An inverse sensor model assumes that the occupancy of each grid cell is independent of the other cells, as described in Equation (2).

$$p(m|x_{1:t},z_{1:t}) = \prod_i p(m_i|x_{1:t},z_{1:t}) \quad \text{Equation (2)}$$

The flowchart 516a describes the first variant (hit-visit model) for occupancy grid mapping based on algorithm A (when the sensor provides a single range per direction and therefore does not allow for multiple range detection as indicated in step 516). FIG. 5E illustrates ray tracing to update the number of hits and visits of the grid point. A grid point refers to a particular cell of the grid of a given area.

In step 520, the expressions, #hit, and #visits that are associated with each grid point (such as a cell of the grid) are set to zero. In step 521, the electronic device 300 starts with the first scan of a frame. in step 522, the electronic device 300 identifies the grid point (such as a particular cell of the grid) that intersect with the scan based on the pose of the electronic device 300, the direction of the scan, and the range measurements, based on one or more of the sensors 310.

For example, FIG. 5E, illustrates an area 560a that is divided into as grid with multiple cells, such as the cells 561a and 563a. When the electronic device 300 is located in the cell 561a and scans along the FOV 564a until an object is detected in cell 563a. As such, the electronic device 300 identifies, in step 522 of FIG. 5C the cell 563a which intersects the scan.

In step 523a the expressions #hits for the grid point (the particular cell of the grid) that intersects the scan, such as the cell 563a, is increased by an integer, such as one. Then in step 523b, the expression #visits for each grid point (the particular cells of the grid) intersecting the line between the electronic device 300 and the scan is increased integer, such as one. For example, the expression #visits that is associated with the cells 561a, 562a, 562b, 562c, 562d, 562e, 562f, and 563a is all increased by one. Accordingly the expressions #hits for the cell 563a (based on the steps 523a and 523b) are increased.

In step 524, the electronic device 300 determines whether there are more measurements in the frame. If there are more measurements in the frame, then in step 525, the next scan is performed until all of the scans are performed and the expressions #hits and #visits are increased for each detected object.

When there are no more measurements in the frame, the electronic device in step 526, identifies the probability that each grid point (all of the cells of the grid) of the frame is occupied. For example, the electronic device 300 identifies the probability that each cell of the FIG. 5E is occupied by dividing the values of the expression #hits by #visits associated with each respective cell.

In step 527, the electronic device 300 selects a grid point (or cell) of the grid map to be labeled. In certain embodiments, the selected grid point is the first cell that was scanned by the electronic device. In step 527, the electronic device 300 determines whether the expression #visits for that grid point (cell) is great than zero. If the number of visits is equal to or less than zero, then in step 528 that grid point is labeled as unknown since that grid point (cell) was never included in a scan by the electronic device. For example, the cell 565 of FIG. 5E was not scanned since the FOV 564a did not cross that grid point (cell). As such, the expression #visits for the cell 565 was not incremented and therefore remains zero (per its initialized value in the step 520).

If the number of visits is greater than zero, indicates that that grid point (cell) was inspected at least once, such as the cell 562a of FIG. 5E. upon a determination that the expression #visits is greater than zero, then in step 529, the electronic device 300 determines whether the probability that a grid point (cell) is occupied (as identified in step 526), is greater than a threshold. The expression $p_{occ}$ is based on the value associated with the expression #hits divided by the value associated with the expression #visits ($p_{occ}$=#hits/#visits). When the expression $p_{occ}$ is greater than the threshold, that grid point (cell) is labeled as occupied in step 530. Alternatively, when the expression $p_{occ}$ is less than or equal to the threshold, that grid point (cell) is labeled as unoccupied in step 531.

After labeling the grid point (cell) as unknown (in step 528), occupied (in step 530), or unoccupied (in step 531) the electronic device in step 532 determines whether all grid points (or cells) are labeled. If there is at least one cell that is not labeled, the next grid point (cell) is selected in step 533. Once all of the grid point (cell) are labeled, in step 534, the electronic device 300 determines whether there is another frame of measurements available. If there is another frame of measurements, then the process returns to step 521. Alternatively, if there are not additional frame of m measurements, the method described by the flowchart 516a concludes.

The flowchart 516b describes the second variant (Gaussian distribution) for occupancy grid mapping based on algorithm A (when the sensor provides a single range per direction and therefore does not allow for multiple range detection as indicated in step 516). With respect to Gaussian distribution, the probability of a grid cell being occupied is described in Equation (3). It is noted that $P_d$ represents the probability of detection of the scans, $f_{occ}(m_i|x_{1:t},z_{1:t})$ is a function corresponding to an occupied space, and $f_{empty}(m_i|x_{1:t},z_{1:t})$ is a function corresponding to an empty space. For example, the probability of a grid cell being occupied is modeled based on a function of the occupied space and a function of the empty space.

$$p(m_i|x_{1:t},z_{1:t})=0.5*(1+P_d f_{occ}(m_i|x_{1:t},z_{1:t})-P_d f_{empty}(m_i|x_{1:t},z_{1:t})) \quad \text{Equation (3)}$$

The function of the occupied space, $f_{occ}(m_i|x_{1:t},z_{1:t})$, accounts for the uncertainties in range and azimuthal angles, as described in Equation (4). It is noted that $f_{occ}^r(m_i|x_{1:t},z_{1:t})$, of Equation (4), is described in Equation (5) and $f_{occ}^\theta(m_i|x_{1:t},z_{1:t})$ of Equation (4), is described in Equation (6). Additionally, $f_{occ}^r(m_i|x_{1:t},z_{1:t})$ can be modeled as Gaussian probability distribution peaking at the detected range value $r_{det}$ and $f_{occ}^\theta(m_i|x_{1:t},z_{1:t})$ can be modeled as Gaussian probability distribution peaking at the scan angle $\theta_{det}$. As described in Equations (4), (5), and (6), $r_i$ is the range value at the center of the grid cell represented by $m_i$ and $\theta_i$ is the azimuthal angle from the robot pose to the center of the grid cell represented by $m_i$.

$$f_{occ}(m_i|x_{1:t},z_{1:t}) = f_{occ}^r(m_i|x_{1:t},z_{1:t})f_{occ}^\theta(m_i|x_{1:t},z_{1:t}) \quad \text{Equation (4)}$$

$$f_{occ}^r(m_i|x_{1:t},z_{1:t}) = \frac{1}{\sqrt{2\pi\sigma_r^2}}\exp\left(\frac{-(r_i-r_{det})^2}{2\sigma_r^2}\right) \quad \text{Equation (5)}$$

$$f_{occ}^\theta(m_i|x_{1:t},z_{1:t}) = \frac{1}{\sqrt{2\pi\sigma_\theta^2}}\exp\left(\frac{-(\theta_i-\theta_{det})^2}{2\sigma_\theta^2}\right) \quad \text{Equation (6)}$$

Similarly, the function of the empty space, $f_{empty}(m_i|x_{1:t},z_{1:t})$, accounts for the uncertainties in range and azimuthal angles, as described in Equation (7). It is noted that $f_{empty}^r(m_i|x_{1:t},z_{1:t})$ is model as a decaying exponential, as described in Equation (8) while $f_{empty}^\theta(m_i|x_{1:t},z_{1:t})$ is modeled as a Gaussian distribution, as described in Equation (9).

$$f_{empty}(m_i|x_{1:t},z_{1:t}) = f_{empty}^r(m_i|x_{1:t},z_{1:t})f_{empty}^\theta(m_i|x_{1:t},z_{1:t}) \quad \text{Equation (7)}$$

$$f_{empty}^r(m_i|x_{1:t},z_{1:t}) = \exp\left(\frac{-4r_i^2}{r_{det}^{1\,2}}\right) \quad \text{Equation (8)}$$

$$f_{empty}^\theta(m_i|x_{1:t},z_{1:t}) = \frac{1}{\sqrt{2\pi\sigma_\theta^2}}\exp\left(\frac{-(\theta_i-\theta_{det})^2}{2\sigma_\theta^2}\right) \quad \text{Equation (9)}$$

After $f_{occ}(m_i|x_{1:t},z_{1:t})$ and $f_{empty}(m_i|x_{1:t},z_{1:t})$ are modeled, Equation (3) is solved. Thereafter, the log odd value is identified and accumulated over the frames as described by Equation (10).

$$l_i^{1:t} = \log\left(\frac{p(m_i|x_{1:t},z_{1:t})}{1-p(m_i|x_{1:t},z_{1:t})}\right) \quad \text{Equation (10)}$$

$$\text{If } l_i^k = \log\left(\frac{p(m_i|x_k,z_k)}{1-p(m_i|x_k,z_k)}\right), \text{ then}$$

$$l_i^{1:t} = l_i^t + l_i^{1:t-1}$$

The log odd value of all the grid points is initialized with zero. For mapping, log odd value accumulated over all the frames till the current frame is used. If the log odd value of the grid point is positive, it is marked as occupied, and if it is negative, it is marked as empty. A zero value of log odd is indicative of equally probable occupied or empty space. Therefore when a value of a space is zero, that grid point is marked as unknown.

As discussed above, the flowchart 516b describes the second variant (Gaussian distribution) for the occupancy grid mapping based on algorithm A (when the sensor provides a single range per direction and therefore does not allow for multiple range detection as indicated in step 516).

In step 540, the expressions log_odd value that is associated with each grid point (such as a cell of the grid) are set to zero. In step 541, the electronic device 300 starts with the first scan of a frame. In step 542, the electronic device 300 identifies the grid point (such as a particular cell of the grid) that intersect with the scan based on the pose of the electronic device 300, the direction of the scan, and the range measurements, based on one or more of the sensors 310.

For example, when the electronic device 300 is located in the cell 561a of FIG. 5E and scans along the FOV 564a until an object is detected in cell 563a. As such, the electronic device 300 identifies, in step 542 of FIG. 5C the cell 563a which intersects the scan.

In step 543, the electronic device 300 identifies the window of a grid points (cells) that falls within a threshold in range and azimuth of the identified grid point (cell) from the step 542. In certain embodiments, the threshold is a number of standard deviations, such as three standard deviations. For example, the electronic device 300, in step 543, can identify a window of grid points that fall within three standard deviations in range and azimuth of the grid point (cell) that was identified in step 542.

In step 544, the electronic device 300 identifies the probability that the grid points within the window are occupied. Then in step 545, the electronic device 300 updates the log_odd Values for the grid points within the window. The electronic device can update the log_odd Values based on Equation (10), above.

In step 546, the electronic device 300 determines whether there are more measurements in the frame. If there are more measurements in the frame, then in step 547, the next scan is performed until all of the scans are performed.

When there are no more measurements in the frame, the electronic device 300 in step 548, selects a grid point (or cell) of the grid map to be labeled. In certain embodiments, the selected grid point is be the first cell that was scanned by the electronic device. In step 549, the electronic device 300 determines whether log_odd value for the selected cell is equal to zero. If the log_odd value for that cell is equal to zero, then then in step 550 that grid point (cell) is labeled as unknown since that grid point (cell)

If the number of visits is not equal to zero, then in step 549, the electronic device 300 determines whether the value log_odd for the selected cell is greater than zero in step 551. When the value log_odd for the selected cell is greater than zero, then that grid point (cell) is labeled as occupied in step 552. Alternatively, when the value Log_odd for the selected cell is less than zero, then that grid point (cell) is labeled as unoccupied in step 553.

After labeling the grid point (cell) as unknown (in step 550), occupied (in step 552), or unoccupied (in step 553) the electronic device in step 554 determines whether all grid points (or cells) are labeled. If there is at least one cell that is not labeled, the next grid point (cell) is selected in step 555. Once all of the grid point (cell) are labeled, in step 556, the electronic device 300 determines whether there is another frame of measurements available. If there is another frame of measurements, then the process returns to step 541. Alternatively, when there are not additional frame of m measurements, the method described by the flowchart 516b concludes.

When the sensor allows for multiple range detections, the process B of step 518 of FIG. 5B is utilized. As described above, process B, of step 518 of FIG. 5B, can have different variations in representing the probabilities in a map. A first variation is a modification of the hit-visit model, described in FIG. 5C. To account for multiple range detections, the flowchart 516a of FIG. 5C is modified. In step 523a, for all the grid points (cells) intersecting with all the range detections in a direction, the expression #hits are incremented. Similarly, in step 523b, for all the grid points (cells) intersecting the line from the pose of the electronic device 300 to the furthest detection, the expression #visits are incremented.

For example, FIG. 5F, illustrates an area 560b that is divided into as grid with multiple cells, such as the cells 561a and 563a. The area 560b could be the same or similar to the area 560a of FIG. 5E. It is noted that the electronic device of FIG. 5F can detect multiple ranges while the electronic device of FIG. 5E can detect only a single range. As such, when the electronic device 300 is located in the cell 561a and scans along the FOV 564b, the electronic device 300 of FIG. 5F can detect objects such as in cells 563a, 563b, and 563c. When the sensor can detect multiple ranges, then the step 523a of FIG. 5C is modified such that the expressions #hits for the grid point (the particular cell of the grid) that intersects the scan, such as the cell 563a, 563b, and 563c, are increased by an integer, such as one. Similarly, the step 523b of FIG. 5C is modified such that the expression #visits for each grid point (the particular cells of the grid) intersecting the line between the electronic device 300 and the scan is increased integer, such as one. For example, the expression #visits is increased by one for the cells 561a, 562a, 562b, 562c, 562d, 562e, 562f, 562g, 562h, 562i, 562j, 563a, 563b, and 563c. Accordingly the expressions #hits for the cell 563a, 563b, and 563c (based on the steps 523a and 523b) are increased.

As described above, process B, of step 518 of FIG. 5B, can have different variations in representing the probabilities in a map. A second variation is a modification of the Gaussian and exponential distributions to model described in FIG. 5D.

Gaussian and exponential distributions model the spaces between and around the detected ranges. The probability of a grid point being occupied $p(m_i|x_{1:t},z_{1:t})$ is modeled is described above in Equations (3).

The function of occupied space, $f_{occ}{}^{r}(m_i|x_{1:t},z_{1:t})$, is modeled described above in Equation (4). For multiple ranges per scan, $f_{occ}{}^{r}(m_i|x_{1:t},z_{1:t})$ is modeled as Gaussian probability distribution peaking at detected range values. For example, if $R=\{r_{det}{}^{1}, r_{det}{}^{2}, \ldots, r_{det}{}^{n}\}$ represents the set of detected ranges at an angle, $f_{occ}{}^{r}(m_i|x_{1:t},z_{1:t})$ is described in Equation (11), below.

$$f_{occ}^{r}(m_i \mid x_{1:t}, z_{1:t}) = \sum_{k} \frac{1}{\sqrt{2\pi\sigma_r^2}} \exp\left(\frac{-(r_i - r_{det}^k)^2}{2\sigma_r^2}\right) \quad \text{Equation (11)}$$

Figure 5G:
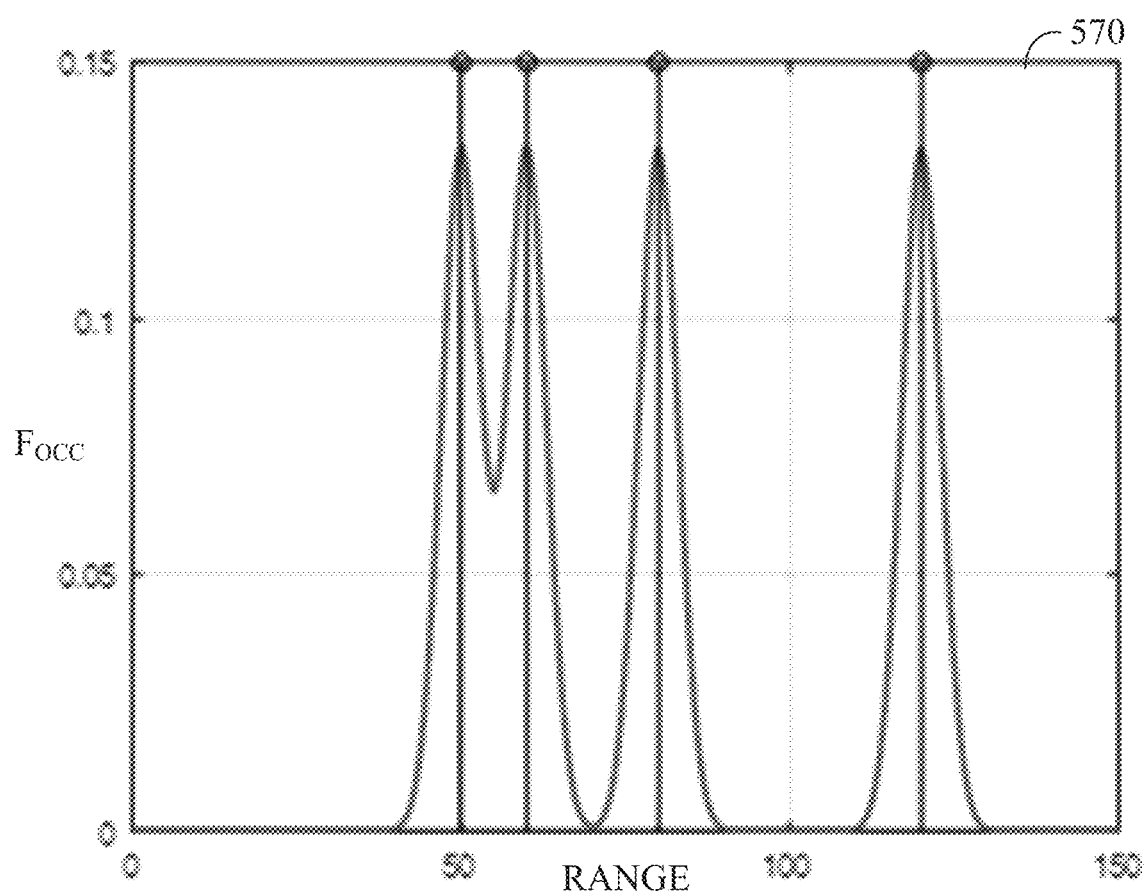
FIGS. 5G, 5H, 5I, 5J, 5K, and 5L illustrate various graphs and radar heat maps for detecting objects within an environment in accordance with an embodiment of this disclosure.

For example, FIG. 5G Illustration a graph 570 of $f_{occ}{}^{r}(m_i|x_{1:t},z_{1:t})$ in 1D for detected range values $R=[50,60,80,100]$ cm and $\sigma_r=3$ cm. As shown in the graph 570 that the space between the range values that are close to each other will be more likely to be occupied than the space between far away range values. It is noted that the update window is considered from the pose of the electronic device 300 to grid points falling within three standard deviations of the maximum range detected in that direction.

Figure 5H:
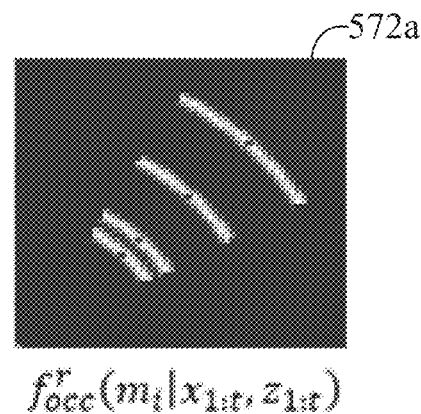
Figure 5H:
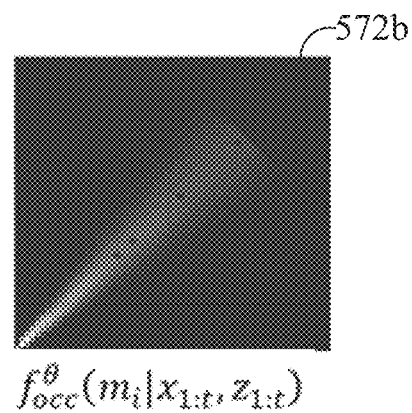
Figure 5H:
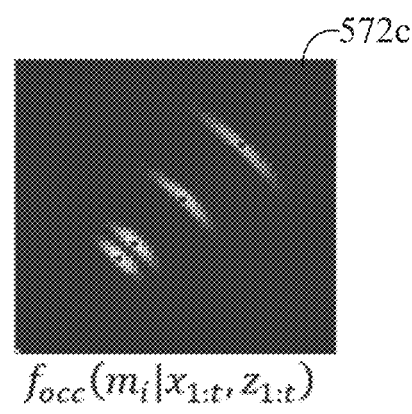

The function $f_{occ}{}^{\theta}(m_i|x_{1:t},z_{1:t})$ can modeled in the same way as that for single range per direction as described above in Equation (6). FIG. 5H illustrates an example of $f_{occ}(m_i|x_{1:t},z_{1:t})$ for a 2D grid cell for $\theta_{det}=45°$, $R=[140,160,225,300]$, $\sigma_r=3$, $\sigma_\theta=5$ and $\Delta m=5$. As illustrated in FIG. 5H, the electronic device 300 is located in the lower left corner of each graph. The graph 572a illustrates four detected objects based on the function $f_{occ}{}^{r}(m_i|x_{1:t},z_{1:t})$. The graph 572b illustrates the four detected objects along the scan direction originating from the electronic device 300 based on the function $f_{occ}{}^{\theta}(m_i|x_{1:t},z_{1:t})$. The graph 572c illustrates the function of occupied space, $f_{occ}(m_i|x_{1:t},z_{1:t})$, such that the value of the function decreases as the grid points are far from the detected ranges and azimuthal rotation.

Similarly, the function of the empty space $f_{empty}(m_i|x_{1:t},z_{1:t})$, can similar to Equation (7) as described above, which is based on the functions $f_{empty}{}^{r}(m_i|x_{1:t},z_{1:t})$ and $f_{empty}{}^{\theta}(m_i|x_{1:t},z_{1:t})$. To model the empty space in case of multiple ranges per scan is based on a decaying exponential model till the nearest detected range and a Gaussian distribution in between all the consecutive range values, peaking midway between consecutive range values. The mean and standard deviation of the Gaussian in between consecutive ranges is the function of the distance between them and described in Equation (12) below.

$$f_{empty}^{r}(m_i \mid x_{1:t}, z_{1:t}) = \exp\left(\frac{-4r_i^2}{r_{det}^{1}{}^{2}}\right) + \sum_{k=2,\ldots n} \frac{1}{\sqrt{2\pi\sigma_k^2}} \exp\left(\frac{-(r_i - c_k)^2}{2\sigma_k^2}\right), \quad \text{Equation (12)}$$

$$\text{where } c_k = \frac{(r_{det}^k + r_{det}^{k-1})}{2} \text{ and } \sigma_k = (r_{det}^k - r_{det}^{k-1})*\lambda \text{ for } 0 < \lambda < 1.$$

Figure 5I:
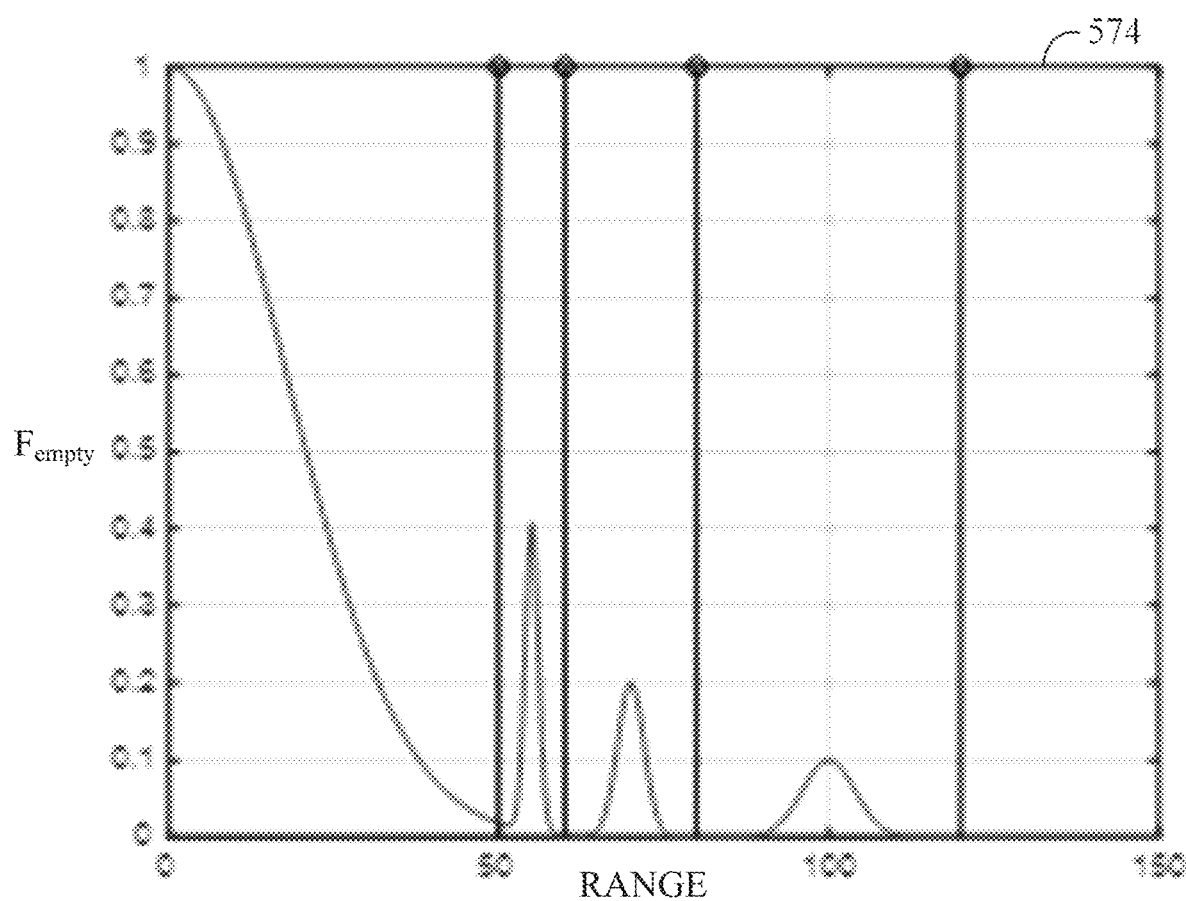

For example, FIG. 5I illustrates a graph 574 of $f_{empty}{}^{r}(m_i|x_{1:t},z_{1:t})$ 1D example of $f_{empty}{}^{r}(m_i|x_{1:t},z_{1:t})$ for $R=[50,60,80,100]$ cm and $\lambda=0.1$. It is noted that the function, of FIG. 5I will have a negligible value around the detected range values, and it starts to grow as it moves away from the detections.

Figure 5J:
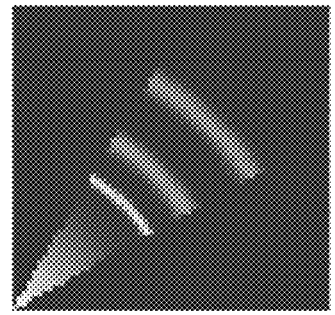
Figure 5J:
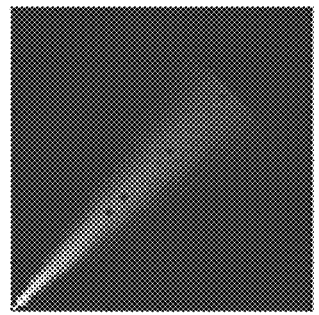
Figure 5J:
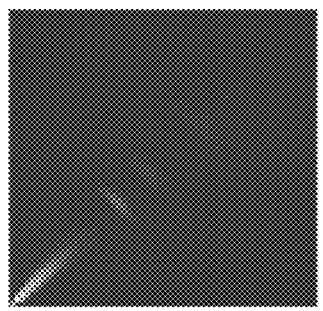

The function $f_{empty}{}^{\theta}(m_i|x_{1:t},z_{1:t})$ can be modeled as a Gaussian distribution peaking at the scan angle $\theta_{det}$ similarly to Equation (9). An example for $\theta_{det}=45°$, $R [140,160,225,300]$, $\sigma_\theta=5$ and $\lambda=0.1$ is illustrated in FIG. 5J. The FIG. 5J describes example of a function of empty space for multiple ranges detected per scan. The value of the function increases as the grid points move away from the detected ranges and azimuthal rotation.

Figure 5K:
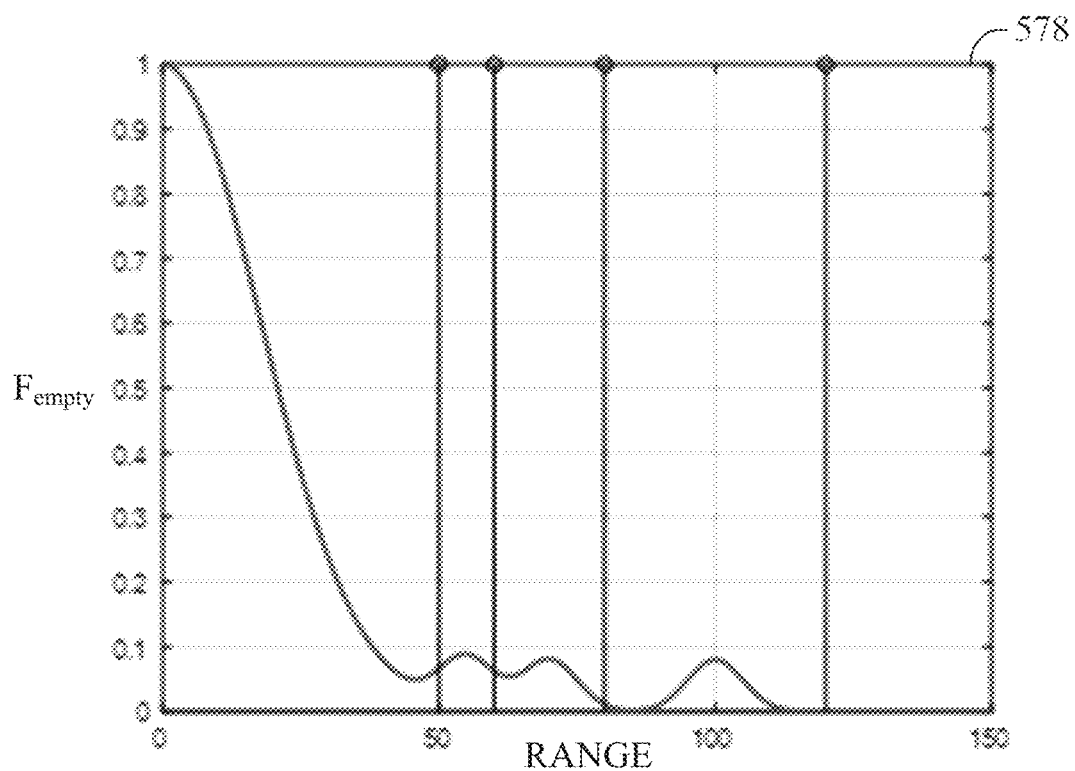

As described above, process B, of step 518 of FIG. 5B, can have different variations in representing the probabilities in a map. A third variation uses a constant standard deviation $\sigma_{rc}$, which is described in Equation (13), below. For example, instead of modeling the standard deviation of Gaussian distribution in between consecutive range detections using the gap between the detections, as previously described, a constant standard deviation $\sigma_{rc}$ can be used. FIG. 5K illustrates the graph 578 depicting a 1D example of such a formulation for $R [50,60,80,100]$ and $\sigma_{rc}=5$. The graph 578 illustrates an example variation of $f_{empty}{}^{r}(m_i|x_{1:t},z_{1:t})$ in multi range per scan where the space between consecutive range values is modeled with a Gaussian of constant standard deviation.

$$f_{empty}^{r}(m_i \mid x_{1:t}, z_{1:t}) = \exp\left(\frac{-4r_i^2}{r_{det}^{1}{}^{2}}\right) + \sum_{k=2,\ldots n} \frac{1}{\sqrt{2\pi\sigma_{rc}^2}} \exp\left(\frac{-(r_i - c_k)^2}{2\sigma_{rc}^2}\right), \quad \text{Equation (12)}$$

$$\text{where } c_k = \frac{(r_{det}^k + r_{det}^{k-1})}{2}$$

Figure 5L:
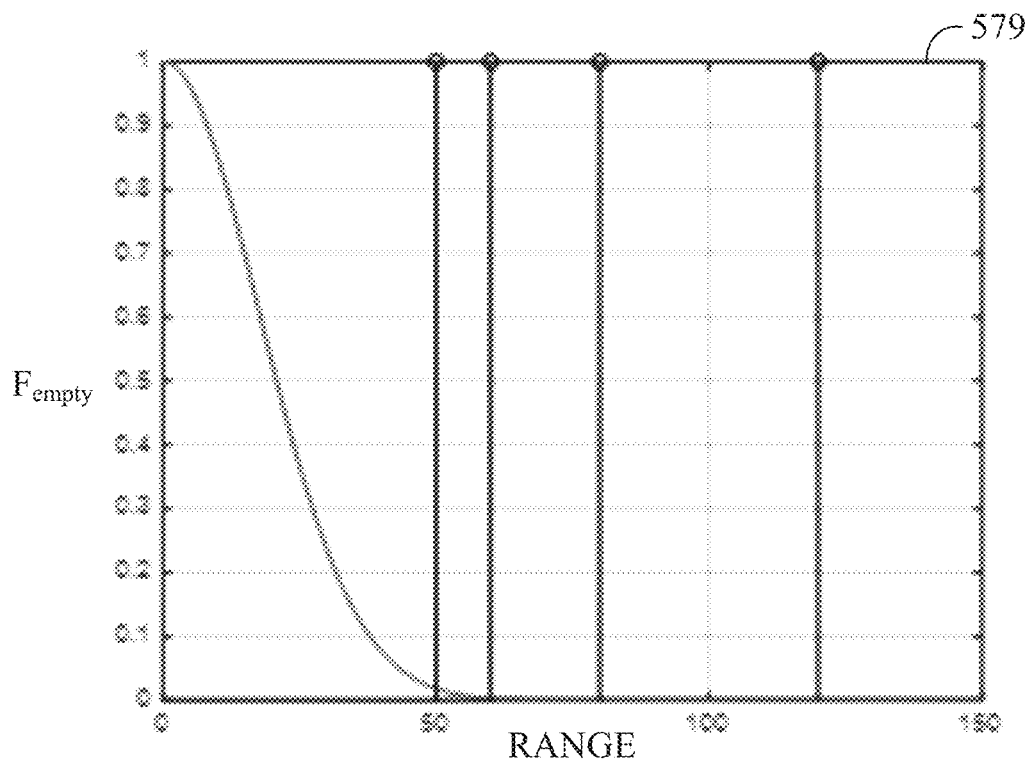

A fourth variation of $f_{empty}{}^{r}(m_i|x_{1:t},z_{1:t})$ models the space between consecutive range values as unknown. As such, the $f_{empty}{}^{r}(m_i|x_{1:t},z_{1:t})$ could be defined as a decaying exponential that becomes negligible close to the closest detectable range as described in Equation (13), below. FIG. 5L illustrates the graph 579. The graph 579 illustrates an example variation of $f_{empty}{}^{r}(m_i|x_{1:t},z_{1:t})$ in multi range per scan where the space between consecutive range values is modeled as unknown.

$$f_{empty}^{r}(m_i \mid x_{1:t}, z_{1:t}) = \exp\left(\frac{-4r_i^2}{r_{det}^{1}{}^{2}}\right) \quad \text{Equation (13)}$$

Although FIGS. 5A-5L illustrates example flowcharts, various changes may be made to FIGS. 5A-5L. For example, while shown as a series of steps, various steps, such as in FIGS. 5B, 5C, and 5D could overlap, occur in parallel, occur in a different order, or occur multiple times. In another example, steps may be omitted or replaced by other steps.

Figure 6A:
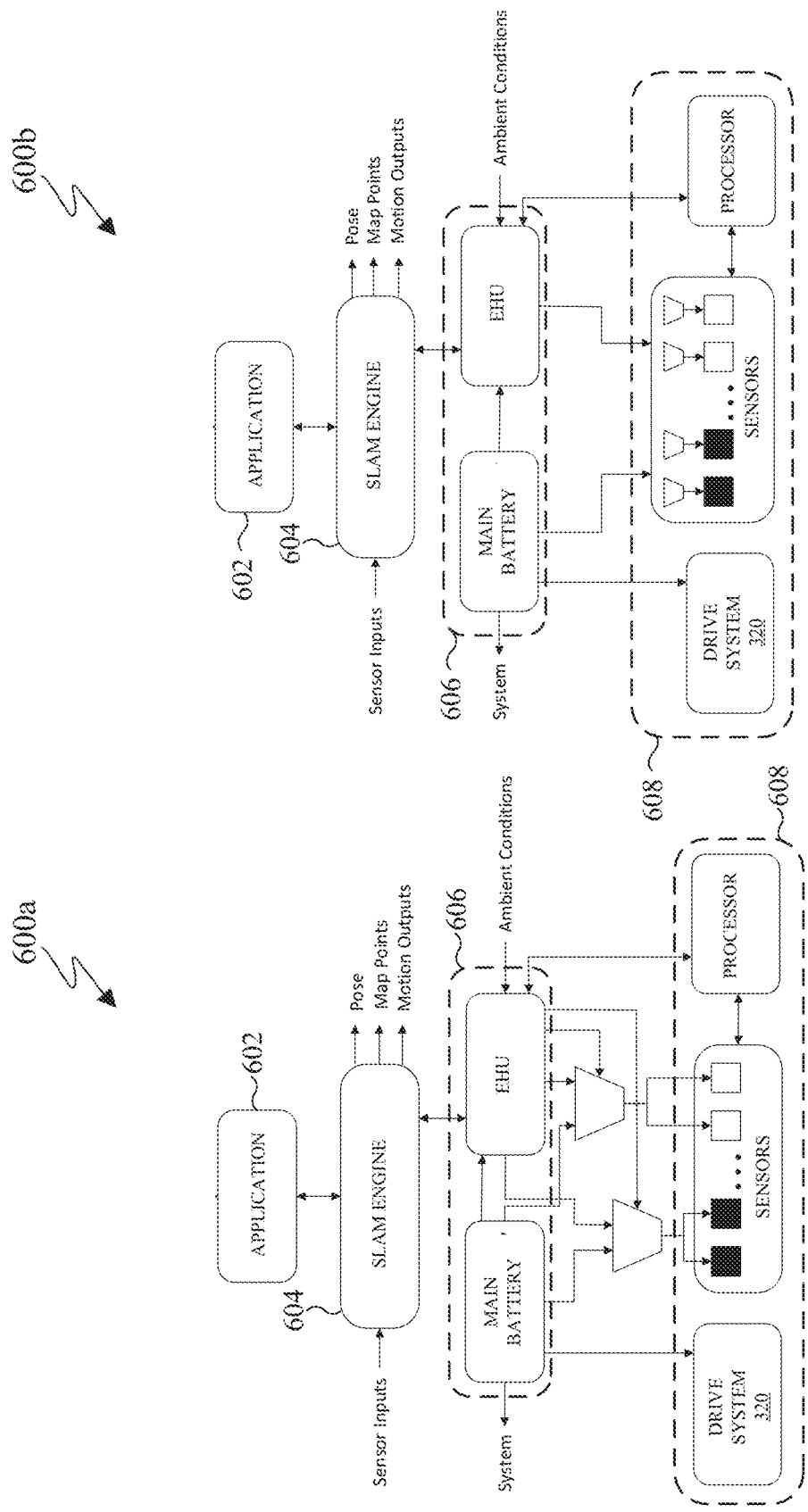
FIG. 6A illustrates embodiments for providing power to the sensors of an electronic device in accordance with an embodiment of this disclosure.
Figure 6B:
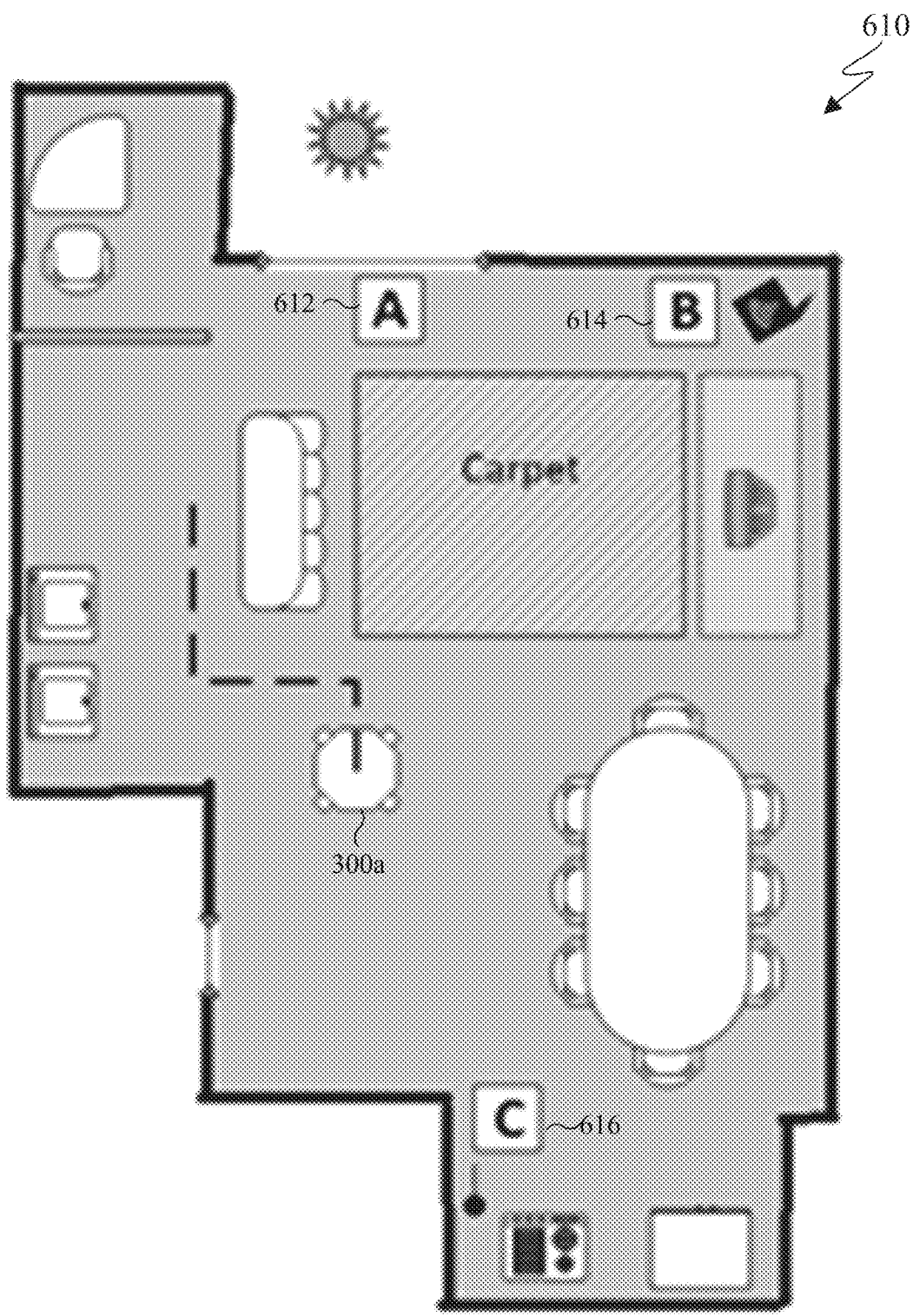
FIG. 6B illustrates an environment with various energy sources in accordance with an embodiment of this disclosure.
Figure 6C:
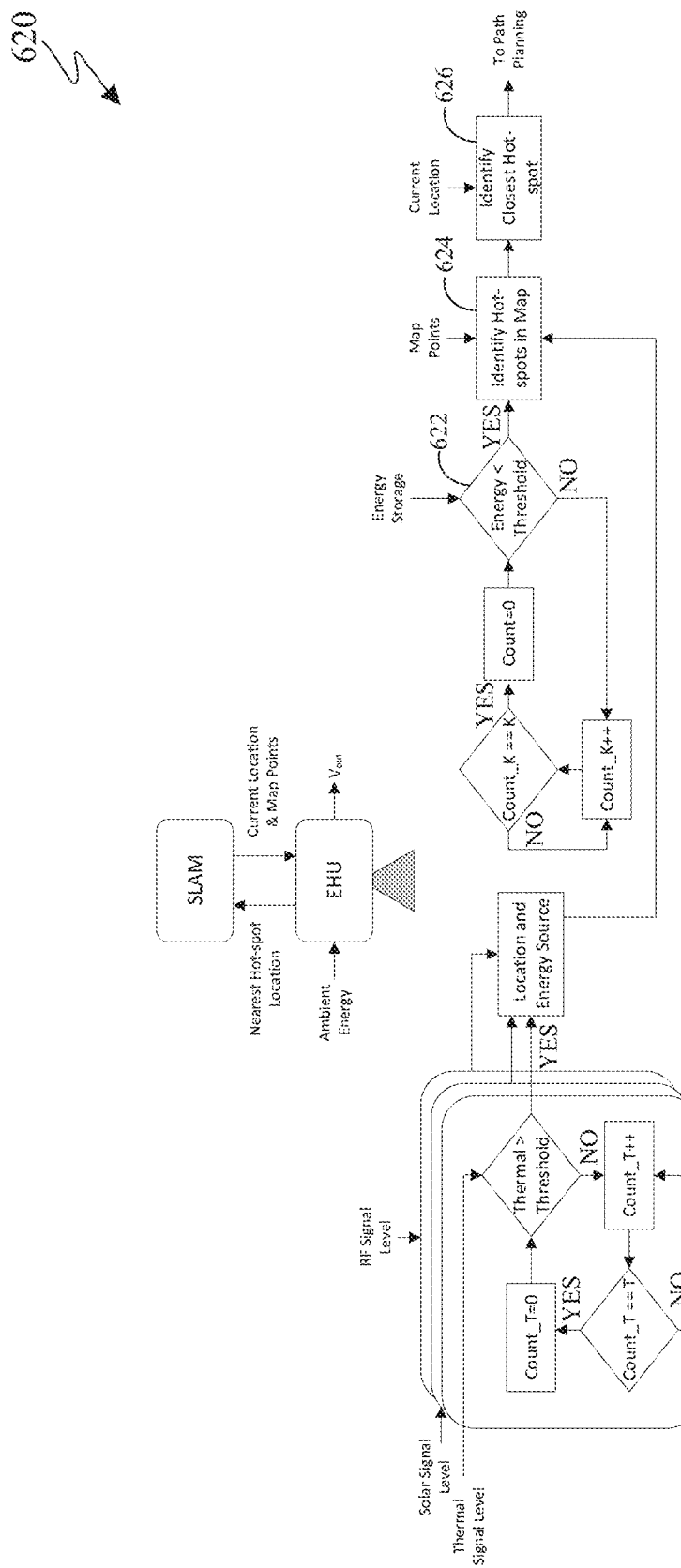
FIG. 6C illustrates an example flowchart for using an energy harvesting unit during a map building state in accordance with an embodiment of this disclosure.
Figure 6D:
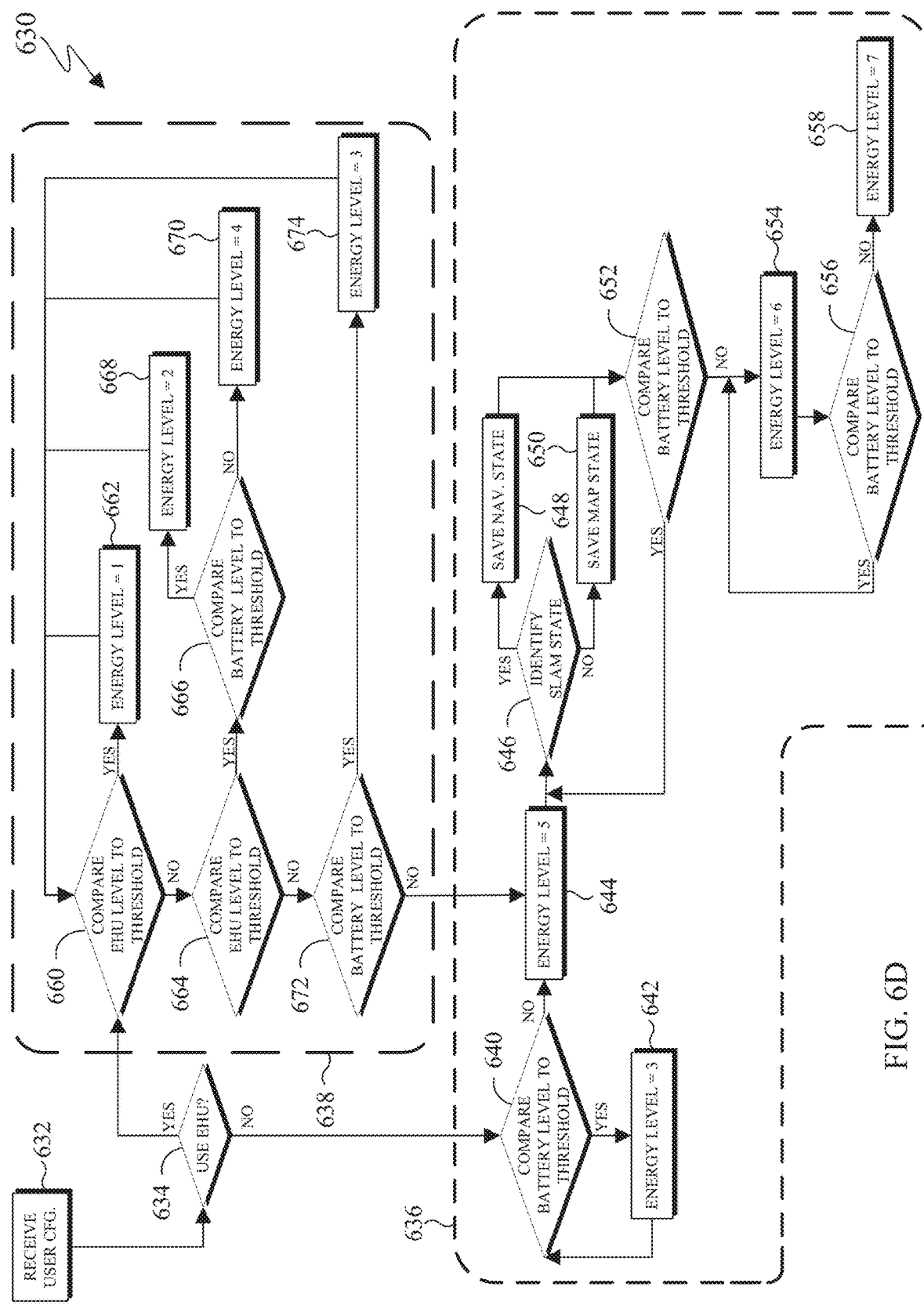
FIG. 6D illustrates an example flowchart for switching between an energy harvesting unit and a main battery in accordance with an embodiment of this disclosure.
Figure 6F:
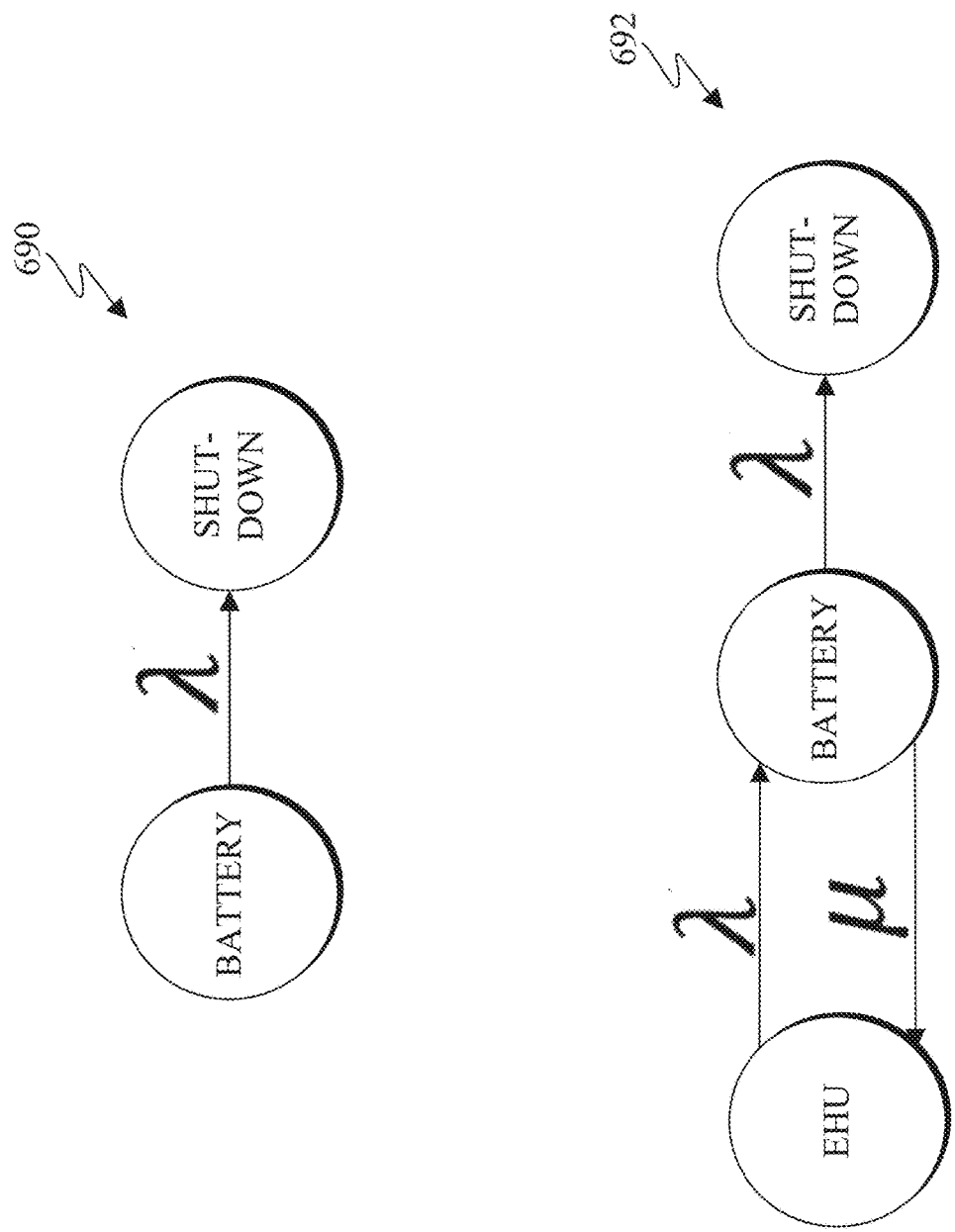
FIG. 6F illustrates example transition states in accordance with an embodiment of this disclosure.

FIG. 6A illustrates embodiments 600a and 600b for providing power to the sensors of an electronic device in accordance with an embodiment of this disclosure. FIG. 6B illustrates an environment 610 with various energy sources in accordance with an embodiment of this disclosure. FIG. 6C illustrates an example flowchart 620 for using an EHU during a map building state in accordance with an embodiment of this disclosure. FIG. 6D illustrates an example flowchart 630 for switching between an EHU and a main battery in accordance with an embodiment of this disclosure. FIG. 6E illustrates an example table 680 indicating the power source for various sensors based on identified energy levels in accordance with an embodiment of this disclosure. FIG. 6F illustrates example transition states in accordance with an embodiment of this disclosure. The steps of the flowcharts 620 and 630 be performed by the electronic device 100 of FIG. 1, the electronic device 200 of FIG. 2, or the electronic device 300 of FIGS. 3A and 3C. The embodiments of FIGS. 6A-6F are for illustration only and other embodiments can be used without departing from the scope of the present disclosure.

According to embodiments of the present disclosure, an autonomous electronic device, such as the electronic device 300 of FIGS. 3A and 3C, generates a map of an environment and navigates the environment without colliding any obstacles or boundaries (like walls). The electronic device 300 consumes power from one or more power sources to generate the map of an environment and navigate environment. Additionally, the power profile will vary depending upon the type of sensor(s) being used as well as the environment in which SLAM is used.

Embodiments of the present disclosure take into consideration that a power source, such as a battery, has a finite (or limited) electrical storage. Therefore embodiments of the present disclosure provide systems and methods for harvesting energy from ambient conditions using an EHU, such as the EHU 350 of FIG. 3A and EHU 350a of FIG. 3D. An EHU, such as the EHU 350 can convert ambient energy (such as solar rays, electro-magnetic waves, vibrations, heat sources, and the like) that exists in an environment that the electronic device 300 operates in, to be used for generating a map of an environment and navigating the environment during SLAM. For example, the EHU can be used to scavenge energy from ambient conditions such as solar rays and EM waves while also using the mobility-induced vibrations to harness energy. This energy can be used to power some or all of the sensors of the electronic device. Additionally, embodiments of the present disclosure provide systems and methods for switching between an EHU and one or more a main batteries based on concurrent energy levels.

The embodiments 600a and 600b of FIG. 6A illustrate a system stack for providing power to the sensors of an electronic device in accordance with an embodiment of this disclosure. The application layer 602 can provide a user with an interface to interact with the electronic device. In certain embodiments, the application layer 602 can include the applications 162 of FIG. 1.

SLAM engine 604 includes the localization and map building blocks along with the navigation stack used to get from point A to another point B within a map. The SLAM engine 604 can be similar to the SLAM engine 330 of FIGS. 3A and 3B. The SLAM engine 604 is responsible for getting an accurate pose (spatial world co-ordinates and heading direction), building a map of the environment and providing the next location for the robot to move to along with corresponding path.

A power layer 606 can include one or more main batteries and one or more EHU s such as the EHU 350 of FIG. 3A and the EHU 350a of FIG. 3D. In certain embodiments, the various systems of the electronic device 300 are powered via the main battery, while the Energy Harvesting Unit (EHU) is used to power the sensor unit in tandem with the main battery. For example, if the electronic device is an autonomous vacuum cleaner, the main battery can power the drive system 320 and the suction system to collect debris. If the electronic device is an autonomous lawn mower, the main battery can power the drive system 320 and the blade that is used to cut the grass.

The hardware layer 608 includes hardware for locomotion, such as the drive system 320 of FIG. 3A. The hardware layer 608 also includes hardware for sensing via the sensors 310 of FIG. 3A and signal processing, such as a processor 140 of FIG. 1. The various hardware components of the hardware layer 608 can be powered via a power layer 606. For example, the embodiment 600a illustrates a set of sensors that are powered by the main battery and the EHU of the power layer 606. The embodiment 600b illustrates that the sensors are each powered by main battery and the EHU of the power layer 606. That is, the each of the sensors of the embodiment 600b can be powered independently, but each sensor would require its own multiplexer as compared to the embodiment 600a, which uses a single multiplexer for each set of sensors.

FIG. 6B illustrates an environment 610 with an autonomous mobile system such as a vacuum cleaner 300a. The vacuum cleaner 300a is similar to the electronic device 300 of FIG. 3A. The vacuum cleaner 300a includes one or more sensors to help navigate around obstacles and identify patches of dirt or dust. The vacuum cleaner 300a also includes a power source, such as a battery with a limited power budget. The battery is responsible for moving the vacuum cleaner 300a throughout the environment to clean all or most part of the home. In certain embodiments, the battery includes a set Watt-hour capacity (for example, 50-75 Watt-hour) and supplies around a set voltage (such as 12-20 volts) to various parts of the system such as the motors (for locomotion and cleaning), sensors (for sensing), one or more processors for processing, and the like. The vacuum cleaner 300a can move around in the house, stopping when encountering an obstacle such as a lamp-stand, making turns to maneuver around it and accelerating again.

The environment 610 also includes various zones where the ambient energy is higher than the rest of the environment. In certain embodiments, during the course of building the map of the house, the vacuum cleaner 300a may encounter zones, such as the zones 612, 614, and 616, where the ambient energy is higher than the rest of the environment. For example, at zone 612 solar rays (sunlight) could enter the room through a window. The RF energy at zone 614 could be of a higher SNR close to a router. The zone 616 could have an increased temperature from an oven than the rest of the house. An additional energy source could be vibrations which are caused as the vacuum cleaner 300a travels through the environment.

In certain embodiments, the vacuum cleaner 300a, can include in the generated map of the environment the various zones and the energy associated with each zone. Therefore, the generated map of the environment can include the zones of the various energy Hot-spots. While the vacuum cleaner 300a is cleaning, it may encounter obstacles that may have moved in context to the earlier map. While maneuvering around such objects, the path planner can choose to pick a path towards a previously identified zone (energy hotspot). Also when the vacuum cleaner 300a is about to exhaust all its power, the vacuum cleaner 300a can save the state it last was in, inform the user various areas that it has finished cleaning and head back to its charging station.

In certain embodiments, once Hot-spots are identified (such as zones 612, 614, and 616) in the map by the EHU, the location and type of energy source of each zone is provided as an input to the path planning pipeline. Based on distance, available battery-life and map density, the electronic device can explore the area around the Hot-spot.

FIG. 6C the flowchart 620 using an EHU (such as the EHU 350 of FIG. 3A and the EHU 350a of FIG. 3D) during a map building/generating state. That is, the flowchart 620 describes how the EHU and SLAM engine (such as the SLAM engine 330 of FIG. 3A) interact with one another in the Map Building stage. During map building stage, the electronic device 300 is moving around autonomously to generate a map of the environment. While the map of the environment is being generated, various energy harvesting sources are monitored at regular intervals. When a region of high signal energy (such as a Wi-Fi zone) is detected, its location and source type is registered as a potential hot-spot.

If during the map generation process the battery energy levels of the electronic device drops below a threshold (step 622), the EHU can read the map built so far. The EHU can identify potential hot-spots that are previously registered (step 624). As such, based on the current location of the electronic device, electronic device can identify the closest hot-spot (step 626). The path planning component of the SLAM engine 330 of FIG. 3A can be notified with the location of the identified hot-spot. This enables the electronic device to decide whether to travel towards the hot-spot based on distance to the hot-spot, point cloud density in the area of the hot-spot and current state of map building. If the electronic device does move towards the hot-spot, it can re-charge the EHU as well as build the map in that portion of the environment.

In the Navigation stage of SLAM, the electronic device is primed to adhere to a fixed path from point A to point B within the confines of the built map. The path planning component of the SLAM engine 330 can identify an optimized path based on numerous parameters such as allocated task time, distance to travel, the hot-spot information, and the like. In certain embodiments, once a path has been planned, the EHU is unable to notify SLAM engine 330 regarding potential hot-spots. However the EHU can continue to harness energy based on ambient conditions and locomotion.

FIG. 6D illustrates an example flowchart 630 and FIG. 6E illustrates an example table 680 for switching between an EHU and a main battery in accordance with an embodiment of this disclosure. The flowchart 630 describes an example process for the electronic device 300 to switch between the EHU 350 and a main battery. The table 680 describes seven different energy states. Based on each state different sensors are powered by the EHU or the main battery. It is noted that various changes can be made to the elements of the table. For example, or more less energy levels can be included, as well as powering different sensors by different energy sources. For instance, the electronic device 300 could include multiple main batteries, and as such, different sensors can be powered by different batteries.

Energy Levels one through seven indicate different levels of available energy for powering the electronic device 300. For example, level one could indicate that the battery and the EHU are fully charged, while level seven represents corresponds to an instance when the battery and EHU are fully (or almost fully) depleted.

The column 'System State' specifies a state of the electronic device 300 based on the assigned energy level. The electronic device 300 can be one of four states 'regular state,' 'save state,' 'alert user state,' and 'shutdown state.' During a 'regular state' the electronic device 300 performs its functions normally.

During a 'save' state, the electronic device 300 saves its status. For example, if the electronic device 300 is performing the map generation component of SLAM, the 'save state,' indicates that the current map is saved, such as in the information repository 340. If the electronic device 300 is navigating within the area, such as when it is vacuuming, the areas that were vacuumed and/or not vacuumed are saved. For example, after the map is saved and the electronic device eventually shuts down, the saved maps can be loaded when the battery is repowered and the electronic device reboots and resumes its previous task.

The 'alert user state' alerts the user that the battery level is low. In certain embodiments, the electronic device 300 can search for ambient energy top harvest energy by the EHU 350. In certain embodiments, the electronic device 300 returns to its base for charging. The 'shutdown state' turns off the electronic device.

In certain embodiments, the sensors of the electronic device are categorized as either 'always on,' 'on,' or 'off.' Sensors that categorized as 'always on" are used for SLAM. Sensors are categorized as 'on" include one or more sensors of the electronic device 300 that are not used for SLAM. Sensors that categorized as 'off' can include sensors that are currently turned off and not used by the electronic device.

The column 'electronic device' represents other components of the electronic device 300 (other than the sensors). For example, if the electronic device 300 is a vacuum cleaner, the other components can correspond to the suction. Therefore, when the electronic device 300 is assigned energy levels one through five, then the suction component of the electronic device is activated for vacuuming, and when the electronic device 300 is assigned an energy level of six or seven, the suction component is deactivated.

For example, a user can provide configurations (step 632) that indicate whether the electronic device 300 is to use the EHU 350. Based on the received user configurations, the electronic device 300 determines, in step 634, whether to use the EHU 350. Based on a determination to not use the EHU 350 (per the received user configurations of step 632), the method proceeds with the portion 636 of the flowchart 630. Alternatively, based on a determination to use the EHU 350 (per the received user configurations of step 632), the method proceeds with the portion 638 of the flowchart 630.

The flowchart 630 of FIG. 6D describes an example embodiment of the electronic device 300 switching between different energy levels of the table 680. When the user received user configurations of step 632, indicate that the electronic device is not to use the EHU 350, the electronic device 300 checks the main battery level in step 640. If the battery level is within a set range, then in step 642 energy level three is activated. The table 680 indicates that energy level three shows that all of the sensors are powered by the main battery. Alternatively, if the battery level is not within the set range (of step 640), then in step 644 energy level five is activated. The table 680 illustrates that at energy level five the sensors that are categorized as 'on' are not receiving power, while the sensors that are categorized as 'always on' receive power from the main battery.

After the state is set to energy level five, the electronic device 300 at step 646, identifies the SLAM state. The SLAM state could be map generation/building, navigation, re-localization, initialization, off, and the like. For example, when the energy level five is set, the SLAM states are continuously saved (steps 648 and 650) until the main battery level further drops to energy level six. That is, the electronic device 300 checks the main battery level and compares the battery level to a threshold, at step 652. Based on the comparison the process returns to step 646, or activates energy level six at step 654. In certain embodiments, when energy level six is activated, the electronic device 300 sends an alert to the user, indicating that the battery level is low.

If the user has configured the EHU to be enabled, then the portion 638 of the flowchart 630 is triggered. In Step 660, the electronic device 300 checks the EHU level. That is, the EHU level is first checked and if it is within a set range, then energy level one is activated. When energy level one is activated, all of the sensors of the electronic device can be powered by the EHU (step 662). However, if the EHU is below a below the threshold, then the main battery level is checked and based on set values, energy levels two (step 668), three (step 674), or four (670) are triggered. Based on user-defined rate, the EHU levels are monitored at regular intervals to see if there is an opportunity to upgrade to energy level one (maximum power saving as the battery is not used to power the sensors).

For example, when energy level one is activated, the MCU (such as MCU 370 of FIG. 3D) outputs a signal En_MUX_OnSensor=1 and En_MUX_AlwaysOnSensor=1. The sensors categorized as 'on' sensors and 'always on' sensors are then powered by the EHU.

After energy level one is set (and the EHU powers the sensors and the main battery powers the rest of the electronic device) the process returns to step 660 to determine whether the EHU is below a below a threshold. If the EHU is above the threshold, then energy level one remains active. Alternatively, if the EHU is below the threshold, then in step 664, the electronic device 300 determines whether the EHU is below a below another threshold in step 664. When the When the EHU level is within a second range (step 664) the battery level is checked. Based on the battery level the electronic device 300 activates energy level two (step 668) or energy level four (step 670). When energy level two is activated (step 668), the MCU (such as MCU 370 of FIG. 3D) of the EHU outputs a signal En_MUX_OnSensor=0 and En_MUX_AlwaysOnSensor=1. The sensors categorized as 'on' sensors are powered by the main battery and the sensors categorized as 'always on' sensors are powered by the EHU. When energy level four is activated (step 670), the MCU (such as MCU 370 of FIG. 3D) of the EHU outputs a signal En_MUX_OnSensor=1 and En_MUX_AlwaysOnSensor=0. The sensors categorized as 'always on' sensors are powered by the EHU while the sensors categorized as 'on' sensors may receive power from the battery or not receive any power.

When the EHU is not within the second range (step 664), then the battery level is checked in step 672. Based on the battery level the electronic device 300 activates energy level three (step 674) or energy level five (step 644). When energy level three is activated (step 674), the MCU (such as MCU 370 of FIG. 3D) of the EHU outputs a signal En_MUX_OnSensor=0 and En_MUX_AlwaysOnSensor=0. The sensors categorized as 'always on' and 'on' are powered by the main battery. When energy level five is activated (step 644) is set, the SLAM states are continuously saved (steps 648 and 650) until the main battery level further drops to energy level six (step 654). At this point an alert is sent to the user and the electronic device 300 shuts down upon reaching energy level seven (step 658).

FIG. 6F illustrates an example transition states in accordance with an embodiment of this disclosure. FIG. 6F illustrates two different states, the state 690 illustrates a single battery source while the state 692 illustrates an EHU that is used in tandem with a main battery.

The ability to power obtain additional energy, while the electronic device 300 travels through an environment increases the overall run time of the electronic device. That is, instead of using a one or more battery sources to power the entire electronic device, an EHU that is integrated into the system can be used to power the various sensors. If the EHU is drained (depletes its energy storage), the main battery(s) can used to provide power to the sensors until the EHU harvests energy from one or more ambient conditions in order to provide power to the sensors instead of the main battery(s).

For example, given a sensor with a specific power rating, $\lambda$ would be the constant rate of discharge from the main battery. It can be safely assumed that the EHU also discharges at the same rate if it is used to power the same sensor, $\mu$ would be the constant charge rate of the EHU based on ambient conditions. As such, the transient state Equations (14) and (15) are described below.

$$\frac{dp_1(t)}{dt} = -(\mu + \lambda)p_1(t) + \lambda p_2(t) \quad \text{Equation (14)}$$

$$\frac{dp_2(t)}{dt} = \mu p_1(t) - \lambda p_2(t) \quad \text{Equation (15)}$$

Using the boundary conditions of $P_1(0)=1$, $P_2(0)=0$, such as during initialization, the main battery is used to power the sensor while the EHU charges using ambient condition, generates the Laplace transforms as described in Equations (16) and (17), below. The inverse Laplace Transform then provide the probability of being in each of the energy states, as shown in Equations (18) and (19), below.

$$P_1(s) = \frac{1}{s + \frac{(s+\lambda)^2}{\mu}} \cdot \frac{s+\lambda}{\mu} \quad \text{Equation (16)}$$

$$P_2(s) = \frac{1}{s + \frac{(s+\lambda)^2}{\mu}} \quad \text{Equation (17)}$$

$$P_1(t) = e^{-\beta t}\cosh(\gamma t) - \alpha_2 e^{-\beta t}\sinh(\gamma t) \quad \text{Equation (18)}$$

$$P_2(t) = \alpha_1 e^{-\beta t}\sinh(\gamma t) \quad \text{Equation (19)}$$

As described in Equations (14)-(19), the expression $\lambda$ is the discharge rate of main battery or EHU and $\mu$ is the charge rate of EHU. The expression P0(t) corresponds to the probability of being in state of 'Shut-down,' the expression P1(t) corresponds to the probability of being in state of 'Main Battery,' The expression P2(t) corresponds to the probability of being in state of 'EHU.' The expression P1(s) is the Laplace transform of P1(t) and the expression P2(s) is the Laplace transform of P2(t). For example, if $\lambda$ is 0.1 Volts/minute and $\mu$ is 0.01 Volts/minute, (the charging rate of the EHU is conservatively 10 times slower than its discharging rate), simulating the voltage there is approximately a 10% improvement when using the EHU with the Main Battery versus just using the Main Battery.

Although FIGS. 6A-6F illustrates example diagrams, flowcharts, and tables, various changes may be made to FIGS. 6A-6F. For example, while shown as a series of steps, various steps in each figure could overlap, occur in parallel, occur in a different order, or occur multiple times. In another example, steps may be omitted or replaced by other steps.

Figure 7:
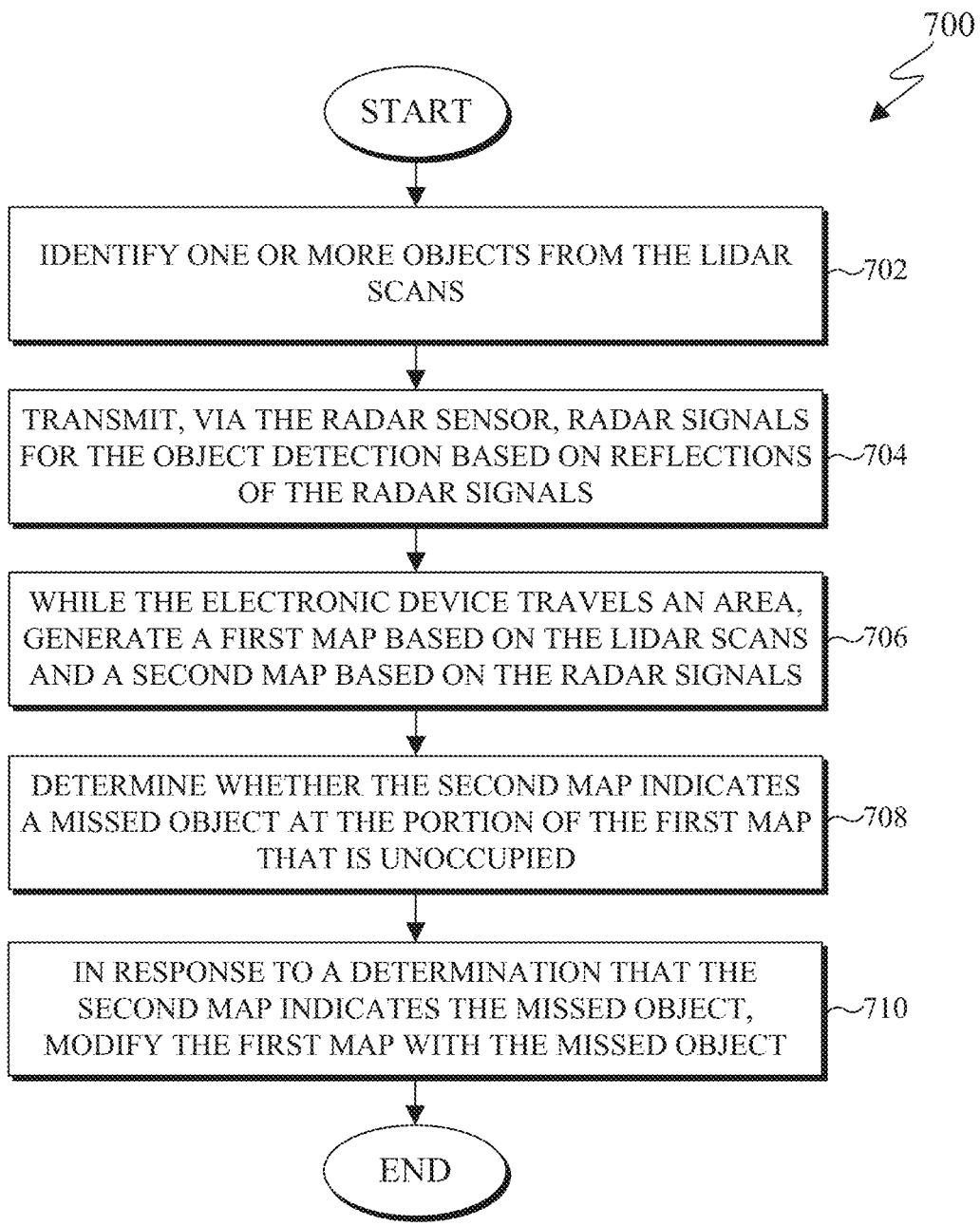
FIG. 7 illustrates an example method for controlling an electronic device in accordance with an embodiment of this disclosure.

FIG. 7 illustrates an example method 700 for controlling an electronic device in accordance with an embodiment of this disclosure. The method 700 can be performed by the electronic device 300 of FIGS. 3A and 3C, the electronic device 200 of FIG. 2, and include internal components similar to the electronic device 100 of FIG. 1. For ease of explanation, method 700 is performed by a processor, such as the processor 140 the electronic device 100.

In step 702, the electronic device 300 identifies one or more objects from a lidar scan. For example, a Lidar sensor can perform the lidar scan. In step 704, the electronic device 300 transmits via a radar sensor, radar signals. The electronic device 300 also receives reflections from the transmitted radar signals. The electronic device 300 can detect objects based on the radar signal reflections.

In certain embodiments, the electronic device 300 filters the radar signals. To filter the radar signals the electronic device 300 can maintain a list of historical radar scan points in a fixed global frame. The electronic device 300 then identifies a pose of the electronic device within the area based on the Lidar scan. The electronic device 300 can modify a point in the list of historical radar points from the fixed global coordinate frame to an electronic device frame, based on the pose of the electronic device 300. The pose of the electronic device 300 can include the orientation, and location of the electronic device 300 within the area. The electronic device 300 can also determine whether to discard a point based on a set of criteria in order to reduce noise and false alarms.

In step 706, the electronic device 300 generate a first map and a second map while traveling an area. The first map can indicate locations of objects as detected by the Lidar sensor while the second map indicates objects as detected by the received radar reflections.

For example, to generate the first map the electronic device 300 identifies the one or more objects within the area based on the Lidar scans. The electronic device 300 then generates a grid that overlays the first map. The electronic device 300 then identifies the state of a first cell. The state of a cell indicates whether the cell is occupied, unoccupied, or unknown. The electronic device 300 also generates a grid that overlays the second map, It is noted that the grid that overlays the second map is similar to the grid that overlays the first map such that a first cell of the first map corresponds to a similar location as a first cell of the second map. The electronic device 300 also identifies a value for the first cell of the second map based on the reflections of the radar signals received by the radar sensor. The value associated with each cell indicates a probability that the cell is occupied.

In step 708, the electronic device 300 determines whether a portion of the first map, that is based on the Lidar scans, is unoccupied. Based on the determination that a portion of the first map is unoccupied, the electronic device 300 then determines, whether the second map, that is based on the radar scans, includes an object that was missed by the first map.

In certain embodiments, the electronic device 300 identifies one or more points from the radar signals. The electronic device 300 can identify a set of points, of the one or more points, that have azimuth angles within an angle threshold and range values within a range threshold. The electronic device 300 can also identify a single range value of the set of points based on an average of the range values of the set of points. The electronic device 300 can also determine that the single range value is closer to the electronic device than one of the one or more objects detected by the Lidar scans along the azimuth angle. Based on the determination that the single range value is closer to the electronic device than one of the one or more objects detected by the Lidar scans, the electronic device can merge the single range value with the one or more objects detected by the Lidar scans to generate a fused scan. For example, the electronic device 300 fuses the laser scan and the filtered radar scan to generate a single scan.

In step 710, the electronic device 300 modifies the first map, that is based on the Lidar scans, with the missed object of the second map, that was based on the radar scans, based on the determination that the second map includes an object that was missed by the first map. In certain embodiments, the electronic device 300 generates a fusion map by merging a state (occupied or unoccupied) of each cell of the first map with the value of the first cell of the second map, where the value indicates a probability that the cell is occupied.

Although FIG. 7 illustrates example methods and diagrams, various changes may be made to FIG. 7. For example, while shown as a series of steps, various steps could overlap, occur in parallel, occur in a different order, or occur multiple times. In another example, steps may be omitted or replaced by other steps.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims

What is claimed is:

1. An electronic device comprising:
   a light detection and ranging (Lidar) sensor configured to perform Lidar scans;
   a radar sensor configured to perform object detection; and
   a processor operably connected to the Lidar sensor and the radar sensor, the processor configured to:
   identify one or more objects from the Lidar scans,
   transmit, via the radar sensor, radar signals for the object detection based on reflections of the radar signals received by the radar sensor,
   while the electronic device travels an area, generate a first map indicating the one or more objects within the area based on the Lidar scans and a second map based on the radar signals,
   in response to a determination that a portion of the first map is unoccupied, determine whether the second map indicates a missed object at the portion of the first map that is unoccupied, and in response to a determination that the second map indicates the missed object, modify the first map with the missed object.

2. The electronic device of claim 1, wherein the processor is further configured to:
maintain a list of historical radar scan points in a fixed global coordinate frame;
identify a pose of the electronic device within the area based on the Lidar scans;
modify a point in the list of historical radar scan points from the fixed global coordinate frame to an electronic device frame based on the pose of the electronic device;
determine whether to discard the point based on a set of criteria for noise and false alarm reduction; and
after a determination to not discard the point, determine whether the point represents the missed object.

3. The electronic device of claim 1, wherein, to determine whether the radar signals indicate the missed object corresponding to the portion of the first map that is unoccupied, the processor is configured to:
identify one or more points from the radar signals, wherein the one or more points represent a target detection result;
identify a set of points, of the one or more points, that have azimuth angles within an angle threshold and range values within a range threshold;
identify a single range value of the set of points based on an average of the range values of the set of points;
determine that the single range value is closer to the electronic device than one of the one or more objects detected by the Lidar scans along the azimuth angle; and
in response to a determination that the single range value is closer to the electronic device than one of the one or more objects detected by the Lidar scans, merge the single range value with the one or more objects detected by the Lidar scans to generate a fused scan.

4. The electronic device of claim 1, wherein:
to generate the first map the processor is configured to:
identify the one or more objects within the area based on the Lidar scans,
generate a grid that overlays the first map, wherein the grid includes a predefined number of cells, and
identify a state of a first cell, wherein the state indicates that the first cell is occupied, unoccupied, or unknown; and
the processor is further configured to:
generate a grid that overlays the second map, wherein the grid that overlays the second map is similar to the grid that overlays the first map and the first cell of the first map corresponds to a similar location as a first cell of the second map,
identify a value for the first cell of the second map based on the reflections of the radar signals received by the radar sensor, wherein the value indicates a probability that the first cell is occupied, and
generate a fusion map by merging the state of the first cell of the first map with the value of the first cell of the second map.

5. The electronic device of claim 1, wherein the processor is further configured to:
identify, from the reflections of the radar signals, a first object and a second object in a first direction, wherein the first object is positioned in front of a second object; and
generate the second map of the area, wherein the second map indicates positions of the first object and the second object.

6. The electronic device of claim 5, wherein to generate the second map, the processor is further configured to:
generate a grid that overlays the second map; and
identify a probability value that a cell of the grid is occupied based on the reflections of the radar signals.

7. The electronic device of claim 1, wherein:
the electronic device further comprises:
a battery, and
an energy harvesting unit configured to convert ambient energy; and
the processor is further configured to provide the Lidar sensor and the radar sensor, with energy from at least one of the battery and the energy harvesting unit.

8. The electronic device of claim 7, wherein the processor is further configured to:
identify an energy level of the energy harvesting unit;
provide energy from the energy harvesting unit to a first set of sensors and a second set of sensors based on a comparison of the energy level of the energy harvesting unit to a first threshold, wherein the first set of sensors are for location and mapping and include the Lidar sensor and the radar sensor;
identify an energy level of the battery based on the comparison of the energy level of the energy harvesting unit to the first threshold;
provide the energy from the energy harvesting unit to the first set of sensors and provide the energy from the battery to the second set of sensors based on a comparison of the energy level of the battery to a second threshold;
provide the energy from the battery to the first set of sensors and the second set of sensors based on the comparison of the energy level of the battery to the second threshold; and
based on a comparison of the energy level of the battery to a third threshold, provide the energy from the battery to the first set of sensors while the second set of sensors do not receive energy.

9. The electronic device of claim 7, wherein the processor is further configured to:
while the electronic device travels the area, identify a location within the area that includes a first type of the ambient energy that is above a threshold;
save the location in the modified first map; and
when energy within the battery is below a threshold, generate a path navigating the electronic device to the saved location.

10. The electronic device of claim 1, wherein:
the Lidar sensor is positioned on a top surface of the electronic device; and
the radar sensor is positioned on a front surface of the electronic device that is oriented to transmit the radar signals along a forward direction of travel.

11. A method for controlling an electronic device, the method comprising:
identifying one or more objects from light detection and ranging (Lidar) scans of a Lidar sensor,
transmitting, via a radar sensor, radar signals for object detection based on reflections of the radar signals received by the radar sensor,
while the electronic device travels an area, generating a first map indicating the one or more objects within the area based on the Lidar scans and a second map based on the radar signals, in response to a determination that a portion of the first map is unoccupied, determining whether the second map indicates a missed object at the portion of the first map that is unoccupied, and in response to a determination that the second map indicates the missed object, modifying the first map with the missed object.

12. The method of claim 11, further comprises:

maintaining a list of historical radar scan points in a fixed global coordinate frame;

identifying a pose of the electronic device within the area based on the Lidar scans;

modifying a point in the list of historical radar scan points from the fixed global coordinate frame to an electronic device frame based on the pose of the electronic device;

determining whether to discard the point based on a set of criteria for noise and false alarm reduction; and after a determination to not discard the point, determining whether the point represents the missed object.

13. The method of claim 11, wherein, determining whether the radar signals indicate the missed object corresponding to the portion of the first map that is unoccupied, comprises:

identifying one or more points from the radar signals, wherein the one or more points represent a target detection result;

identifying a set of points, of the one or more points, that have azimuth angles within an angle threshold and range values within a range threshold;

identifying a single range value of the set of points based on an average of the range values of the set of points;

determining that the single range value is closer to the electronic device than one of the one or more objects detected by the Lidar scans along the azimuth angle; and in response to a determination that the single range value is closer to the electronic device than one of the one or more objects detected by the Lidar scans, merging the single range value with the one or more objects detected by the Lidar scans to generate a fused scan.

14. The method of claim 11, wherein:

generating the first map comprises:
identifying the one or more objects within the area based on the Lidar scans,
generating a grid that overlays the first map, wherein the grid includes a predefined number of cells, and
identifying a state of a first cell, wherein the state indicates that the first cell is occupied, unoccupied, or unknown; and the method further comprises:
generating a grid that overlays the second map, wherein the grid that overlays the second map is similar to the grid that overlays the first map and the first cell of the first map corresponds to a similar location as a first cell of the second map,
identifying a value for the first cell of the second map based on the reflections of the radar signals received by the radar sensor, wherein the value indicates a probability that the first cell is occupied, and
generating a fusion map by merging the state of the first cell of the first map with the value of the first cell of the second map.

15. The method of claim 11, further comprising:

identifying, from the reflections of the radar signals, a first object and a second object in a first direction, wherein the first object is positioned in front of a second object; and generating the second map of the area, wherein the second map indicates positions of the first object and the second object.

16. The method of claim 15, wherein generating the second map, comprises:

generating a grid that overlays the second map; and identifying a probability value that a cell of the grid is occupied based on the reflections of the radar signals.

17. The method of claim 11, further comprising providing the Lidar sensor and the radar sensor, with energy from at least one of a battery and an energy harvesting unit that converts ambient energy.

18. The method of claim 17, further comprising:

identifying an energy level of the energy harvesting unit;

providing energy from the energy harvesting unit to a first set of sensors and a second set of sensors based on a comparison of the energy level of the energy harvesting unit to a first threshold, wherein the first set of sensors are for location and mapping and include the Lidar sensor and the radar sensor;

identifying an energy level of the battery based on the comparison of the energy level of the energy harvesting unit to the first threshold;

providing the energy from the energy harvesting unit to the first set of sensors and provide the energy from the battery to the second set of sensors based on a comparison of the energy level of the battery to a second threshold;

providing the energy from the battery to the first set of sensors and the second set of sensors based on the comparison of the energy level of the battery to the second threshold; and based on a comparison of the energy level of the battery to a third threshold, providing the energy from the battery to the first set of sensors while the second set of sensors do not receive energy.

19. The method of claim 17, further comprising:

while the electronic device travels the area, identifying a location within the area that includes a first type of the ambient energy that is above a threshold;

saving the location in the modified first map; and when energy within the battery is below a threshold, generating a path navigating the electronic device to the saved location.

20. The method of claim 11, wherein:

the Lidar sensor is positioned on a top surface of the electronic device; and the radar sensor is positioned on a front surface of the electronic device that is oriented to transmit the radar signals along a forward direction of travel.

* * * * *